(12) United States Patent
Taylor

(10) Patent No.: US 10,037,689 B2
(45) Date of Patent: Jul. 31, 2018

(54) APPARATUS AND SYSTEM TO MANAGE MONITORED VEHICULAR FLOW RATE

(71) Applicant: Donald Warren Taylor, Fredericksburg, TX (US)

(72) Inventor: Donald Warren Taylor, Fredericksburg, TX (US)

( * ) Notice: Subject to any disclaimer, the term of this patent is extended or adjusted under 35 U.S.C. 154(b) by 72 days.

(21) Appl. No.: 14/666,588

(22) Filed: Mar. 24, 2015

(65) Prior Publication Data
US 2016/0379486 A1    Dec. 29, 2016

(51) Int. Cl.
| | |
|---|---|
| G08G 1/09 | (2006.01) |
| G08G 1/01 | (2006.01) |
| G01C 21/34 | (2006.01) |
| G08G 1/08 | (2006.01) |
| G08G 1/0965 | (2006.01) |
| G08G 1/0967 | (2006.01) |
| G08G 1/0968 | (2006.01) |
| G08G 1/00 | (2006.01) |

(52) U.S. Cl.
CPC ....... *G08G 1/0141* (2013.01); *G01C 21/3415* (2013.01); *G08G 1/0112* (2013.01); *G08G 1/0116* (2013.01); *G08G 1/0133* (2013.01); *G08G 1/0145* (2013.01); *G08G 1/08* (2013.01); *G08G 1/0965* (2013.01); *G08G 1/096725* (2013.01); *G08G 1/096741* (2013.01); *G08G 1/096775* (2013.01); *G08G 1/096816* (2013.01); *G08G 1/096844* (2013.01); *G08G 1/205* (2013.01)

(58) Field of Classification Search
CPC .......... G08G 1/0141; G08G 1/08; G08G 1/07

USPC ....... 340/905, 910, 915, 933, 938, 909, 911, 340/932
See application file for complete search history.

(56) References Cited

U.S. PATENT DOCUMENTS

| | | | | |
|---|---|---|---|---|
| 5,289,183 A * | 2/1994 | Hassett | ........... | G01S 13/765 340/905 |
| 8,510,025 B2 * | 8/2013 | Chan | ........... | H04W 24/08 701/117 |
| 9,076,332 B2 * | 7/2015 | Myr | ........... | G08G 1/04 |
| 9,154,982 B2 * | 10/2015 | Chan | ........... | H04W 24/08 |

OTHER PUBLICATIONS

Bong Gyou Lee, How to Overcome Main Obstacles to Building a Virtual Telematics Center, Springer-Verlag Berlin Heidelberg 2007, pp. 344-351.*

* cited by examiner

*Primary Examiner* — Toan N Pham

(57) ABSTRACT

The system apparatus manages and adjusts monitored traffic density and/or speed in relationship to spatial locational flow rates, through a plurality of mobile and/or stationary encrypted communication device sensors, system transmits calculated digital navigational directives throughout a network of domains within any infrastructure in direct secure communication with humans, drivers and/or owners and/or vehicle transports mechanism themselves, viewable and/or audibly seen on iNavX2 virtual interface, providing on demand dimensional spatial mapping locational services, driver and/or vehicles system generated requests for certified advertisements and tracking transmitted navigational maneuvers.

58 Claims, 10 Drawing Sheets

APPARATUS AND SYSTEM TO MANAGE MONITORED VEHICULAR FLOW RATE

CROSS REFERENCE TO RELATED APPLICATIONS

The present application is a continuation-in-part of and claims priority to U.S. patent application Ser. No. 13/815,807, entitled "Apparatus and System for Monitoring and Managing Traffic Flow" filed in the U.S. Patent and Trademark Office on Mar. 15, 2013, now U.S. Pat. No. 9,070,290. U.S. patent application Ser. No. 14/158,797 entitled "Apparatus and System for Monitoring and Managing Traffic Flow" filed in the U.S. Patent and Trademark Office on Jan. 18, 2014, wherein each application is a continuation of and claims the benefits of priority under 35 U.S.C. § 120 and having at least one common inventor as the present document and each of which is incorporated by reference in their entirety.

BACKGROUND OF THE INVENTION

Field of the Invention

The present invention is generally related to vehicular transportation, and more particularly to a structured apparatus and system to manage monitored traffic flow based on Phase-Change density factors, sharing contemporary and historical data with certified share holders, and both state and the federal DOT.

Discussion of the Background

Intuitive Intelligent Traffic Systems commands real-time data signals encapsulated, some of which by way of encrypted mobile and/or static comm-devices, collecting physical events indicating positional Phase-Change spatial locations for each vehicle in relationship to other vehicular movements within any given network domains infrastructure. Thereby providing stern evidence that pushes Quantum Mathematical Boundaries displacing momentum and positional points calculated at the same time from multiple XY co-ordinates (Long/Lat) laced together with spatial third dimension Z—Topography and Climatic Expectations commixed with the human factor, vehicle capabilities to navigate amalgamated within the network architectonics that intensifying traffic throughput by way of a Channeled Telematic Architecture. CTA is created by incorporating sub-navigational systems that only communicate with specific comm-devices, this feature establishes a security proficiency by establishing a secure protocol for comm-device sync-d and registered with other comm-devices having a direct data transmission com-link with the systems servers.

With ever increasing degree of road traffic congestion and the related road rage in certain areas, there are specific variables to manage monitored traffic density safely. In doing so relaxes congestion and aids in alleviating unexpected maneuvers from careless drivers, supports redundancy of communication links to many different types of comm-devices. Resulting in fuel consumption decreases in direct relationship, association with environmental concerns such as CO2 and other engine maintenance items are maintained constant, including management of items such as vehicle inspections, licensing status and insurance coverages become relative to the overall equation.

Thus, flow variations of network traffic manageability decreases useless idle times, and more requiring earnest attention regarding fuel consumed to break and/or minimize inertia, the second true element in this traffic ecosystem modeled equation and the most important is manageability of variable sustained vehicle velocity. By allowing vehicular traffic to flow in variable speed variations within the state of this inventions created ecosystem drives measurable analytics, evaluating the temporal effectiveness on how well traffic systems performance can be further enhanced in reducing speed between lights, allowing cross traffic to seamlessly flow along with other secondary roadways, traffic becomes manageable exponentially.

Existing systems lack an efficient stable and most importantly a uniform structured operating system, and generally depends on direct line of sight, with visual observations of some sorts produced from devices like infrared receivers, cameras that have limited visual detection zones and other devices used to aid emergency and other vehicular traffic that are not reactive enough if at all and most require a direct line of sight to function somewhat properly. Video image vehicle detection system (VIVDS) that need to be humanly monitored and are inconsistent with detections due to having an engineer manually draw and/or automatically adjust the limited detection zones repetitively too identify precise areas of concern due to vehicular traffic positions and/or size variations within the lanes themselves.

Furthermore, loop detectors that are fairly expensive and results in area concrete deterioration from water infiltrating that causes cracks, and have a high failure rate with limited capabilities along with other expensive devices that do not collect real-time data from multiple positional reference points continuously throughout any municipality and/or on freeways. Such techniques can only provide extremely limited short range manageability with little or no proficiency, if any at all for the manageability of multiple vehicles and are too imprecise for more sophisticated management strategies that engages the ability to monitor traffic density and there associated variables such as maintaining safety-critical distant factors between vehicles based on density flow rates as speeds increases in direct relationship.

Thus the aggregate density of traffic has a direct relationship to area traffic speed within cities and or freeways. Whereby the increased distant between vehicular movements creates less dense traffic resulting in a safer network, since this distant factor assists in lane changes, unexpected or system generated speed reductions maintaining a safe velocity rate flow in any given network infrastructure. Managing variable density flow rates provides the decreases energy consumption and provides vehicular maintenance warnings, realtime insurance coverage verifications capabilities along with current inspection and/or valid license status and other data, and are generally not automated nor shared with governmental or other entities that are part of the current vehicular traffic equation.

Current traffic equipment and/or studies do not take into consideration as to the staggering amount of fuel needed to obtain momentum again after stopping, beside idling and these statistical studies lack evidence as to many types of vehicles old, new and not properly tuned. Thus, there currently exists deficiencies in managing flow rates in relationship to traffic density and the further need of a uniform standardization, comprising architectural application reliability so that no matter what country or state you drive in, the system encompasses a uniform traffic architecture also known as UCA.

Phase-Change Spatial Analytics helps municipalities make advanced informed decisions regarding vehicular density and the need to map some traffic to other routes in advance to maintain maximum destination variations consist with original routes destination time frames, and/or make spatial phase changes in velocity to other cross-layer intersections. The data collection assuredly sheds new light on road concentration costs, short and long term future congestion alternative.

In conjunction with vTelarc Phase-Change, spatial analytical data modeling from overlay map-objects provides decision makers from city to state DOT telematics business intelligence, including traffic modeling for public transportation and school busses, along with significant monetary saving in all area of current traffic management.

The invention provides business owners such as trucking and/or service related enterprises a Smarter Processing Platform enabling proven financial performance from their assets. The power to plan maintenance and/or new roads, visualize, share across multiple platforms, and to create safer vehicular infrastructure. As with our past, Phase-Change Spatial Analytics is a body of methods and techniques formulated for analyzing spatial scalability, the results of which depend upon the spatial density arrangement from prior moments in vehicular artifacts past and/or present movement. These analytics provide informatics far beyond the tool set for querying, measuring, transforming, describing, optimization from conceptual testing from the real-time data harvested.

Furthermore, the need for standardized International Transit Telematics System, also known as ITTS is consistent for the advancement in traffic telematics world-wide, that continually computes traffics phase-change spatial positions virtually throughout any given network infrastructure area. Maintaining standardization in distance factors based on density on freeways or for that matter any traversed roadway with transit variables compiled with in-exhaustible speed variations, detections of lane deviations from Vector Lane Drift, also known as vLaneDrift notifications integrating Proximitry Integration.

Further advancing Traffic Congestion Artifacts in relationship to other vehicles from planned and/or not route destinations, as it relates to alternatives for planned or unplanned routes, detours and other traffic variables codifies traffic flow based on a regulated flow rate in relationship with the aggregate density composed with the human equation, vehicle capacity to navigate, along with topography and climatic factors that keep to a minimum unnecessary idling and/or minimizing the need to consistently break inertia.

Signal light control mechanisms, cameras and the like are minute representations in the whole scheme in traffic control that does not account for the time/distant equation for the entire network traffic infrastructure in any given municipality or the surrounding conurbations approaching interactions, and for that matter even on freeways in an around and between any town or metroplex. These are a few examples of just another one of many priority elements this system, Administers Organizational Control responding with a Cloud Sync'd Enterprise Architecture in secure communication with a central server.

Currently there are statistical records that provides most cities have very large numbers of non-compliant vehicles without current tags or for that matter inspections and/or that are not properly insured. Previous statistics show nearly 40 percent of all drivers in the Dallas-Fort Worth MetroPlex do not carry insurance, and further possibly more due to lapsed coverages at any given time period. Insurance coverages can be updated/paid through the 'system' network using secure ECDLinks creating many more tech jobs.

The preferred understanding of the system embodiments, comprises an architectural resemblance of, opening up and looking inside either a PC and/or a Mac. Both have a pre-configured and most assuredly that of which constructs is merely an infrastructure, that has made its way to this inventions over all composure and to its processes managed by knowledge from the infrastructure itself at all communication levels encompassing Channeled Telematics.

The resources municipalities have currently in use, once moved over to a manageability role, utilizing current deployed traffic devices as the need to be replaced arises and/or move over too, as in taking down certain intersections traffic lights and other signage. The savings from bidding new contracts for equipment that is not sufficient to adapt much further without significant costs, maintenance heavy, along with updates on internal hard and or software are substantial.

Taking the cost of one four-way double lane intersection from traffic lights w/hardware and cameras, and/or other sensors, the dollar amount moves close to 5 figures in some instances much more. By placing one or more tVectorHub comm-devices and/or other combinations of other types of hub devices for any particular intersection going away from the intersection for a mile or more or less and/or replace all forms of signage and their associated poles and towers with exceptions of course. The cost to convert over to a completely digital infrastructure is extremely cost effectively accomplished, with less effort, with more flexibility and endless possibilities to advance traffic flow to an art such as the computer industry has done. The jobs to manufacture comm-devices, to deploy same, to manage the infrastructure both local, state and federal jobs with independent contractor jobs at all levels and to maintain, analysis the informatics and share with other tribal entities from data the system generates both in-house and in the field creates a new era in telematics. Most of these jobs are somewhat technical in nature and other positions require degrees in specific fields, again to manage, oversee and improve the system.

Objective reality of this structured apparatus and converging subsystems is to protect drivers and lessen the cost in vehicle management, substantial reduction in combined vehicle exhausted energy and creating a platform that will universally accommodate the paradigm shift in Managed Autonomous Usage-based Insurance.

Fundamentally, MAUBI sets a standard for composure in traffic infrastructure reliability that enhances detection, uses rudimentary comm directives for each manually, semi-autonomous and/or autonomous vehicles once linkup to assist in the ability towards predictive drive ability creating an Intuitive Transit Telematics System. While accurately pricing faulty drivers by non-engagement, insurance carriers hold risk in check, realized from generated Statistical Telematic Analytical Data—STAD.

The need for managed Cloud Based Sync'd Architectural system is necessary since data driven comm-devices produce astronomical amount of information, and the need for such data to be extracted into one area server will not suffice, even under the best of conditions.

Traffic flow rate has a direct relationship with traffic density cloaked with human emotions, the vehicles driveability and/or its capacity to navigate autonomously, along with climate and/or topography conditions and other expectations. Taking emotions out of the equation as much as possible, with expectational standardization, managing the density factor; network traffic can be reduced to a elementary manageable framework by adjusting speed in proportion too density or in some events vis-à-vis, thus managed flow rates become rudimentary.

Moreover, safety-critical functions that navigate by universal encrypted digital comm-advice directives minimizes wasted fuel, and of course with permission as to advice directives that inform each driver as to their spatial relationship with other vehicles utilizing Density Point Clustering Schema—DPCS, and in turn predictable automation as to expectable driver destination that was either chosen on the fly or programmed into network status and/or archived for daily routes takes place autonomously. Measuring and recording the amount of vehicular traffic proximitry density at any given time frame (moment) relative to a specific point, compared with the speed of the comparative clustered mass area chosen, common variations in predictable conception provide results to manage vehicular flow rates at future points in time.

Furthermore, non-insured vehicles and/or non-compliant vehicles place a substantial burden on the cost of insurance and our environment over all for each citizen from within any country. After Phase1 is brought into effective action notably, insurable costs are reduced by safer road conditions, and these concerns fade during the first phase of deployment from detection of a Registered Sync'd and Paired pAvics with a downloadable certified application for smart devices or other certified comm-devices with similar communication capabilities. At first encouraging driver engagement to manually enter vehicle data via secure web-link or entered the data from within the downloadable applications secure link for requested informational data linked to drivers VIN# such as current tag number, insurance and inspection status, age, any physical limitations, use of glasses and more by way of a non shared data base; this self entered data is verified from a shared and/or other databases with local or state authorities and/or shared with insurance companies updated informatics as it becomes available.

SUMMARY OF THE INVENTION

The present invention relates to an apparatus and structured system to manage monitored physical rates of change from vehicular locational movements in relationship to traffic density derived from traffic congestion artifacts, the human elements and navigational capacity of vehicles, along with Topography and Climatic Expectations. Creating a channeled telematics infrastructure, by sharing phase-change spatial situational awareness informatics in real-time from vehicular movements. With RFIDGPS integration merged with operational map-objects co-ordinated with a virtual graphical GPSGIS interface, also called vTelarc (Virtual Telematic Architecture) that utilizes multiple services for navigational informatics from NavStar and/or GPS.gov and/or ATT Navigator and/or from other similar providers in conjunction with weather forecasting sent through iVoiceCommands and/or on a virtual screen from a toggle interfaced that turns on navigational service generated from iNavCom facilities displayed on iNavX2 interface. Providing the ability for each comm-advice equipped with Avics iChipSet to communicate H2V, V2H, V2I, I2V and/or V2V and sharing harvested data with state and/or federal DOT, along with insurance carriers and other certified shareholders. The system includes (i) a plurality of mobile transmittable and/or receiving and/or transponder capabilities comm-devices and/or other certified comm-devices such as without limitation equipped with Autovecth iChipSet (RFIDGPS), also referred to "AVICS" devices, such geographic positional data and/or rendering from one or more vehicles may utilize devices equipped with accelerometers and/or a quantum compass, installed with pAvics during PhaseI deployment for vehicles not equipped with ODBII technologies, arranged from within a variety of vehicles and/or attached to any motorized or not vehicular transport device such as with an individual person and/or on bicycles in which each device is equipped with Avics iChipset a downloadable application installed using existing equipments locational service that transfer corresponding phase-change spatial long/lat coordinates and other pre-defined data continuously from within the smart comm-devices installed application and further receives speed recommendations, trip analytics based on computational comm-advice directives, certified advertisements and/or other similar traffic data.

For vehicles equipped with ODBII technologies, the assimilation of Obvipro incorporates a similar downloadable application installed either before installation and/or after being registered synchronized with system before download starts. Such as without limitations using Avics iChipset that receives, transmits and used transponders to verify not only data but also integrity of comm-device from traffic data such as; dimensional mapping locational services displayed on a virtual interface, vehicle disablement that transfer corresponding spatial long/lat coordinates before a safety-critical disablement, and pre-defined data continuously generated from accelerometers and/or a quantum compass, transmitting back to vehicles speed variations depending on density, lane adjustments based on dynamic analytical lane allocation for trucks, dignitaries and such with destination variations and more recommendations based on computational traffic data from; (ii) a plurality of stationary and/or mobile autonomous comm-device placed within safety officer vehicles and/or connected hubs, nodes and other certified comm-devices strategically arranged along one or more roadways and in communication with, (iii) cloud based central servers comprising a Cloud Based Sync'd Enterprise Architectural Infrastructure securely communicating with , (iv) network interfaced with a localized central server in communication with, (v) various sub navigational system databases with VPC (Virtual Private Connection) and/or a secure communication data link with each central server configured to, (vi) receive and/or transmit encrypted traffic data and/or digital advice directives from the plurality of mobile and/or stationary transmitting and receiving comm-devices over networks infrastructure, (vii) update traffic data in the non shared database, (viii) compare certain data in a shared data base against transmitted archived data, and filtration of certain data, (ix) continuously calculate optimum traffic density from one or more of vehicles traveling along the one or more roadways in connection with variable speeds based on computational traffic congestion artifacts, and (x) transmit encrypted timing adjustments over the network via encapsulated digital encrypted voice and/or virtual commands to one or more traffic lights or traffic tVectorhubs for any given intersection, and/or other certified comm-devices such as Obvipro and/or within vehicles traversing along any roadways and/or thoroughfares based on the optimal traffic flow dynamic calculations, (xi) transmitting and/or receiving via secure encapsulated speed comm-advice directives and other adjustments and notifications through hubs and node comm-devices and/or by virtual means directed to specific and/or all vehicles through vTelArc within any specific and/or all domains network infrastructure, (xii) each network interface is configured to respond to a specific identification number that is sent, received from traffic data, wherein some of the traffic data includes vehicle location, Phase-Change Artifacts and/or other informational data associated vehicles ID# conveyed from a plurality of VectorHubs and/or virtual VectorNodes, (xiii) then sent to corresponding Obvipro's, pAvics and other certified comm-devices relevant to the calculated datas specific and/or requested data calculated and, (ivx) continuously repeats extracted data calculations, entire process without interruptions adjusts for density vs. speed variations and other pre-defined computational variables as the need arises such as for warnings, lane adjustment and all other associated items mentioned herein. (xv) Entire system is configured as a Virtual Private Infrastructure, communicating only with certified link-sync-d comm-devices, of which these devices are equipped with the Avics iChipSet.

Further processing calculations are preformed in direct relationship with traffic speed in conjunction with density composed with flow verses density, combined with the human elements—that is to say drivers age and their responsiveness to react, attentiveness to listening to audible and/or visual commands and other human factors such as age, time of day, etc.; vehicles capacity to navigate, topography and climatic data, along with historical driver data regarding previous programmed trips like to work and/or random excursions and such for personal, service and/or commercial and for both interstate and/or intrastate commerce vehicles previous routes and driver behavior indexes.

The slower the traffic speed, fewer calculations are necessary; or in another way the slower the traffic is, in relationship with the density of traffic, frequency calculations intervals are longer. Again flow rate is corresponding, since time/distance variations are proportional to calculable advice directives being sent to selective comm-hubs in isolated sectors within a particular domains infrastructure for specific vehicles. Otherwise, computational authoritative comm-advice directives will not coincide with vehicular flow rate from lag time in computations that are irrelative to the current time data was received by Obvipro and/or pAvics iChipset and/or other certified comm-devices. Thus randomized computational analysis is inefficient; since the speed of calculations must simulate the speed of any given domains traffic infrastructure area calculated, and is one of the core components of intuitive traffic systems.

Further each municipalities infrastructure has domains within the entire infrastructure, these domains are determined and/or managed based on historical traffic density within each domains area. Further some domains are residential domains, others are shopping center domains, and so forth to be determined by the appropriate governing body, and/or other areas that may require additional cameras and/or other comm-devices within specific domain infrastructures for additional security measures. Infrastructures outside any municipalities jurisdiction, these domains infrastructures are managed by counties, since they too are currently managed by and/or governed by same the sheriffs office and/or county commissioners in partnerships with state entities. Once vTelarc is enterprise ready, the expectational expenses related to maintain traffic signage throughout each counties infrastructure reduces exponentially thereafter, possibly shifting to other expenditures that is more boots or cars on the ground so to speak.

Another aspect of the present invention is to provide a method for a electronic apparatus program embodied on a electronic comm-device processing received and/or sent data for managing monitored traffic density rate flow in a non shared database. More generally this apparatus and system includes (i) a first non-transitory computer-readable medium further comprising a computer device configured for receiving and/or transmitting and/or responding to transponder calls, extract data formulated by continuous variable frequencies of encrypted traffic data from a array of stationary and/or mobile comm-devices and/or vector node comm-devices and/or virtually, strategically arranged in a managed protocol along one or more roadways and in communication with a plurality of mobile comm-devices, some of which are Obvipro's, pAvics and/or other certified comm-devices, arranged from within a plurality of vehicles over a networks infrastructure, and/or attached to humans or non motorized such as bicycles and the like, (ii) a second non-transitory computer-readable medium further comprising a computer device configured for updating encrypted traffic flow density rate data in a non shared database, (iii) a third non-transitory computer-readable medium further comprising a computer device configured to receive continuous variable frequency data feeds from mobile comm-devices calculating optimal traffic density congestion rate flow from one or more vehicles traveling along the one or more roadways based on the calculable updated traffic data, and, (iv) a fourth computer code comprising computational data for transmitting timing adjustments over the network to one or more traffic light intersections and vehicles equipped with certified comm-devices based on the optimal traffic flow calculations, and (v) a fifth non-transitory computer-readable medium further comprises a computer device configured to preforms a method that filters certified third party applications such as advertisements and the like for security risks, (vi) a sixth computer-apparatus structured code comprising computational memory functions using Phase-Change Artifacts for exact spatial location for each vehicle, by projecting multiple mathematical equations creating optimizes overlay models, resulting in faster indications for system generated encrypted variables, creating a Super-Accurate Navigational System, and (vii) a seventh computer apparatus encrypted repository system comprising a shared database with state, country or federal department of transportation authorities, and (viii) a eighth non-transitory computer-readable medium further comprises a computer device configured to preform a process comprising BeaconHubs, SentryBeaconHubs and SentryHubs that may or may not be combined in part with other Vector Hubs or stand along comm-devices and the like scanning the area network for intrusions, hacks or other maliciousness that disrupts systems attitude and, (ix) a ninth non-transitory computer-readable medium further comprises a computer device configured to preform a process comprising an operational system creating a Digital vTelarc GPSGIS Overlay Model calculated form data transmissions creating a Quantum Positioning Overlay Model using accelerometers found is smart devices and/or a quantum compass, in a networked wifi infrastructure for secure communications. Using a standardized code, in that the displayed code is generated with current XHTML, HTML5, XML, XSLT or current none modifiable display code that utilizes cross-platform-compatible codes requiring no plugins. Simultaneously producing traffic vector nodes on a virtual display screen that provides images for warning signs, traffic lights, digitally encrypted speed variations either by audible and/or virtual means for curves in road ahead and all other signage being used currently, that is effectively inputed showing exact spatial locational position for other vehicles in a translucent back ground with drivers vehicle enhanced visually, with system overtures as to implicit details for on demand localized maps of area roads being traversed; virtually displaying buildings and the like with 2D, 3D and/or 4 dimensional toggled aspects for all surroundings and, (x) a tenth non-transitory computer-readable medium further comprises a computer device configured to preform a process comprising a plurality of transmitting and receiving comm-hubs and/or nodes, know as SentryBeacons or SentryHubs detecting foreign matter to intercept hacks or data attacks engaging Triangulation Sentry Fortification—also known as TSF, utilizing current techniques for Reflective Backscatter Technologies and, (xi) a eleventh non-transitory computer-readable medium further comprises a computer device configured to preform a processes that incorporates longitudinal an latitude vector nodes as to each traffic light, and all other current and future deployed traffic signage as to there specific geographical location that overlays the basic framework for GPSGIS Virtual Telematic Architecture, also known as vTelarc in a 2D and/or 3D and/or 4D each with Overlay Model perhaps from Quantum Positioning, formulated by accelerometers and/or a quantum compass in smart comm-devices and/or by current real-time virtual modeling means.

BRIEF DESCRIPTION OF THE DRAWINGS

A more complete appreciation of the present invention and many of the knowledgeable advantages thereof will be readily obtained as the same becomes better understood by reference to the following detailed description when considered in conjunction with the accompanying drawings, wherein.

DETAILED DESCRIPTION THE PREFERRED EMBODIMENTS

Figure 1A:
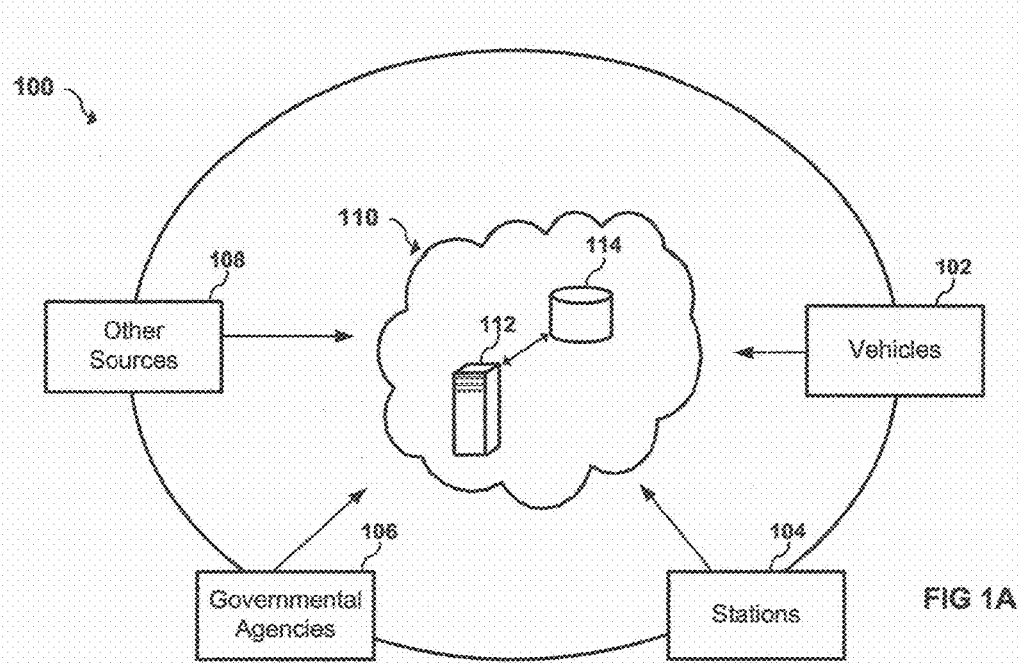
FIGS. 1A-1D are block diagrams illustrating a system for managing and monitoring traffic density flow in accordance with an embodiment of the present invention.

Referring now to the drawings, wherein like reference numerals designate identical or corresponding parts throughout the several views, preferred embodiments of the present invention are described.

The present invention relates to an apparatus and system that manages monitored vehicular traffic flow in a network infrastructure in an area served by one and/or more static comm-devices conveying Phase-Change positional movements and other data from one or more vehicles equipped with Avics iChipSet providing real-time vehicular forecasting .

According to one embodiment, the geographic positional data from one and/or more vehicles may comprise such as without limitation a certified comm-devices having the Autovecth iChipSet RFIDGPS transponder/receiver/transmitter, also referred to "AVICS". Herein after iChipset refers to 'Identified Chipset', meaning each chipset within each comm-device has a unique SHID assigned and hardcoded NOS that is non-changeable and/or modifiable. According to other embodiments, the geographic positional data received from commercially available consumer comm-devices equipped with accelerometers and/or a quantum compass and/or satellites and/or from archived data from other sources from GPSGIS data and/or same from third parties and/or the like; overlaid into a virtual interface using non-modifiable codes, displayed by means of such as without limitations on mobile phones, smart comm-devices, PDAs and/or other such certified comm-devices equipped with Avics internally and/or downloaded and installed pAvics software.

Such current geographic positional data may include information received without limitation from satellites from different sources depending on services required and/or needed in certain areas and/or costs. The geographic positional data may be in the form of a geographical position, such as longitude and latitude, also known as longlat, or may be other current except able forms which can be converted into such a form. The information collected on the progress of the individual vehicles can be used to dynamically calculate the combined average speeds, transit times and proportional Phase-Change spatial locational density factors of each vehicles movement in relationship with other vehicles and more. The information collected also includes calculable recommended traffic congestion options for alternate routes, emergency and/or dignitary vehicle travel variables and dedicated lane isolation for commercial trucking and/or school busses and similar transit vehicles.

The data received from each vehicle's processor includes but is not limited to fuel consumption data, maintenance information, mechanical information from onboard vehicle processors, $CO_2$ and or $O_2$ consumption variable output, emergency information calls, web-interface for deactivation of vehicle along with trace routes for stolen vehicles and disablement of same and the like. As used herein, the term "OBVIPRO" refers to an onboard vehicle processor, and it is also understood that Obvipro maybe a downloadable software application preforming similar features and/or functionality as with a hardware installation, further known as pAvics.

According to one possible implementation, vehicle Energy Summation Data is transmitted from onboard vehicle unit—Obvipro, for Consumption Variable Analysis for historical tracking purposes of fuel. ITTS will throughly reduce the worlds Fossil Fuel Supply Consumption Rate and on many other fronts availed by extracted data transmitted from each vehicles Obvipro (onboard vehicle processor) & pAvics (portable Avics) and other certified comm-devices. Using the over all network traffics consumption analysis from $CO_2$ and $O_2$ exhaust and/or other informatics that provides real-time reduction in Energy Summation Data from combined vehicle exhausted energy by adjusting optimum traffic flow in conjunction with density variables, including but not limited to street lighting circuits, or any other open and or closed electrical mechanical device and or other commercial conveyances an more; system embarks on a new era in intuitive vehicle management.

Receiving stations include one and/or more transmitting and/or receivers and or a transponder in each, known as VectorHub Class comm-devices, strategically placed along various roadways, park, and walk-way locations, and the like. As used herein, roadway locations include, without limitation, municipal traffic lights at any intersection, intersections using stop signs, lighting circuits, camera feeds from fixed or stationary local highways parks, walking trails, secondary roads, freeways and interstate roads, rest stops, bridges, landmarks, municipal buildings, selected freeway mile markers and other common areas, such as sub-divisions parks and such.

According to the present invention, existing wired and/or wireless networks, wide area networks, ad-hoc networks, and systems may be modified for continuous data feeds from one and/or more comm-devices woven into a dynamic computational algorithmic architecture (DCAA). According to one possible embodiment, communication is received from one or more communication comm-devices, sometimes referred to as "tVector Hubs" or "hubs", strategically placed at traffic intersections, roadway locations and/or other locations. The network may optionally be enhanced to handle the network data necessary to manage the traffic flow in real time, make suggestive analytical calculations to advance hands free driving. Such data includes data received from, and/or to, the one and/or more stationary and/or mobile transmitting and receiving comm-devises, received and/or transmissions from comm-devices within vehicles. Traffic flow management includes automatically presenting alternate routes, granular decelerate/accelerated speeds recommendations, accident updates, planned road maintenance along with growth projections, alternative routes due to congested routes or intersections, roadway light failures, and the like.

Traffic flow management adjustments may be directed towards specific traffic lights at one or more traffic intersections to adjust the general traffic flow maintaining variable velocity formulated based on traffic density from one intersection to another. Traffic flow management may also be directed towards specific vehicles to suggest alternate routes, and granular decelerate/accelerated speeds recommendations based on density within any given area, calculations are derived from the human elements, the vehicles capacity to navigate, especially whether vehicle is older and/or maneuvering autonomously or semi-autonomous. Each digital transmitted comm-advice directives are formulated from computed variables associated with each particular vehicles cataloged informatics, turn signal notifications—driver and/or system initiated depending on what deployment phase system is in. Onboard 'Object Functionality Points' (sensors on sides, rear, front of vehicle). Proximity Integration detection, will allow Reactive Response Interval Feeds into onboard systems, advising each drivers vehicle spatial relationship with surrounding vehicular traffic in the event of vehicle migration and other mishaps either audibly or on a virtual interface.

In accordance with further enhanced implementation, the use of a variety of hub comm-devices intensify the over all awareness of vehicular traffic flow, density and safety by using specific Hubs which are as follows: VectorHub Class comm-devices some are BeaconHubs, SentryBeaconHubs, SentryHubs, SentinelHubs, Sentry Nodes, AlphaHubs, AlphaVectorHubs; b, c, d and xVectorHubs; each sub hub has an explicit task, the duty of which is specifically allocated for any given sector within networks infrastructure area.

According to one enhanced implementation, AlphaVectorHub communication links filter certified broadcasts that may or may not be encrypted advertisements, whether its for gas, lodging or shopping and the like. Each area VectorHub have sub-classes of which only a designated advertisement is broadcasted, such as without limitations determining a specific vehicles energy summation data, based on Consumption Variable Analysis that a certain vehicle may need fuel, and providing logistical computational data as to the next available fuel supply points or better known as fuel nodes that are displayed with alternatives regarding fuel manufacturer types and other niceties. Other AlphHubs for advertisements are added within this realm for food nodes in the virtual interface, lodging if a calculable variable is computed for rest time or driver selected based on fatigue attributes; completely maintaining autonomy as to each sub-class in a particular industry managed by sub navigational systems, thereby protecting and enhancing digital traffic broadcasted comm-device directives.

According to one possible enhanced embodiment, each city or municipality may have their own AlphaVectorHub sub-class, wherein locational services such as fuel, food, lodging and the advertising of such are a PSE generating revenue for that particular city, creating income thereby offsetting expenses in maintaining local system infrastructure. Operational management maybe bid on based on specific governesses so enacted, soliciting bid proposals for such opportunities.

According to one possible implementation, the IEEE 802.11 protocol may be utilized for communication with palmtop computers, laptop computers, personal digital assistants (PDAs) and Internet mobile phones and/or other certified comm-devices. The 802.11 standard specifies two modes of operation: (i) an infrastructure mode where an access point provides the link between wireless stations and wireline legacy infrastructure, and (ii) an ad-hoc mode where there is no access point. By using tVector Hubs to collect real time data that is feed into a central processing complex of cloud based sync-d servers, each tVector Hub contributes to the telematic distributed management and control of the entire network. (iii) Wherein the use of Plug-n-Play activations are used to expedite preregistration synchronize for comm-devices in any given network infrastructure area wherein vehicle is traversing and/or moving into an adjacent and/or new infrastructure. With additional data being sent on to the next infrastructure in the vehicles route destination.

According to an advanced implementation, comprising the operating system maybe built on a Unix platform. According to this non-limiting implementation, verifications of tVector Hubs occur routinely in sequential random patterns. Secure notifications are sent out to each tVector Hub class device for authentication purposes, to verify integrity of each unit using a cryptic VPI connection. The network may utilize Crypsis Tokenization, otherwise known as encrypted tokenization. Each tVector Hub is routinely verified by a data push, which is encrypted, for original data composition. On deployment the token is placed within each tVector Hub's core operating system. If the tVector Hub is deprived of power, is hit with a power surge, or has otherwise been compromised, then the tVector Hub data maybe rolled back and/or a secondary internal board or a processing code may be energized (or if necessary, the Avics iChipset can be replaced quickly).

If any Avics iChipsets deployed become inactive for what ever reason, certain deployed Avics comm-devices within there specific class have internal capabilities to be energized remotely initiating Long/Lat Range WIFI transponder/receivers and/or using GPS satellite verifications; until such time erred comm-device is repaired and re-actived.

According to one embodiment, test tokens are sent to verify operational areas for data integrity composition inspections. If any of the tVector Hubs NOS are not the same as its original encrypted token, the tVector Hub data is rolled back. Off-line for maintenance and operating system updates, hardware failures/software updates may be propagated throughout random comm-devices for a specific domain area within the infrastructure, with redundant cloud-based server capacity to maintain operational up-time. The data from tVector Hubs may be sent via one or more token sets for security protocols originally implanted.

These data composition inspections have pre-defined examination protocols for specific comm-devices; determination of maliciousness from code injections and the like for any comm-device. If such err exists the next dataset values are examined, if datas encapsulated encrypted key is intact, transmitted data is used for calculations; authenticated component composition of previous digital advice directives are compared for locational anomalies. If err exists, the next positional locational dataset transmission is comparatively overlaid for compositional comparative analysis for datas integrity. Finally data optimization parameters are excited against topography and climatic conditions, human elements, vehicle and drivers ability to navigate with other referenced data, comparative parameters are verified against last data set transmission, if data clears—meaning current data has to pass several pre-configured tests based on previous datasets once clear, data is parsed for computational events, then repeated for next transmission.

One of the benefits of RFIDGPS transponder/receiver/transmitter iChipset is the ability to track multiple mobile and/or stationary comm-devices such as onboard vehicle processors establishing long/lat isolation integration, such as without limitation, OBVIPRO, pAvics, cameras with stationary or fixed feeds, street lights and other smart commdevices simultaneously within any given networks framework, such as without limitation a city, a township, a railway, highway, freeway, river or the like. Intermixing of network packet traffic variables, having a reserved IPv(set), along with subsets for each municipality which increases security and localizes any threat attempt. Allowing tracking attempts much easier within any particular networks framework further encapsulating transmitting a radio frequency identifier variations from/to any type of vehicle, smart devise or the like. The system relies on several tVector and/or data node points for redundancy.

Utilizing a (Stationary Hub Identifier) SHID that has a dedicated IPv(set), that reflects the ESN and/or other unique cellular identifier assigned to each Avics iChipset within each VectorHub, OBVIPRO and/or pAvics, signal integration interactions allow data message transmissions from/to each whether independent and/or networked with many VectorHubs, OBVIPRO, pAvics and other certified commdevices securely. Forming a wired/wireless ad hoc framework is essentially expedited with the direct communication from/to each comm-device that has a unique RFIDGPS transponder/receiver/transmitter iChipset—integrated circuitry identifier encapsulated within using integrated cellular capabilities for enhanced distances, and for redundancy. Each municipality can deploy that communication process that is most readily available to maintain cost implementation in the beginning, with migration over to the most current com-links at a later date.

Communication is transmitted from/to each tVector Hub, that receives and/or transmits data from/to each vehicle's Obvipro, pAvics and/or other certified compliant commdevices, compiling simple data that creates complex fuel consumption variables, engine analysis, long-lat spatial positional points in relation to other vehicles and speed variations of each, from vehicular traffic that passes through, around, above and/or below these hubs comm-devices. Data collection is transmitted with multiple com-links (e.g., wireless, electric lines, Wi-Fi and/or gigabit wide/local area networks and/or by other currently known technologies such as electrical lines and/or different mobile communication networks, such as without limitations UMTS, WLAN, and WiMAX and/or CTP and not limited but in support of advanced communication networks that can be extended to support other advanced IP networks, such as long term evolution (LTE) to each command office.

By analyzing the dynamic analytical rate flow (DARF) in comparison to dynamic analytical lane allocations available, along with dynamic directional flow constraints calculated inputs from network traffic congestion artifacts are faster an accurate. The process, computational traffic flow dynamics draws principles from the fields of cross-layer optimization, artificial intelligence, machine learning creating a dynamic computational algorithmic architecture from dynamically compiled data transmitted to and/or received from each comm-device on any local and/or wide area network that is sync-d linked together from each hub and/or node and every on board processor and/or other similar comm-devices equipment with Avics, that comes into range of any mechanical and/or electrical-mechanical and/or software receiving/transmitting hub comm-device and/or similar certified comm-device deployed within an infrastructure.

Network packet artifacts are determined by sending out a transponder echo call to make sure that any OBVIPRO and/or other certified comm-devices that have Registered Sync'd and Paired on the network, has arrived at destination and/or is off network. If there is no reply from echo request calls from tVector Hubs in the vicinity of any given Obvipro's, pAvics and/or other types of certified mobile and/or static comm-devices last known location, 'System' calculates a comparison to the whereabouts of its location now in relationship to where it at present after reply from vehicles response to echo call before vehicle is turned off.

According to one embodiment comprising a communication commencement protocol for comm-devices registration on any network areas infrastructure consists of each tVectorHub and all other VectorHub Class comm-devices and/or vector nodes and/or virtual nodes and/or receptors have built in RFIDGPS transponder/receiver/transmitter—also known as: Avics iChipset, all data sent and/or received is encrypted. The transponder in each hub and/or node comm-device transmits and receives a unique SHID that corresponds to not only its long/lat Phase-Change spatial position as with mobile comm-devices, it also transmits the unique SHID ID# assigned to stationary comm-device. Each of these various class of comm-devices are assigned sets of unique encrypted paired keys that were originally hard coded when deployed and/or injected in field. Once comm-device is deployed and upon being energized on a given networks infrastructure, sends a responder SHID key to system, the system responds with the encrypted Paired-Key acknowledging comm-device on the domains network infrastructure.

The secondary half of the encrypted Paired-Key is sent back from 'system' to any certified comm-device that initiated access, only after the dual verification is completed transmission will proceed. Each key is encrypted and transmits via a VPI (Virtual Private Infrastructure) tunnel to one or more comm-devices and/or along other secure means mentioned herein, and/or all comm-devices can be loadnetworked within a given domain area when the infrastructure transmissions are linked to each other.

Other comm-devices may only use wifi and/or both may use electrical lines and/or by other current means that are convenient, inexpensive and secure. The second transmitted response Paired-Key that is embedded within the first Paired-Key when energized, then acknowledged by the sending hub, node, system server and/or other certified comm-devices whether virtual or not, to any comm-device within the load-Networked' domain area and/or within specific domains infrastructure, with this second encrypted key that was hard coded and non modifiable. Once each new comm-device is energized within a domains infrastructure, followed by the registration authentication Sync'd and pairing sequences, the procedural events form a Load-Network, wherein all comm-devices such hubs, any comm-devices equipped with Avics iChipsets and/or other similar comm-devices only communicate with those devices that they were paired with, including any servers. Malicious and/or unknown communications are ignored, attempts are logged and sent to SentryBeaconHubs, then further pushed onto localized cloud servers, then onto central server. Such data is cataloged, followed with research as to ISP provider and/or remote rouge attacks from a single stationary device, information sent to authorities, requesting user informatics of these known IP attacks, with possible fines and more.

Responses are generated vis-à-vis from either system to hub, and/or hub to system and/or Obvipro to hub and/or vis-à-vis, and so on for any comm-device that initialized by the first comm-device that requested acknowledged on the network, and using the appropriate Paired-Key for response to an invite and/or vis-à-vis. There are other matched Paired-Keys and these too are also encrypted for redundancy an security purposes and some of which are layered for a third level and/or more sequential authentications for secure measures to certain class comm-devices, such as creating a path for emergency vehicles and/or dignitaries and the like; and there may be additional paired transmitted and received keys for each comm-device, enclosed within an encrypted rapper, and further comm-devices only respond with a specific reversed layered binary mathematically encrypted matched Paired-Key initialized hand-shack internally for another layer of security.

All Paired-Keys sets are archived in an encapsulated encrypted repository, that routinely requests verifications from each comm-device for their associated Paired-Key and each device it loaded and/or injected with have the matched set for each paired-key set. The central servers have the entire key sets, and continuously monitor comm-devices data transmissions key sets for structured integrity. Key injections done in the field, the keys themselves are encapsulated and encrypted and registered for a specifically designated comm-device solely registered to positional assignment. Field technicians do not have the ability to make alterations, since the keys themselves are assigned to a specific comm-devices SHID ID# only, that it already been confirmed by central server as to its long/lat position.

Within each hub, node and/or other certified comm-device virtual and/or not there is a small program code that can be ran remotely and/or internally for system generated integrity verifications as to keys both paired and the responding key. This small code runs independent of the OS, and configured to run within and/or outside the NOS's core hardcoded area, preforming analysis verifying encrypted Paired-Key sets, determining alterations from malicious or related items from a hard coded blue print of the comm-devices integrity upon deployment when paired with other registered comm-devices.

If anomalies found comm-device sends a encrypted distress signal through SentryHubs unto 'system' requesting maintenance, shut down, roll-back and/or request verification to activate OS memory flush and/or inject the hardcoded NOS back into OS. Each deployed comm-device has unique layered Paired-Key sequence to activate the flush procedure. Functionality of any device may and/or may not continue based on parameters defined for specific events. System runs enterprise quintessential data integrity checks randomly, the same process is initiated for other comm-devices that have been flushed and/or updated OS before system energization, to verify comm-devices relationship to and/or with other comm-devices for articulated data before re-activation. Thus there are protocols for any comm-device to be energized, and follow-up procedures in place to be activated with the infrastructure before and/or during communications.

Further each hub, node, and/or other certified comm-device equipped with Avics iChipSet has a separate transmitter to send data passed from a hardware and/or software integrated circuitry comprising separate receivers and/or a separate transponder and/or transmitters that has a unique SHID ID# assigned and/or hardcoded. Further noteworthy is once a specific Obvipro transmission is received by a certain vectorhub, the hubs receiver activates the ecep to mark the data just entered comm-device, then the hubs transmitter activates the ecep upon datas exiting hub onto another hub class comm-device and/or onto sync-d cloud server and then onto central server. These comm-devices are tied/linked together, and may consist of hardware and/or software integrated circuitry, and are independent of each other in preforming tasks for security reasons. Each of these comm-devices the transponder, the receivers and the transmitters goes through a similar Paired-Key process internally allowing verification and screening for malware injections, non certified transmission of attempted code implants and/or maliciousness and/or other such rouge anomalies. Each Obvipro, pAvics and other certified comm-devices equipped with Avics iChipSets have a similar internal process as with the hub, node other certified comm-devices that constantly verify data transmissions, digitally encrypted traffic comm-advice directives from computational derivatives, via iVoiceCommands and/or for viewing in a virtual interface empowered by transparent informational knowledge, building a channelized infrastructure that holds firm to the advancement of Cybrintelligence, where human knowledge is merged with machine languages.

Each class of comm-devices utilizes a combination of these processes and/or depending on data held for suspension, formulated by a second evaluation of the next transmission and/or received datasets. Furthermore, each Obvipro, pAvics installed on smart comm-devices uses a similar pre-defined procedural verification several times throughout devices linkup status.

Once a offline vehicle re-activates registration, archived data is then comparatively analyzed so as to create a baseline interpreter mark of last transmission received, so that any new registered activations from any certified comm-devices integrity composition are reverified. Once Obvipro and/or pAvics and/or other certified comm-devices complete initialization within a domains infrastructure is verified, a determined route alternative is excited from previous offline positional node location, system begins communication. These end of life trip events are archived for future use and/or deleted from users interface based on drivers needs. However this data is not totally deleted, its archived for future activation and/or for analytical purposes and compared against other vehicle and future trips by same vehicle.

Each vehicle, whether a truck—any size from a half ton to a semi truck, car and/or other motorized medium that transports goods, services and/or people; when registration on a networks domain infrastructure occurs by Syncing that particular VIN# and/or other unique identifier is paired with all associated information such as weight, dimensional size, manufacturer and/or all data associated with a particular vehicle, along current insurance, inspections and/or licensing data and/or other informatics archived—meaning comparative data that has been matched to either a specific route, vehicles driver interactiveness in conjunction with surrounding vehicles informatics and the like is connected to their vehicles specific VIN# and/or uniquely assigned ID and/or other informatics complied from previous registrations within any given networks infrastructure and/or in comparison to age of vehicle and/or the driver attentiveness and all other factors associated with responsiveness and there associated human factors and/or other derived data that benefits additional safety items. Finally, the paring event is completed once acknowledged, vehicles Phase-Change spatial relationship is computed as it maneuvers throughout the network, compiling data, computing traffic variations and sending information as requested by driver and/or system recommendations for diving advice directives, entertainment and navigational suggestions as requested by driver and/or autonomously from vehicles Obvipro's informational recommendations based onboard vehicles processors current integrated capabilities with Proximity Integration.

Phase-Change positional point calculations are determined by the anticipated time-lag in respect to distance data sent has traveled in proportion to vehicular rate, formulated adjustments with the next digital comm-advice directives transmission is comparatively analyzed with the previous calculable dataset sent. In other words, calculations are pre-configured based on vehicular rate flows relationship to timestamp of data received for phase-change positional points, and further adhere to similar calculations for datasets being sent out and finally accommodating all other aspect ergo human factors, vehicle/driver capabilities and surrounding weather and the like, prior to next datasets transmission sent to vehicle. Thereby, if any unexpected migration and/or other occurrences toward another vehicle occurs, calculations from specific artifacts are recorded as to which transport entity unequivocally initiated a particular disturbance and/or a lane drift that took place whether from human error and or equipment failures of any type e.g. mechanical aspects of vehicle, non-engagement and/or attentiveness of driver and/or internal hard/software and/or failures from combinations thereof. iMarkers are notated, formulating sensitivity factors calculated for future incidents, such as vehicle heading in wrong direction and/or instantly sending out notifications to effected traffic and/or surrounding vehicles, either by audible iVoiceCommands, and/or to the virtual interface vTelArc with procedural steps for all anticipated vehicular traffic that may be affected from such occurrence with evasive actions to be taken by driver and/or autonomously by each vehicle, as to those that are stolen and/or headed in wrong directions—system can safely pull vehicle over and/or shut down the operating system in vehicle and/or notify surrounding authorities in such an occurrence.

According to an embodiment comprising a formula for secure data transmissions, each of us live in a state, within the United States. So shall 'system' starting with the municipalities, townships, counties and the like from where data originally gave rise to and harvested from its creation inception point. Thus, as stated throughout this invention displayed, data should be collected from is origination point, compiled with protocols that generates the path from whence the data came from. Consider, since traffic data generation began from within and between cities, so shall these areas have clear dominion over such data as to gathering, performing calculations therefrom for a multitude of reasons, archiving, and to disseminate the datas results whence originated from. Example: To be an open intelligent system, regarding the dissemination as to the generation of such datas inception, a full path to and/or from the data starting point inception came from must be associated with each data string as it communicates such data even as to its designational position as it moves along to its final destination and at rest either permanently or temporarily.

Meaning the datum that was transmitted came from various sub navigational systems (subnaysys), such as without limitations: vectorhub class comm-devices, nodes, binary receptors and/or virtual and/or by other current means listing each 'datas creation inception point' e.g. the communication device from within and/or assigned to a specific vehicle, vectorhub classes, nodes virtual and/or not, and with the associated VIN, SHID ID# and/or in a binary and/or virtual assignment number and/or other unique identification # produced and/or generated and/or labeled and/or assigned to a particular comm-device and/or any other type of electromechanical device and/or virtual and/or by any means know now or in the future that produces a string of alpha numeric characters that may or may not be encrypted or coded in any other manner indicating the device ID#, the path taken to the next device along with the time data left the previous device, and the time data entered another electromechanical and/or other comm-device for whatever purpose to transmit further, processing, to convert to another readable form such as PDF's or other forms of readable matter, to and/or from servers, at rest with time duration of idleness, with time of extraction to be shared with other certified share holders and recorded each other time data is moved for whatever purpose until at rest again and the process continues on for ever.

I[N] Support of the example above referenced statement: the momentums amount of data collected from multiple nodes, hubs and other certified comm-devices and/or by virtual means, each has a 'trail date'. Such data has a clear and somewhat hierarchical undertones. As when you search for a topic, word or string of characters alpha and/or numeric strings within the internet regarding a topic and/or phase, etc. Once you chose that specific document from the list of displayed choices, the document 'located' automatically generates a string of characters such that there exits undoubtable fact to its precise long/lat and/or binary and/or virtual and/or by other current means indicating where such data, information and/or other informatics whether mathematical data and/or virtual data came from before and/or its inception creation point with a list of each associated device upon which data was transmitted from and/or rested and/or ended either temporary and/or permanently at rest being archived in a non-shared encrypted repository, even with other shared holders repositories.

Thereby, generating a unique ID# path assigned from each comm-devices and/or any other electromechanical device that created and/or transmitted data from its origination point. Accordingly, as to certain axis points, whether long/lat, binary nodes and/or by other current means; such ID# is not only used to verify datas path and/or time-line, a security stamp for each comm-device it enters and/or exits during it generation from start to finish is created. Such data assists in the convergence of the virtual interface associated with vTelarc displaying real time-line virtual navigational data on iNavX2 traversing on land and/or hovering by any means. Moreover, the recorded string is added too for each comm-device that touched, read, used to compute and/or create such data, that of which resembles a gate, similar to 'open source' the standardization of Transparent Informational Knowledge; wherein the information gate is 'always' bi-directional. Thereby not only creating transparency of the datas origination creation inception point and further used to litigate the true directional Phase-Change artifacts and/or migration from any vehicular movements along with other informational records collected. Controlling information to the point of restricting bi-directional historical data flow, the data itself and the associated facts become meritless as to datas integrity otherwise.

When documents are found and turned into PDF's by way of searches, each document has 'vector locator path'—VLP. This is a 'unique string identification name'—USIN acknowledged as 'tMarker Audit Trail' or simply tMarker Trail at the bottom of page whether touchable, viewable and/or printable and/or in a virtual sense as to the same i.e. touch-view-print. From wherein the record/data file whence it came from as to a specific comm-device, server, printer and/or by other electromechanical equipment, software and/or a combination thereof, and/or by other virtual means.

Looking at this invention process in another way; the string code is geared specifically towards the generation of the exact path in binary, cubits and/or other means of code generation that may or may not be encrypted at its inception point from where not only the data resides at, also indicating exactly where and/or what comm-device data was generated from and/or passed through by any current means as known now and/or in the future when this invention having implementation of all the necessary parts deployed moves over to a virtual interface.

Furthermore, when the data file e.g. pdf, images, word process documents, text editor programs and there displayed results, and/or other types of informational data is printed as a pdf and/or on paper or any other viewable document virtual and/or readable as a document file on and/or by any type of electronic processing equipment that such files are viewable to humans and/or in machine languages compiled by any type of programming languages currently in use or not conceived of currently in use to create such tMarker Trail and/or time line for legal and/or not and/or in the form of electronic, paper, virtual and/or written in other codes and/or programs that displays are not used other than for the sole purpose as outlined here in this invention. Each data string once created and/or that are/is printed on the bottom of each document and/or images and/or is coded from within each comm-device as a new element of the string is added until it is at rest and/or enters/exits other certified comm-devices creates the absolute comm-device directory trail by means of crypsis tokenization, called a Var√Chk Index. Such tMarkers are displayed in the nature similar too the following as data transmissions arrive from mobile comm-devices within a domains infrastructure that are transmitted to hub devices, and being managed by the system receiving these data transmissions as exampled by the following: Ω-Obvipro ID# -SHID ID# -creation time stamp [time displays are configured as either digital, analog and preferred use of Greenwich Mean Time (GMT)]-time exited device (data that is of any type)\time (entered next device) -Hub ID# -SHID ID# -existed time\-ENT (Entry Time) -SentryHub ID# -SHID ID# -ET (Existed Time)\ ENT -VectorHub ID# -SHID ID# -ET\ -ENT -Server ID# -SHID ID# -ET\ -ENT -Processing Calculations ID# -SHID ID# -ET\ -ENT -Filtering ID# -SHID ID# -ET\ -ENT -Comparative Analysts ID# -SHID ID# -ET\ -ENT -Overlay Model updated ID# -SHID ID# -Referenced -ET\ -ENT -Recalculate Comm-Advice Directives ID# -SHID ID# -ET\ -ENT -Transmit Advice Directives ID# -SHID ID# -ET and so forth listing every device, server, hub, router, electromechanical device and/or program to process or compile, transmitted, manipulate or move data. This is only an example, further a universal excepted standard for all languages must be formed to prevent abusive manipulation as to datas transmissions principled among other data marker forms.

The above example is a sample of absolute comm-device directory trail providing a list of comm-devices and/or electrical-mechanical devices moved that data and is for demonstration purpose only. Each tMarkerTrail is of a uniform standardization as to only one space between each comm-device acronym and the next item whether its a comm-device, along with a dash showing or listing a new device that handled for what ever reason the data: e.g. Obvipro -O# and for the associated SHID for same device -SID ID#, pAvics device—A ID# along with the associated SHID ID# -SID, VectorHub comm-device—VH# (space) SID (space) SentryHub device—SH# (space) and other items can be added such as certified mobile devices ESN#, in front of each comm-advices acronym is the time entered, followed after the SHID exit time.

The indices such as each comm-devices can be further simplified by using alpha/numeric characters of one or more letters with one or more numbers such as for each Obvipro the associated index is: O space, followed by its SHID ID # for instance C3 Hz Another tMarker indicator can be used added when data reaches system, this is the time in space traveled from the datas exit point time in relationship to data entry time stamp for the next device. If there are differences even in milliseconds the data is held in suspension for review, looking for anomalies within the datas string and those coming from other vehicles from surrounding areas, once comparative analysis is analyzed and passing data is parsed and used for computations.

A preferred embodiment is have both the tMarker and the t2Marker combined within one tMarker Trail, and tMarker's third part of indices movement which is the longlat marker of any device data moved through that is for images, pdf s and/or all others forms of informatics, must follow this final stage for datas integrity, otherwise data could be considered corrupted.

Searching data records within a secure repository uses a similar tMarkerTrail: /server name/obvipro SHID# ID-time stamp (or intervals) data server [location id#]/municipal server [vectorhub SHID]/Obvipro ID#/[virtual interface]/xo/x-path.xhtml This same principal can be implemented for any item searched on the interne and placed at the bottom of a document as with this example: www.ging.com/search phase and or name/name of ISP/name of server IP address/name of owner of company that owns IP/name of company that owns domain name [if different]/name of document/documents created date/date document was altered/person or mechanical electrical device that created document to a PDF or changed datas readable formate to another form such as simply a printable document)/date document was moved from another location along with server long/lat coordinates for server and so on, the greater details in listing each device data passed through, used to calculate or any other form of informatics. Such informational data becomes tenable as to its full authenticity of datas inception point.

Further the reverse is accomplished when calculable comm-advice directives are sent out to e.g. Obvipro and/or other certified comm-devices within vehicles or installed on certified mobile comm-devices. When data comm-advice directives are sent from system, enter a hub comm-device, the string of characters are intended solely for that hub comm-device to transmit to a specific Obvipro, pAvics and or other certified devices equipped with Avics iChipset. However during the data transmission, such data moves through an established and/or a pre-configured route through certain hubs and/or nodes or other certified comm-devices that are link-syncd for data to reach a certain mobile comm-devices such as vehicles Obvipro or another stationary or mobile device based velocity of a single vehicle and/or those other vehicles with the same range of datas transmission. Thus establishing a baseline for Channeled Telematics. Wherein communication links are pre-configured on comm-devices when deployed and each of these stationary or mobile comm-devices only communicate with those that they have be linkup with, creating the primary line of defense for structured network protocol. Once each hub class and/or node comm-device once activated, system computes destination communication routes variable to communicate with mobile comm-deices.

A similar program is used to verify data strings for maliciousness, if similar anomalies are found in either comm-device and/or comm-advice being sent, a message is sent directly to server through nearest Hub, Node of other certified comm-devices as a pre-configured distress call that transmits necessary data to assist in discovery; inciting system to move into a protective mode in certain areas, monitoring surroundings areas looking for similar anomalies from other devices. Wherein data is pulled from multiple Hubs simultaneously activating localized SentryHubs using TSF either blocking and/or computing location of malicious source node. Further this data is archived and continued to verify against incoming data at any time in the future.

The process stated above is the same within the movements of data from comm-device to comm-device and/or from or to another server from/to a server, and/or to be printed out, searched for whether from the internet through a secure VPI connection request and/or intranet and/or other archived data bases used to process, calculate, archive temporarily or permanently, for storage and/or to extract such records, and/or either to manipulate in any fashion as for calculations and/or data record analytics of any type and/or process. Further the security permissions are hard coded as to the specific comm-devices from the hardcoded SHID ID # and/or other unique identifiers either code generated and/or by other current means, servers and/or other static and/or mobile electronic or not storage devices, whether at rest, in motion onto another server an/or pushed back from/to another server, comm-device and/or sent to a certified third parties for informational analytics purposes and/or other items such as verifications, analytics, historical archives, maintenance items needed to be attended too and/or other certified entities. Such compiled data artifacts are viewable to any driver for only his historical record file, in an easy to use and accessible via a web based portal, and/or a realtime virtual interface such as without limitations to Obvipro on a PC, MAC and/or on other Certified Smart Comm-Devices, such as smart phones. PDA's, etc.

Archived data has an order to decay, once data is moved over to a secure encrypted repository for a period of not longer than 9 months for the purpose of analytics, legal disputes or for any other reasons such data extractions or requests are a PSE. All stored data after 9 months if moved over to another secure historical server with deletion end of data life not longer than 16 months.

Thus unless the time stamps and the device trail matches, the data is not securely transferred, handed off, moved and/or flows autonomously and/or by any other variations of similar movements. Therefore the integrity of that specific data can be challenged as in court, as to its creation point of inception, unless these data string contents match.

Move over informational knowledge is not transparent, unless it provides these items: the tMarker time line phase as to datas inception and/or will assist in copy rights protections for all web based searchable informational records whether they be images, pdf's, processor word documents for any operating system and/or OS on Mac's, Windows and/or on private operating systems that is shared or not shared and/or used to provide access to data in any form to compute, calculate, archive, of and/or other forms of readable documents and/or for mathematical alterations, binary or other coded process for retracing and/or retrieving searches and/or searchable data from the interne and/or intranet such materials for the purpose of to read and/or view and/or achieve, provisioning, the dissemination thereof, for processing and/or preforming calculations and/or for structured and/or non-structured decision-making, analytical computations, for any other informational analytics and/or for that matter to search from as to its location on any server to be used for printing and/or for other forms of manipulations.

In as much as upon each data fact is created, such data moves from, onto and through a comm-device and/or from one folder to another folder, from server to server, onto another device for computations and so forth. Tracking the datas forward and/or lateral movements, that is consisting of movement of such data from a comm-device, drawer, folder and/or any time data is at rest for whatever reason, can not move until only after the tMarker time stamp has been verified from previous movement from whence it preceded. If this event process does not take place, in that the data does not match the previous data's coherence verification, the data is not excepted. It is dumped, under all conditions. No data file can over take another, no file will pass onward unless verifications are synced, suspicious data strings are dumped and or not excepted like procedures are used based on situational awareness for each comm-devices.

Example: When you move a file from within a folder on a Mac, and the permissions are set as to who owns said data file [as with a particular comm-devices SHID# ID a unique binary #, which can also be a reveres binary encrypted number that has some characters and/or numbers missing purposely and replaced with a vertical or horizontal embedded algorithm (sort of like an offspring taking you to another code which is the real tMarker, adding another layer of security and/or other forms of coded language numbers and/or indices assigned to device, and these can also be embedded within a tMarker as a single layer of encrypted code used by system to verify integrity of datas transmission] and with the file being locked [similar to that of which the tMarker Trail vs. the time stamps match process]; you can still move file to another folder and/or server at another location either static or mobile device such as a PC laptop or Mac and should not be the case without a tMarker Trail. If these tMarker do not match, data is considered useless or non-verifiable, since it may have been modified, altered or re-created and record of change as to whom, what, where and how data file was altered does not exist. Once the Var√Chk Index is created the datas integrity becomes absolute, as too its creation inception point. Another example come to mind, wherein you see a image and or a data file displayed on a social media site and someone points it out to you, and behold you saw the same image and or data file two years ago and you questioned its inception at the first light of viewing.

However, on a Mac or PC the original file itself with the same contents from whence it was moved is regenerated, unless you cut and past, and you have no way of knowing which file was the 'original', hence the older files needs to be deleted, even when you move a file from one location to another position on hard-drive of any type there is remnants (artifacts) of the original file within the drive, and more so you have a known security issue with the data, file, document, pdf and any other type of readable matter, including those used for the purpose to computation and or legal purposes of any kind, and essentially the data is worthless as to its credibility or authenticity.

In summary, a mobile and/or static comm-device e.g. Obvipro and\or another certified device transmitting and/or receiving data to and/or from Hub comm-devices e.g. VectorHub Class devices, Nodes virtual or not and/or other certified comm-devices either mobile and/or static. Each device that creates data from its inception, a unique section of the entire string is created, followed by the next comm-device added too the string sequentially. Until such time that the data string that moved from the Obvipro and/or other certified comm-devices has three encrypted strings for that specific data, that are tokenized from a reverse binary data string: creating the tMarker Trail for historical purposes, the time stamp and finally Phase-Change Permission Check, creating a Var√Chk Index. Each of these indexes are extracted from the original transmitted data once data is ready for computational manipulations, arching or data requests from share holders such that each can be easily read and verified. The Var√Chk Index is the list of devices SHID, ESN and or any other unique identifier assigned to and hard coded to Avics devices, certified downloadable version for mobile devices that a registered serial number assigned to registered sync-d activation.

Each and every Data string effectually carries out the same process passing through, over, around and/or along spacial time until such time it reached another comm-device, onto until such time the data reaches a server and/or a repository server and/or time of rest at any point. Time at rest intervals are calculated from the time tMarkers exiting from a specific mobile or static comm-device, traveling in space and then enters a Hub, Node and/or other certified comm-device, server, storage and/or archived server, and/or a certified end-user requested data string with end of transmission mark, consisting of tMarker trail, Time trail, and the Var√Chk Index Once server has excepted the data string, of course all three strings are generated and another check is preformed, the data string hides that unique SHID key assigned to each comm-device, if matched it moves onto other verifications, if no match the data is dumped and archived. Server moves into a provocation mode as to this comm-devices integrity, requesting and/or bring up data strings from surrounding comm-devices and/or archived data to compare against further anomalies for any and/or all other comm-devices. Finally the inspection of both the t2Marker (time marker) and the tMarker strings comparative binary audit trail, if coincides simultaneously data is allowed to proceed, if no match a hold is placed for dumped query waiting for next string to compare against. Additional security protocols are acted upon based on pre-configure attributes, and or running data more than once each time until match points are established.

Each and/or every comm-device and/or virtual Node(s), Cubits and/or formulated from and/or by any type of electromechanical equipment, software and/or a combination thereof including the trace route taken from every server virtual and/or not, and/or other types of comm-devices, from the whereabouts the original data was generated at and/or from and/or collected from, entered, passed through and exited no matter how it was created either as encrypted printable PDF or not encrypted, word processor document, binary, and/or any other types of code display currently in use now and/or in the future; and/or that of which consist of images digital and/or virtual encrypted or not and/or any other type of data that is archived and/or for informational, computational, historical and/or for that matter created by other types electromechanical equipment and/or software and/or by other procedural events such as without limitations for any results displayed by mathematical means and/or measures; and/or created from and/or by each and every server, comm-device certified or not, by other types of electromechanical equipment and/or software, displaying including the path in a spatial time mannerism as to a map of lines and/or the spatial change in distance and/or time connecting those servers and/or comm-devices linked together tracking and displaying the entire path from whence each piece of data, PDF, scanned document, and all other forms of documentation no matter by what means such informational data was generated by and/or from any type of equipment, software and or by virtual means and/or by means of coded binary and/or cubits to generate and track datas movement from one location to another, for any purpose as without limitations to read, print and/or compute from and/or with, for archiving, historical purposes that can be shared and/or not shared displaying the exact path from whereabouts the creation inception point of each data fact started from.

Whether it was printed, scanned, virtually generated and/or any other such means data with the associated string originated from any type of comm-device and/or electric device whether mechanical electrical or not, that generates informational data and/or other types of informatics specific to that device that received and then transmitted said data, and that provides the full path from which the data moved from its creation inception point ending with its destination point and/or is at rest temporarily.

Once data moves to another device either from human and/or machine and/or program variable requests and/or auto feeds from any type and/or of procedures; such informatics become transparent, fully that is. As previously mentioned the same from pdf s and/or other documentations and/or other forms of informational knowledge and/or any other type of generated requests and/or conveyed on and/or from 'several and not infinite' number of predefined intervals time sets to choose from for where and/or when harvested data is requested, changes locations using Encrypted Data Push and marked if data is at rest temporally as to its time of idleness waiting for transmission and/or in the process of being transmitted and/or in a state of being at rest, once data is moved from any type of request both markers are generated e.g. the path left and the time data left from being at rest. Both the tMarker and t2Marker is generating continuously as data flows from its creation to a resting point and beyond, until at rest again along with the time data has been at rest and/or with other information such as servers locational information and more as pre-configured by requester of such data and/or pre-configured from pre-programmed attributes and/or other variables.

The process is very similar to finding and/or displaying the path of a document on any server, however when searchable documentation are currently found, displaying the full path does not exist. Thus the datas objectiveness in its creditability as to documentations creation and/or existence is deficient. Such generation is called 'tRoute Marker', 't' stands for time-stamp—TRM, and is the complete trace route the data took from its 'tload stand' (defined as any comm-device that is link-syncd with other devices within VPI) and/or comm-device back to the requesters marked position. Whether a comm-device where the data is simply passing on to another comm-device and/or any other type of electromechanical device of any type and/or a human involvement to read data. If document is altered in any fashion, redacted, what ever the reason is for computational, comparative analytical probabilities and such and/or other required modifications the original document never changes. Each sequential revision creates a new document in the back ground, that shows a complete history of time, locational point as to exact long/lat, assigned ID# that reflects a human, a machine, a process and/or a processing equation, the reason forecasting data alterations, server locational data, the company whereabouts informatics was needed, changed and the like. Displaying a 'full audit trail' seamlessly displayed in an encrypted warped exponential binary code and/or cubits using similar exponential code, the final character string generated which maybe encrypted.

Displaying a marker such that all registered and/or sync-d comm-devices equipped with 'Avics [(and/or by other names) iChipset' this depends on what country the infrastructure is geared too regarding the language name]/Hub, Node and/or a virtual node and/or a cubit node and/or similar named nomenclature means for any type of comm-device in a virtual reality interface and/or all other certified Vector-Class [comm-devices conversing within a particle comm-device 'Load Networked' domain]/non shared and/or shared server (name)/repeat as necessary until distention point, and it too is automatically generated along with the time line mark—t2Marker and then Tokenized. Each marker string consists of a paired time stamp marker string (t2Marker) which matches up with datas path as to entry point in time and with device stamps (tMarker) for any comm-device it enters, passes through and time marked upon exiting any type of comm-device, hub, node and/or within a virtual interface and/or binary and/or any other type of certified comm-device and/or virtual interfaces display for viewing.

The mark-up character string for a Unix processing platform for each tRoute Marker consists of a creation timestamp such as: obvipro id#-long/lat exit time-stamp/enter time-stamp hub id#-long/lat exit time-stamp/enter time-stamp vectorhub class id#-long/lat exit time-stamp/enter time-stamp xyz server id#-long/lat exit time-stamp/ and so on. For windows unit the tRoute Marker consists of the following example: creation time-stamp obvipro #id-long/lat exit time-stamp\ exit time-stamp hub #id-long/lat exit time-stamp\ enter time-stamp vectorhub class#id-long/lat exit time-stamp\ enter time-stamp xyz server-long/lat exit time-stamp\ and so on. The invention process is one aspect of 'Encrypted Data Push' and/or that uses a combination of tMarker and t2Marker laced together in a multitude of sequential and/or spatial manners and/or encrypted then and/or tokenized and/or more than once as to encrypt/tokenize, adding another and/or multiple layers of security and/or for other searchable purposes for documents found on the internet and/or extranet and/or on intranet.

This same embodiment above comprising a similar approach as to the creation of the 'tRoute Marker' name as to and/or using a differentiation of this time-stamp; is used to archive data so that searching for a specific image, pdf, document virtual or not and/or for computation loading into mathematical equations and/or for any other conceptual means wherein data is in need to be manipulated for predictability of events current, present and/or future expectations. Simply by adding additional characters within the data string in a pre-configured universal authenticated protocol standard, referencing that specific documents created name, authors name, date/time and/or comm-device and/or electromechanical equipment wherein data results were calculated from and/or for and/or other data associations and/or relative too a specific document. Such data can be implicitly searchable in many predefined variations as to fields of search criteria, assist with datas explicit validity for computational measures and/or for copy right protection and/or other legal measures and/or used to determine cost, drivers and/or vehicles ability to navigate for the purpose of analysis by any industry.

Thus, documentation of archived data has a compartmentalize feature to not only preform searches for any data, said data extraction is seamlessly pulled for computational analysis and/or certain data can be extracted for computations right into the equation and/or other processes such as for record retrievals in the event of legal matters, and further enhances datas implied intelligent telematics integrity and/or for other shared uses and/or additional demands used for forecasting processes and/or for advanced trends across different cities infrastructures and so on.

These tMarkers consists of several alpha and/or numeric characters that are in some cases very long, since data is marked not only for comm-devices and/or servers, such markers indicate time data travels between comm-devices. Here is another aspect, computational mathematical equations can extract selected and/or randomized data from a certain comm-device either upon data strings entry to a given server to preform calculations as they arrive after being checked for datas integrity and/or after data is archived. Such datas search parameters and/or calculations extract data from specific comm-devices, wherein the search is narrow as to s specific time-stamp for all comm-devices from a certain hub comm-device, and/or from another comm-devices. These iMarkers—informational markers as to datas specific place holder location, accelerates search criterion and authenticates data inception.

If in the event that a comm-device, hub, node virtual and/or not and/or other means of virtually displaying these Markers and/or other certified comm-devices are in need of being repurposed for whatever reason. The NOS iChipset if removed and once disconnected it flushes the memory entirely automatically—a layer of security. Then comm-device is issued a new SHID ID# along with a new registered iChipset ID and/or update with a new NOS iChipset. Historical data from obsolete and/or updated comm-devices are archived, all data transmissions are marked, along with recognized data retention guidelines as for legality reason and/or other uses.

The process is somewhat elementary, binary that is. It is where data at this time frame in our technology knowledge span came from, the binary code, and may further use other means and/or nodes either virtual and/or not for notifications and/or computational equations, traffic directional suggestions and/or the like such that the entire invention displayed herein solely uses a quantum compass computer-apparatus to provide all aspects of this invention and/or all conceptual variations thereof that improves this intelligent telematics model—ITM. Every time a data inception string passing unto its prescribed/authorized and sync-d comm-device once transmission has been granted or 'locked on' permanently until given commands to disengage and/or taken offline and/or moved and/or stolen and/or due to vehicle off-line, or causing disruption in datas integrity and so forth. Wherein the next comm-device each of which is 'Load Networked' e.g. 'time sync-d' or simply 'tSync-d' with specific comm-devices that may be randomized for security and has a similar succession with no partiality as to comm-device next in line to communicate with and/or to a comm-device in a given vehicular movement in any direction.

The unique continuous data string generated from within each Obvipro and/or other certified comm-devices, such data strings transmission creates a 'tRoute Marker' which is a time stamp when data is transmitted and/or received by any hub, node device and so forth, until it reaches destination. Each data in and/or out the same data transmission is encrypted by from each device as it moves through comm-devices until arrives at a destination point of rest and/or continues on as data is moved again. Data is pushed, there is no pull—this is a security risk, since data intrusion jumps may mix with pulled data. Once excepted from a comm-device a tMarker is generated on entry, each comm-devices transmitter with each data string verifications are learned from the prior string and/or picked up by a comm-device as it was sync-d upon registration creating the 'tRoute Marker'—TRM is generated—no exemptions rule as being able to change permission rights from read only for each successive comm-devices entry to TRM that shows the t & t2Marker, along with the longlat information audit trail for the next device that touched the data and simply adds to the string. During entry and/or exiting an integer device within the next comm-device adds a new marker to the existing string, such completed string once arrived at a server location is verified and/or re-verified against previous and/or next data string and/or from surrounding comm-device data strings for the security of datas integrity. By generating that one unique completed 'tMarker' also known as traffic marker, each time upon being passed-on and/or moved unto the next device and finally comparing that sync'd match Paired-Key set assigned within the OS transmitted from NOS for this exact comm-devices ID, which is also hardcoded in NOS that generates the 'tRoute Marker ID#' with that specific time-stamp as it enters and exits any type of device and/or other certified comm-devices and/or any other type of electrical-mechanical device. A simple coded device places the time-stamp called an 'integer device' places a encrypted 'receptor time stamp'-'ecep' for each data string that passes through device, which is none modifiable. Wherein the OS verifies each 'tRoute Markers' entry and/or exit markers precious time, long/lat along with the previous comm-devices unique identification compared with a the time of being registered and sync-d within any given infrastructure, the string encompasses a binary code rapper that creates a unique ID also displayed in data string, that is encrypted then tokenized for transmission.

I[F] received data from a particular comm-device does not match then data string is discarded and/or dump the entire transmission, until matched markers from surrounding vehicular data from other tVectorHubs and/or SentryBeaconHub comm-devices tin the same vicinity, and/or that detect none sync-d/registered vehicles and/or transmission anomalies and/or has detected a comprised Obvipro's and/or other non certified devices, the process continues to attempt to located a match point, in doing so creates a new marker and/or archived for next comparison index, this mark is continuously compared to surrounding data flowing through each comm-devices randomly generating a new mark index. Therein another phase of security protocol protecting the data composition integrity flow.

Another pre-configured preferred embodiment in each comm-device is the transponder comprises the linkup. Once comm-device is energized within a given domains infrastructure, data transmissions encompasses another unique identification. Wherein the transponder sends an ID# in certain areas within the data string, for instance every $5^{th}$ character has this unique ID# and/or randomized position and/or device for security, from which it is encrypted and/or hardcoded within the NOS, and/or also sends to specific surrounding sentryhubs within that domains area continuing to maintain the foundational principal that further enhances a monitored infrastructure. Therein forming a structured network architecture, thus the foundational measure for the purpose of datas intelligent telematics reliability.

Allowing data to flow over the internet holds many security risks like unrestricted access points for code injections currently occurring now, arbitrary attacks from unknown areas and soon on. Thus there are known shortcomings in an open environment transmitting traffic data, such that data itself is not safe and/or has serious implications to data capacity to be trusted. Restricting datas environment within a closed and/or semi-closed channeled architectural infrastructure is not only safer, its easier to manage by controlling entry and/or access points, since each comm-device is linked-up to other comm-devices from authenticated access points, in turn moving data across comm-devices with their on private Ipv# for each municipalities that have been not only sync-d and registered with other comm-devices within each domains infrastructure, counties and/or countries infrastructure completes channeled telematics first line of protection, the thesis of this invention. Arbitrary maliciousness is easily discoverable, especially since each device will only communicate with other authenticated/registered comm-devices, completely ignoring others and transmitting these anomalies to sentry comm-devices.

Another security aspect comprising implementation similar to Mac address comm-links, is to allow and/or deny access rights primarily based on comm-devices SHID ID# in combination with comm-devices ESN number and/or other unique comm-device ID tag either in binary code and/or encrypted and/or enclosed in a encrypted rapper and/or generated by any mathematical and/or conceptualization methodologies, wherein this unique code string is created for Authentication and/or Authorization for data transmission acceptance to and/or from any comm-device and/or from/to servers and/or other electrical mechanical and/or virtual interfaces. This protocol is setup within upon comm-devices first transmission to another comm-device during initially being energized after the registration/sync-d process.

Additionally each stationary comm-device such as vector hub class devices has a corresponding long/lat assigned to each SHID # at deployment, increasing security and allowing channelized communication protocol enhancement as to data integrity transmission levels.

Further, within a random transmitted data strings, their is a Sentinel Code that detects attempted code injections during each transmission received. Once this data string and the enclosed Sentinel Code is excited by the disposition of the datas string, the data string is ear marked useless, upon arrival and accepted by next comm-device the transmitted data is sync-d with, this data string and those that follow are transmitted to closest server automatically induced by the excited code. Server sends back acknowledgement to continue transmitting this data string until it stops as to data strings that have been excited by the Sentinel Code.

Furthermore, all data strings permissions are set for 'read only' then only add new data comm-devices identities and other relative data of those devices that have been authenticated and/or paired and/or completed a registration event and/or the process of being symmetrically linkup together within a domains infrastructure an so on, for all comm-devices that the initial communicating comm-device that received data from either a portable comm-device such as a certified pAvics and or either vehicle equipped with Obvipro registered with, from its activation inception.

Thus created another level of security for datas integrity. Within this inventions preferred infrastructures framework configuration, the system and with each comm-device sync-d and registered process further compliments systems Constructed Network Protocol providing secure communications, all of which are essential elements of datas telematics architectural application reliability.

Non-compliant vehicles place a substantial burden on the cost of insurance over all for each driver in any country, along with the carelessness of humans drivability. After the first phase is brought into effective action, notably insurable costs are reduced by safer road conditions and more. These concerns fade away during the first phase of deployment by detection of a Registered Sync'd and Paired-Key activation process for pAvics, Obvipro and/or similar certified comm-devices, which are paired with vehicles data some of which may have to be entered manually via a secure web-interface; once deployed driver must call-in and/or through virtual encrypted interface linked only to infrastructures automated system entering system generated key on comm-device to generate a PairKey online to activate pAvics or Obvipro and/or other certified comm-devices.

The deployment of pAvics comm-devices and similar certified smart devices, has a software application for older vehicles available as a downloadable application linked to a smart comm-device—mobile and/or static that references data in a non-transitory computer-readable non-shared storage medium data base as to current tags, insurance and inspection status of which may and/or may not be manually entered; some data may be merged with VIN# automatically. Advanced comm-devices either mount on the windshield and/or under and/or on dash for older vehicles that have reduced OBD capabilities and/or under dash mount tied to OBD output with a simple dComlink that transmits all relative data available from the connection.

Further, when system searches local infrastructure for sync'd Obvipro's, pAvics and/or other certified comm-devices trace routes are determine for system networks average speed and density, data is compared from within isolated and/or any given areas network for comparative flow rates, computational analysis are compared with each offline and/or online vehicles in conjunction with prior historical data, any anomalies in topography and current and/or expected weather patterns, then data is re-verified against density from previous calculation, datasets are imaged over previous route data, analytical comparisons are recalculate, if destination variables match, digital comm-advice directives are sent out. Thus, Flow Rate is Calibrated by Density augmented by Topography and Climatic Expectations and other items.

Another advance preferred embodiment is destination lane acquisition; any given vehicle that is traversing several miles to its destination acquires positional rights to be placed in a specific land; the closer this vehicle gets to its destination point and/or exit node if on a freeway, directional advice directives are transmitted initiating movement towards the proper lane, preparing for ramp exiting, turning and/or the like. With each lane change notifications, corresponding notifications are sent to surrounding vehicles on the right and/or left to progressively open and/or lengthen a pre-configured positional point so that entry into the next lane is anticipated by surrounding vehicles, only slowing traffic down by increasing calculated spatial Phase-Change distance for a safe entry point; thus minimizing abrupt decelerations within certain vehicles an maintaining variable rate flow throughout the network area.

Furthermore, surrounding vehicles positional distance in strategically lengthened by adjusting speed variations to accommodate lane changes, system calculates these vehicle lane shifts with voice commands from iVocx and/or virtual on screen notifications, if equipped within vehicle assimilated with invectorhub calculable movements, along with notifications to specific vehicles for turn signal activation, along with breaking and/or depending on speed, just relaxing the velocity acceleration movement either by system generation and/or human activation and/or automatic combinations thereof, consisting of visual and audible voice commands with visual interface showing instructions and or actual movements of vehicle.

RFIDGPS transponder/receiver/transmitter iChipset eliminates the environmental challenges currently in place in having a high concentration of mobile comm-devices moving at variable speeds sequentially communicating securely in a channeled hierarchy. A comparison from each comm-device is able to differentiate a numerical value such as, without limitation a vehicles OBVIPRO VIN number and/or a smart device unit SHID ID and/or by virtual identifying measures, such as ESN # assigned to comm-device. Providing the specific location associated with each comm-device at any given phase-change spatial location during vehicles movements. Allowing an infinite number of derivatives combined into a single analytical recommendation driven by Optimized Overlay Modeling and/or by other current modeling means.

Thus, the invention displayed here yields attributes harnessed from virtual relative Vector Traffic Data Node Points from each vehicle locational movement, creating an Optimized Model generated by Dynamic Computational Algorithmic Architecture. Illuminating any change caused by perturbations which are then used to determine the current Logical Conceptual Design based on networks Computational Traffic Flow Dynamics by means of Quantifying Traffic Flow Dynamics merged with Vehicular Traffic Variables using Algorithmic Variations, creating Cybrintelligence where human knowledge is merged with machine language, the complete example of Transparent Informational Knowledge or in different light, another way knowledge controls machine outputs.

Logically, the conclusion drawn from this Nxgen Traffic System that optimizes information drawn from Uniform Traffic Nodes in a virtual interface vTelarc, quantifying simple positions groomed by mathematical arguments that creates comm-advice directives codified by datasets providing a finite number, specifying vehicular density in relationship to traffic flow destination—the dynamics of Rapid Traffic Congestion Flow Analysis. One of the main concerns from traffic congestion is simply the imbalance from the lack of Administered Organizational Control. Once density is managed, variations is speed implementation become foundational.

The present invention radically improves mobile locational comm-devices over an ad hoc wired and/or wireless framework, including fixed and/or mobile cameras for high crime rate areas, vehicular traffic violations and the like. Communications from digital packet data, consisting of various transmitting comm-devices, enables a medium that is responsive to each comm-device application deployed, and thus creating Channeled Telematics where those through acquired knowledge and/or skilled in the art of telematics can determine the boundaries are limitless as to systems functionality.

Further management includes selectively powering down street light when traffic is at its lowest, thereby further reducing our fossil fuel supply consumption rate by implementing this Nxgen traffic system; allowing vehicles to move as fast as possible without unnecessary idling, particularly the exhausted energy consumed breaking inertia, speed bursts and more that safely manages vehicular movements from these various embodiments. Each vehicle will eventually be able to navigate itself, from calculated recommendations based on traffic conditions by allowing reactive response interval feeds into each onboard vehicle processors system that emulates full auto pilot control, driver take over is obtained by voice command statement (e.g., release auto or manually turn off).

Traveling is enhanced by feedback to/from the system of the present invention that recommends planned routes based on communications from driver and/or audibly programmed, also known as iVoiceCommands (iVocx) either audibly entered within vehicles onboard vehicle processor and/or predefined routes accessed via virtual web based interface. Continuous data transmissions from hub comm-devices providing traffic artifacts, wherein system recomputes travel time variable variations, phase-change artifacts in relationship with other vehicles Network Traffic Congestion Artifacts (NTCA), based on information received from tVectorHub modules in respect to vehicular movements. The integration of Object Functionality Points or Proximity Integration determine the exact Phase-change spatial relationship with each vehicle and allows prompt reactive response interval feeds into onboard vehicle processor, allowing each vehicle with certified comm-device the ability that encapsulates logistical response times on preventative measures regarding accidental collisions.

According to one embodiment, encrypted maintenance data from a vehicle's OBVIPRO is transmit to certain types of VectorHubs using an authenticated and predefined data string format and routinely checked for data integrity composition. This authenticated predefined data format transmission are accumulated and analyzed for emission codes from vehicles outside regulatory guide lines, inspection and tags validity. Then archived and shared with local, state public safety and/or DOT agencies nationwide on communications interoperability issues with vehicle manufactures and/or dealers some advertisements maybe a PSE (paid service event) if a outside the normal maintenance scope for any vehicle, and/or for appropriate determination of service recommendation advertisements. These service recommendation advertisements are sent back to the OBVIPRO and include without limitation an indication that the vehicle is in need of some form of repair, scheduled maintenance, and the like.

According to one enhanced embodiment system generated notifications are broadcasted area wide within network infrastructure area to mobile devices such as: Obvipro, pAvics and other certified comm-devices that either automatically turn on head lights in the advanced deployment phase, and/or send visual and/or audible comm-advice directives to turn head lights on due to poor visibility from weather conditions and/or time of day sending and/or other reasons necessary to assist traffic flow safety.

According to one embodiment, the present invention monitors commercial vehicle speed, physical location, braking and acceleration patterns, rapid lane changes with warnings transmitted to surrounding vehicles equipped with pAvics, OBVIPRO's and/or other certified comm-devices within spatial vicinity for approaching commercial trucks. Monitoring specific time of day events are archived, rest time recommended intervals for personal and commercial vehicle drivers, destination arrivals, maintenance items, declining fuel notifications, inspections, designated lane and distance factors between vehicles based on density flow rates in proportion with weight loads, historical records of vehicles capabilities of stopping and other human factors.

This information is used to provide Traffic Data Factoring needed for risk-adjusted representation to improve road safety for every driver and provide a safer landscape that lowers insurance premiums for the trucking industry, personal and/or commercial vehicles provided as a PSE and revenue share with state and/or federal DOT and accumulated data is shared with state and federal and other tribal entities.

According to one embodiment, vehicles equipped with technologies that monitor drowsiness, and from driver attention towards reactive responsive patterns are compared with historical data from archives for relationship patterns of any driver. If consecutive repeated events of the same pattern take place where driver is most likely falling asleep and/or attentiveness is declining; notifications are sent to vehicle with recommendations of a rest stop at the nearest vector node location. System notifications are further sent consisting of audible voice statements to assist with aiding driver in keeping awake, along with directional recommendations that may include distances and time to destination audibly heard to further aid in getting driver to destination rest stop.

According to one embodiment, Obvipro, pAvics, tVector Hubs and system and/or other certified comm-devices deployed, conforms to the American trucking associations (ATA) standard. Truckloads (trailers) are monitored and continuously tracked, thereby maintaining the shipment location whereabouts at any given time and shared as a PSE for purchasers and insurers. Such information allows shipment costs and fuel consumption variables to be monitored on a minute scale, along with drivers performance and providing directional and other assistance on demand. Using traffic congestion lane variables, management decisions can be made to close certain lanes for certain types of traffic (for interstate and/or intrastate commerce trucks) during peak movements, thereby maneuvering traffic (packet) rates based on (packet) flow rates. By analytically resolving how much traffic is exposed and/or expected on different paths in advance (going to/from), encrypted calculated comm-advice directives are qualified by Advance Congestion Flow Routes (ACFR) in conjunction with Dynamic Analytical Rate Flow (DARF).

In one embodiments commercial and/or commerce trucking routes are imputed by way of a web based and/or a virtual interface from inside the truck and/or from trucking companies dispatcher; either from manually entering, and/or using iVoiceCommands that audibly fill in fields by merely speaking and/or entering the destination, pre-configured route previously archived within users account for each specific commercial vehicle. Further this can be accomplished to accommodate the companies dispatch office to enter data in a secure interface dedicated solely to this companies needs with real-time energy data compiling continuously as to precise location of every tuck, with time to destination, drivers uptime and/or downtime data and much more. These specific informatics can be shared with commercial carries insurance and/or bonding agents and/or other certified share holder entitles.

These particular trucks route are calculated in relationship with other trucking routes; wherein entered data is merged to create a convoy of trucks heading in a similar direction. Further traffic density determination is integrated into algorithmic models continuously updating the overlay model, incorporating local density flow rates from vehicular traffic within the same route. Manageability formulated with safety concentration on density, along with maintained distant variations between each truck from increased speeds, effectively providing lane isolation, commercial conveyances cost decreases proportionally. Other trucks are merged into this destination phase model. Continuously updating trucks either entering and/or exiting this configured route moving onto a new route and so forth, some trucks break ranks and merge with another established route with many other commercial vehicles are sent directional comm-advice directives as to which lane to be in and/or speed of convey based on spatial artifacts.

Fuel consumption variations are calculated against future traffic predictions along each leg of the route and yields manageability formulated with safety concentration on density, effectively administering traffic rates proportional to density providing lane isolation, commercial conveyances cost are further decreased.

Further, traffic may be managed based on personal inputs and/or by system pre-configured and/or driver decided routes, example trips to and from work. Once these destinations are entered into onto a vehicle's OBVIPRO, system computes traffic variables based on driver inputed route destination or modified as needed for alterations in certain vehicle routes. System computed data routes can be uploaded through smart comm-devices using pAvics (portable Avics) application hardware for older cars, and can be added with a simple plugin module on vehicles with OBD capabilities, such devices only check for basic engine functions, such as without limitation O2 senor operation and the like, along with long/lat positions. This module interacts with the pAvics application on any smart comm-device that provides a similar navigational experience for traffic comm-advice directives, advanced warning of up coming road hazards such as curves in road, hilly terrain, deer crossing areas and more, with speed adjustments based on a variety factors of the kind like human interaction responsiveness, type and age of vehicle, population density and other variables considered based on traffic density.

According to an enhanced embodiment, each pAvics is successfully integrated with current locational services in smart devices equipped will similar features as with accelerometers and/or a quantum compass, thereby allowing particular usage for cyclers, runners and motorcycles along with instant 911, locational services and more. Such routes are archived for uses to access via virtual interface, wherein user data consists to time, distance and other related necessities archived or deleted as driver needs changes.

Some tVector Hubs may be configured read-only while others may be configured with read/write tags that hold multiple pages of variable (changeable) data and/or fixed (unchangeable) data. The read/write tag may include read and write encrypted password protection and allows communication over an extended area and/or a number of lanes. Data can be updated on the tag as quickly as it passes a reader. More advanced tags may be configured with audio and visual indicators, and a message display for OBVIPROs and/or pAvics. These tags may be configured to use sound and light emitting diode (LED) and/or liquid crystal display (LCD) readouts to report the status of each data and/or toll transaction and/or in the case of emergency and/or dignitary vehicles and arrows on onboard vehicle processors displays to indicate to move right and/or left depending on calculable variations from current traffic artifacts and come to a stop until EMV and/or the like passes. With read-only tags such as for advertisements from any combination of entities using AlphaHubs, the data may be fixed, these services offered maybe offered as a PSE for advanced system integrations.

According to one embodiment, the present invention within Avics includes one and/or more RFID transponders/receivers and transmitter iChipSet. A basic RFID system consists of tags, antennas, and readers. The reader's radio frequency (RF) source is either integrated and/or a separate component. The reader broadcasts RF energy over an adjustable area called the extended read zone and/or reader footprint.

The tag on the vehicle reflects a small part of this RF energy back to the antenna. The reflected radio waves denote the tag's unique identification code and other stored data. The antenna relays the signal to the reader, which can add information such as date/time, vehicle's VIN# to the tag's identification code, and stores it in a buffer. The reader can then transmit the tag's identification code along a communication network to one and/or more processing systems, when traveling on a pre-configured route and/or a vehicle that has just entered the same route for a partial distance.

Incorporating modulated backscatter technology allows comm readers to communicate with tagged objects traveling in excess of the normally specified 100 miles per hour (160 kilometers per hour). This technology can also operate from as far away as 100 feet and/or more (30.5 meters). This highly stable, reliable, and reflective method of wireless and/or wired reader-to-tag communication allows automatic identification equipment within vehicles that transmits vehicles VIN# and/or by such as encrypted reverse binary ID# assigned to a particular vehicle as a unique identification and/or other pertinent requested data.

According to one embodiment comprising the present invention wherein vehicles approach to a comm-device utilizes Universal Plug and Play (UPnP) as a telematics service discovery mechanism for local hot spots. UPnP in the past was used as middleware in network environments, using a UPnP service discovery mechanism, vehicles are able to discover local services, digital comm-advice directives broadcasted automatically from comm-devices and use them without priori knowledge for any local wifi hot spots and its network locations creating another layer of security from the assigned SHID inn each comm-device. In other words alterations in comm-devices locations transmissions that may or may not be pulsating, parts of data is moved up the roadway to a different tVectorHub in the same directional movement of traffic adding another layer of security, to an/or from Obvipro may take place from randomized tVectorHubs, adding another layer of security that works quite well with SentryBeaconHubs and or Sentry Hubs comm-devices that monitor non-registered vehicle transmissions.

According to one embodiment, reflective, and/or passive, tags are used instead of traditional transmitter and/or "active" tags. Because the tag simply reflects the reader's signal, there are no frequencies to synchronize, and interference from other radio frequency sources is rare. Frequency changes can be made in the reader, eliminating tag recall. Further, reflective tags require less internal power than traditional transmitter tags so they have a longer life. They also have greater range than bar code, infrared, and/or other passive systems.

As is known in the art, an RFID tag is defined as active if a battery inside the tag housing provides power to the tag and/or the tag is connected to an external power source. A tag is defined as passive if it has no battery. In applications that use passive tags, RF energy from the interrogator powers tag circuits. The choice of active versus passive tags has consequences for overall system cost, initial tag cost, tag life, and battery life.

Passive tags have a lower overall cost due to low-cost tags and long tag life. The lifespan of passive tags is indefinite because the tag has no battery. The choice between active tags and passive tags is related to other system design issues. Active tags can support higher data rates and higher chip processing speeds, but passive tags also support data rates and chip processing speeds that are suitable for high-performance applications such as toll. Active tags can support user interfaces (lights and LEDs), but tag interfaces reduce battery life. A disadvantage of passive tags is that some countries do not allow sufficient interrogator power and suitable RF frequencies to support the range necessary for some high-performance applications.

Active tags have a higher overall cost in ownership including battery changes. Battery life is a primary concern for reliability and for cost of operation. In toll applications, for example, battery outages, which can cause RFID transactions to be processed as violations, are expensive and time-consuming both to users and toll road operators. Battery life depends on the battery capacity and the long-term average power drain. An overall view of tag cost must assess tag replacement costs for tags with fixed batteries and/or battery replacement costs for tags with user-replaceable batteries. Thus, each Avics iChipset encapsulated inside any VectorHub Class comm-device, Node and other certified comm-devices are equipped with solar panels to prevent outages and are equipped with either both passive and/or active read and/or read/write capabilities for any given deployment variable.

According to one embodiment, the remote exchange comm-devices includes an RFIDGPS transponder/receiver/transmitter iChipset having cellular capabilities for extended coverage due to environmental errors, such as without limitation weather, solar flares, and the like. Each tVector Hub may be configured to be routinely verified by an encrypted data push for original data composition. Random number and/or a selected group of comm-devices in certain areas are when communications are limited, combinational com-links may consistent of electrical grid, on and/or near telephone lines, and/or when necessary utilization of cable TV lines in areas where this might be the only alternative for a useful back-up for redundancy purposes.

On deployment a token is placed within each unit's core NOS (also known as the nuclex operating system). If the operational NOS is hit with a breach, such as a power surge, and/or the NOS has been compromised, then the NOS is rolled back to from a primary call from system to revert to the encrypted encapsulated original NOS status, deleting the older version—using current secure encrypted remote deletion technology. Data sent to each tVector Hubs is sent via one and/or more 'token sets' to each hub's NOS for security purposes, originally implanted as a unique identifier a hard-coded SHID.

System includes theft protection protocol, built into each Avics iChipSet. If a vehicle, including a truck, motorcycles or any other transport device such as bicycles are stolen, owner notifications are sent via a mobile application to system, the present invention may be configured to send a deactivate command to any type certified comm-device equipped with Avics iChipSet. when the vehicle is not moving for safety reasons and/or in a parking lot area, with possible siren activation. The GPSGIS navigational location is sent instantly to local authorities for pickup and investigation. This also maybe a shared PSE with local share holders and/or state and/or federal DOT and in turn see a major reduction in insurable risk and reduced of premiums.

According to one embodiment, each Avics iChipset is locked and hard coded into each OBVIPRO to prevent tampering. A fail safe code may be applied. If tampered with, the vehicle will not start sending a distress signal out and only a dealer will have the ability to re-activate, similar to key codes.

According to one embodiment, all sub navigational systems, also known as (Subnaysys) (e.g., cameras and/or mobile cameras for trouble areas, street lighting, traffic lights, tVector Hubs and Obvipro's and the like) are separate from each other on inputs to 'system'. Data feeds may be compartmentalized through sub-navigational systems for each comm-device type for security reasons. Data collections are verified as to VIN#'s locational address, results are computed and sent to 'system' to complete computational traffic flow recommendations possibly through a secure two-way paired VPI (Virtual Private Infrastructure) connection. At times archived data requests are sent to separate archived encrypted traffic data repositories using specific data vector call points (time intervals) from a particular sub-navigational system for analytical comparative computations and/or for legal occurrences as a PSE, in the event of an accident at any given intersection and/or roadways and/or private properties and/or any other kind parking lots and the like.

The architectural behavior within each infrastructure, systematically relies on itself for security. Data transmission detection for anomalies such as privileged user access and the associated users console, as to there possible associated threats in shared data is audited with through controlled access points for data requests solely from a dedicated server, never directly to given areas within the data base. Further these requests are sent to a separate server, such that only then the behavior of the datas requested information is tracked with tMarkers as the retrieved data that is requested for sent server or better known as SecServ' requested from a ArcSery along with ArctMarker post dating data as to its validity. The process encompasses real-time trackable monitoring, providing behavior threat intelligent analytics with configurable reporting for regulatory compliance levels from datas inception points to the transfer of shared demand calls from ArcNets, that are registered certified share holders servers where data requests are sent.

Such intersections that have accidents, requesting these vector call points along with corresponding virtual vector nodes prior to accident time-frame, can be retrieved from municipal repositories and are a PSE, in the event of a lawsuit filed and/or other informational matters requested by certified tribal entities. As with insurance companies now, the amount of data files compiled with this system regarding driver behaviorism accessible is staggering. The same goes from claims records from wind, hail, floods and/or other natural causes and/or for houses and commercial properties, the informatics generated from this system reflects predictable costs associated with similar cost of the same kind happening to the same structure any time in the future. The invention prepared provides data records, not only for locational points for every vehicular movement motorized or not, within a pre-configured requested time frame and/or specific distances between vehicles from any event, from those vehicles that approached the intersection along with the camera data images retrieved will coincide with vehicle speeds, Phase-Change Spatial Position in proportion to all other vehicles at the time of incident eliminates probabilistic arguments in the event of any type of accident.

According to one embodiment, sentinel hubs are used in school zones to protect children and in areas of known speeding occurrences. These Sentinel Hubs may be placed without limitation into small concrete structures by school zones light poles and use the steel pipe as an antenna, unbeknown to passing traffic. The amount time saved versus the revenue to expense in respect to safety officers can broaden the scope of this tech feed to minimize reaction times and save fuel and shifting man power to other needs.

According to one embodiment, protecting data transmissions is accomplished by using Encrypted Data Push Technology.

According to one embodiment utilizing RFIDGPS Isolation Integration, the location of each OBVIPRO (vehicle) is determined at all times, throughout the network, creating a dynamic isolation architecture that 'system' uses to compute traffic variables quickly.

The present invention is configured to include communications to/from each onboard vehicle processor, by either a vehicular driver initiated turn signal and/or by 'system' computational encrypted iVoiceCommand comm-advice directives and/or autonomously in the advanced phase of deployment.

Each activation (e.g. turn that may not be signal by driver, brake, and the like) in conjunction with vehicles operational request and/or 'system' driven inputs to OBVIPRO that activates a turn signal request, and the like, in turn will provide advance notification features given with and/or without iVoiceCommands and/or just visual displays of these commands on Obvipro's virtual interfaces screen.

According to one embodiment the surrounding drivers will know in advance of these operational maneuvers. These calculative suggestive corrections during a planned destination and/or an excursion, can signal other OBVIPROs, with adjustable variations to allow lanes changes and/or driver brake responses from other vehicular movements that is 'system' generated and/or by human intervention and/or autonomously or semi-autonomous. Thus, adaptive traffic lights, cameras and other current mechanical and/or human intervention that adjusts signaling operational modifications that respond to traffic congestion at any given intersection, is only part of the equation. Further divers are able to take over full control of vehicle, while 'system' makes recommendations as to speed variations minimizing traffic inertia parameters.

Another elementary embodiment the 'system' generates simple Authoritative Encrypted Digital Traffic Directives formulated from calculable data received from a variety of Vectorhub Class comm-devices, nodes and other certified comm-devices regarding the spatial position during initial deployment phase when pAvics transmissions notify specific vehicle for approaching a lane drift intentional or not the need to activate turn signals with recommendations from digital audible iVoiceCommands generated recommendations to surrounding vehicular traffic with evasive maneuverable recommendation either by just iVoiceCommands and/or audible comm-advice directives that are auto generated for those vehicles equipped with Obvipro's to activate and turn on blinkers as instructed when the need arrises in the final integration phase.

Either way everyone knows and has experienced the phenomenon that even with newer vehicles not to mention older transportation units, blinkers just don't work right. That being said, adjusting this one human error brings essential predictability; this one item can save many lives and change the entire landscape for manageability standardization within a traffic infrastructure. Further, lane change assistance initiated by driver and/or autonomously initiated by 'system' and notifying others vehicles in the area, for planned routes an always monitoring each vehicles location in respect to other vehicular Phase-Change spatial position and more.

The present invention comprises features such as Delimited Traffic Analysis updated continuously with Factored Time Constraints computed from each vehicles current Positional Vector Nodes archived and computational data encompass alternate destination routes based on Predicated Traffic Artifacts.

According to one embodiment, the present invention successfully collects encrypted observations and/or quantum vector nodes and/or associated points virtually provided by every vehicle throughout a domains infrastructure in a virtual interface within a given domain area infrastructure as requested in a localized area in relationship with other vehicles within the same infrastructure area, computing pre-configured speeds, lane turns and the like all based on designational precepts. Obvipro, the onboard vehicle processor sends out advisements on road conditions to each vehicle as to the volume of vehicles at any given time intervals with speed variations sending back encrypted calculated comm-advice directives and the like. 'System' obtains historical markers from each OBVIPRO, pAvics and other certified comm-devices as to Phase-Change Artifacts, that are later used to calculate future conditions on road congestion, maintenance problems, road congestions and/or expansions and the like, along with driver inputted obstacles on road-ways.

Thus according to present inventions embodiments, advanced warnings are formulated and sent to adjacent domains infrastructures during a programmed route or simply an excursion, system sends data for vehicular arrival time-frames associated with those vehicles approaching or expecting to enter the next infrastructures nearest domain. During this designated route as a vehicle moves along its configured and/or not route traffic forecasting data is sent from area vectorhubs as vehicle moves into a new infrastructures.

cVector (construction vector) Hubs are utilized for construction areas. cVectorHubs are temporarily deployed at the beginning of each road construction work zone, are configured to broadcast warnings and/or signals relating to speed reductions, route alterations, hazards, and the like, resulting from the construction area. The information provided by the cVector Hubs can be changed on will call basis so that modifications are updated as needed, due to construction completion and the like.

When construction permits are pulled to begin work, contracting entity requests for a registered cVectorHubs (Construction VectorHub) to be deployed by city and and/or state personnel. The data sets for these types of hub comm-devices are comparatively joined in any vehicles route trip, computational adjustments take into considerations as to any route density along these construction areas, maneuvering some parts of traffic towards alterations to bypass and maintain combined time variations in destinations arrival times based on speed.

These warnings and/or signals broadcasted by cVectorHubs are received by any approaching vehicles that have downloaded pAvics into comm-devices (Portable Avics iChipset). Since integration in the OBVIPRO for older vehicles are not available in the first part of implementation stages towards full deployment, utilizing pAvics will assist with full migration concerns, until older vehicle go out of service and/or register and/or utilize the benefits of pAvics.

Older vehicles may need alternative solution along with certified comm-devices, that being the case once migration is completed these older vehicles may have a different type license plate and/or for that matter all vehicles are issued one comm-device iChipset combined into either the plate and/or a windshield tag, in the event pAvics, Obvipro and/or other certified comm-devices are not being detected and/or used on any networks infrastructure.

Another security benefit comprising the use of one tag as stated previously, when all vehicular traffic is channel connected, since older vehicles, including newer transportation vehicles are equipped with only one tag that comprises both the inspection, registration and/or other fixed data with responder and/or transmitter that may and/or may not be combined with a receiver. Therein saving states and other entities a noteworthy amount of expenses across all avenues, including safety and further enhancing infrastructure security, since vehicles are detectable on any domains network, even without advanced comm-devices not being installed and/or active and/or registered.

Implementation of pAvics tied into older vehicles on board processor transmits only minimal data records, such as $CO_2$ and or $O_2$ functions e.g. is working and/or not working properly, Phase-Change spatial locational data transmissions, provides spatial location to surrounding vehicles in conjunction with each other, announcing such occurrences via the virtual interface with or without iVoice-Commands and the like. They can be arranged and/or built into a full screen, like a larger Garmin, TomTom and the like, by merely plugging the pAvics ECDLink into the OBD and/or OBDII connectors under dash, similar to when user's updated their older vehicles from AM radio to AM/FM cassette, then onto FM/CD, etc. These ECDLinks, encrypted comm-device link or ECDL's are installed via 'certified' registered technicians, wherein data is completely shared, the device and parallel port for diagnostic purposes and it locked in with a security iChipset inside ECDLink comm-device once sync-d, if removed will not work again by means of an internal code that flushes the OS if ever unplugged, tampered with, caused to have electrical current and/or data to enter. 'Certified' in the aforementioned statement and/or throughout this inventions display, means security levels background checks for personnel and/or equipment used. A pAvics device can have a LCD, slide out screen from under the radio device, and provides similar functionality for older vehicles not equipped with OBVIPRO providing a datalink for transmissions to and/or from Vector Class Hubs and/or 'system' and/or with other certified comm-devices.

According to one significant embodiment, driver sensitivity as to attentiveness variables in driving techniques are archived. These variations are then monitored, categorized and/or cataloged for each driver creating a data book, advancing predictable calculations maneuvering vehicles from comm-advice directives from foundational attributes for each drivers ability to react to other 'system' advice directives in relationship to drivers responsiveness, along with other drivers driving behaviors and/or limitations as to attentiveness responsiveness that is 'system' generated. Each driver is coded with certain algorithmic variables that have pre-configured limitations as to how 'system' generated comm-advice directives are transferred to each surrounding vehicular drivers virtual interface vTelArc. Generated from cached responsiveness of each drivers ability to react in given evasive maneuvers and/or other driver capabilities. Wherein this archived learning curve becomes comparatively complex depending on time of day, and/or day of the week and/or combinations thereof in relationship to a planned route, randomized destination for shopping, and/or work destination, with blended comm-advice directives mixed and/or correlated with surrounding drivers historical responsive data. This data becomes a bench mark for autonomous comm-advice directives based on drivers age, physical limitations, and other native concerns such as concentration levels, marital status and/or wherein data is continuously updated and comparatively analyzed against configured conclusions not just with a particular driver, such data is comparatively analyzed with any person within this class of variations as to age, gender and the like and in combinational comparative analytical data forecasting simultaneously other similar driver attentiveness in other classes.

According to one embodiment such Delimited Traffic Analysis is updated continuously with Factored Time Constraints computed from current Positional Traffic Vector Nodes encompass alternate destination routes based on Predicated Traffic Artifacts. Including possible ticket notifications of inappropriate passing of school busses while loading and un-loading, excessive speeds, lane changes without notifications, passing in a no passing zone and the like.

According to one advanced embodiment Digital vTelarc GPSGIS Overlay Modeling and/or Quantum Positioning Overlay Model and/or current virtual modeling means; for all traffic signage, including but not limited to traffic intersection lights is displayed on Obvipro's screen saving both state, counties and federal DOT's thousands of millions of dollars. iVoiceCommands and visual notifications are sent to advise and/or warn drivers for oncoming road traffic modifications, intersections and the like.

According to one embodiment which may and/or may not be encrypted a Digital vTelarc Overlay model also known as Vector Telematic Architecture; this Overlay Modeling is generated by Quantum GPSGIS Positioning and/or current virtual GPSGIS modeling means, focusing on structured presentations that are separated as to universal syntax code semantics for tags, elements and attributes, providing virtual accessibility features with internationalization, adhering to a processing display code that does not allow modification, injections and/or other alternations after the fact, and further provides improved 'secure document renderings' for virtual traffic lights, street locations, surrounding buildings, alternative routes and moreover all viewable in a virtual reality interface and/or screen, accessible on Obvipro, pAvics or other certified smart comm-devices.

Accordingly these embodiments known as vTelarc comprises on demand features that can be toggled back and forth using iVocx's—voice activated command system with vehicles installed with Obvipro and/or other similar certified comm-devices, requesting visual activation for DOT cameras for on screen viewing, on demand channeled weather, turn blinkers activation that sends notices to 'system' in turn calculating and sending digital notifications to surrounding vehicles with variations in lane positions and/or incorporating speed adjustments to accommodate a graceful repositioning of that particular vehicle into the requested or 'system' generated lane position.

The present invention comprising a Digital vTelarc GPSGIS Overlay Modeling from Quantum Positioning Overlay and/or similar virtual modeling means, the end viewable interface viewed with code written from XHTML, HTML5, XML, XSLT and/or current none modifiable display code that simultaneously produces traffic vector nodes on a virtual display screen that provides images for warning signs, traffic lights, speed variations, curves in road ahead and all other signage being used concurrently and/or in the future, that may and/or may not be digitally encrypted when transmitted by 'system', effectively exhibits exactly where driver requested roads are, with 'system' overtures as to implicit details.

According to the above enhanced embodiment, the present invention utilizes existing GPSGIS earth mapping satellites and/or current technologies that enhance details of any given roadway and surroundings in any country. Thereby, saving municipalities, states and/or other countries significantly, and continue to reduce traffic expenditures; making a safer traffic landscape and minimizing associated fatalities when accidental contact occurs with traffic signage and decreasing fuel consumption in manufacturing these items, including material and labor costs for all signage. This paradigm shift means many more technical jobs, both hardware, software, monitoring, storing and sharing data and more.

According to one advanced embodiment, with the ever increasing concerns with patterns of abrupt atmospheric condition changes, weather forecasting modeling will narrow in areas to a few days. Thus, there is the need consisting of continuous digitally enhanced localized updated atmospheric conditions presented in 'virtual channelized' data feeds from real-time comparative data feeds from NOAA, ECMWF and other countries weather predicting agencies. Perhaps deployed through local academic facilities also referred to as iNavCom Centers; some parts of which maybe a PSE (paid service event) for advanced real-time features that incorporates encrypted digital weather modeling for any given traffic area on demand and/or as requested and displayed on iNavX2. Such revenue generated helps to provide and cover infrastructure costs and/or pay those academicians generating channelized weather feeds.

Figure 1B:
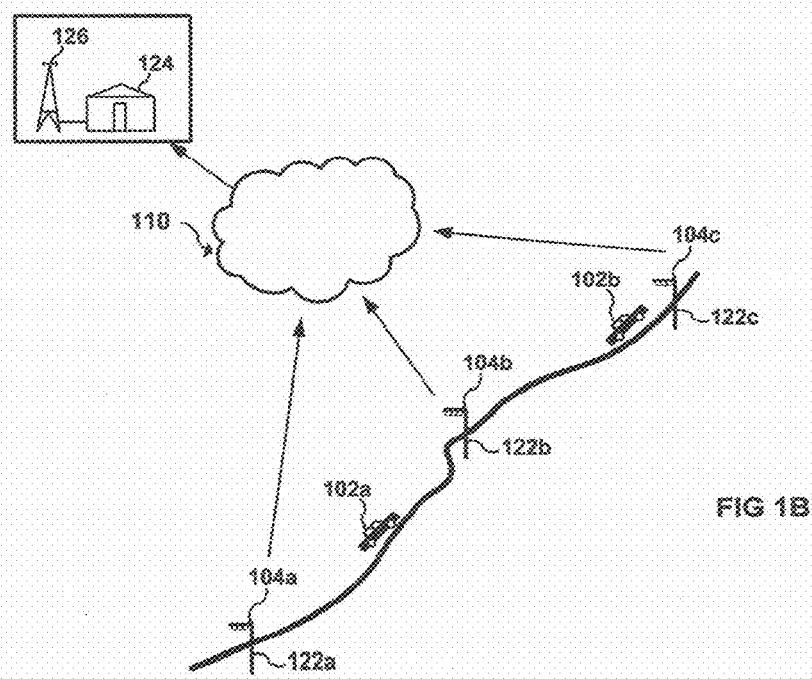
Figure 1C:
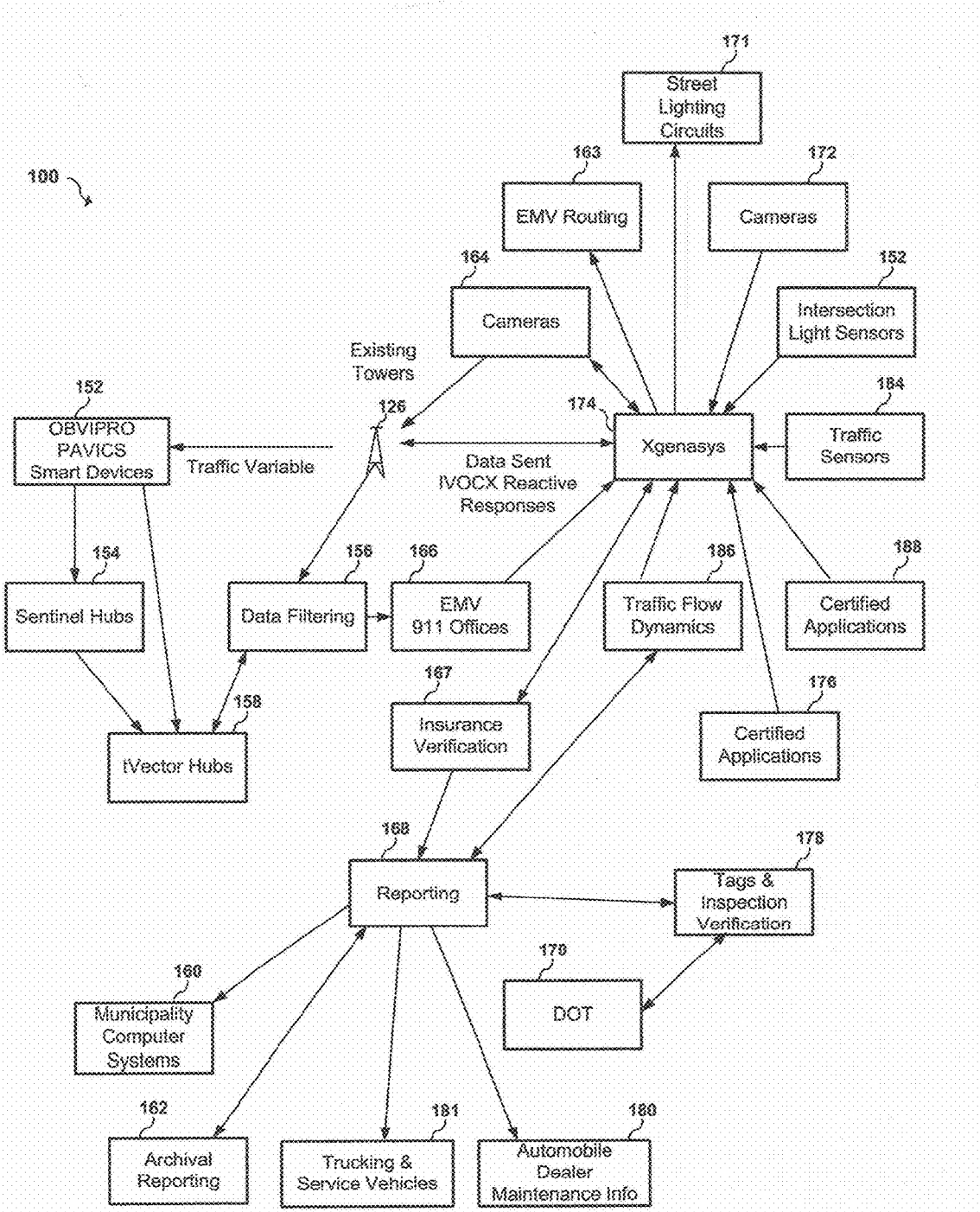

Referring to FIGS. 1A-1D, block diagrams illustrating a method for monitoring and managing traffic flow in accordance with an embodiment of the present invention are shown. According to this embodiment, the 'system' includes one or more computers 112 in communication with one or more databases 114. The one or more computers 112 are in communication via a network 110 with a one or more vehicles 102, one or more receiving stations 104, one or more governmental agencies 106, and optionally other sources 108. The one or more vehicles 102 are equipped with one or more transmitting and receiving that periodically transmit data to the one or more receiving stations 104. The transmitted data includes geographic position data for the one or more transmitting and receiving onboard the one or more vehicles 102. As shown in FIG. 1B, as the one or more vehicles (102a and 102b) travel along one or more roadways, they periodically come within range of one or more receiving stations (104a-104c) (or tVector Hubs) attached to respective one or more roadway locations (122a-122c). The one or more transmitting and receiving on the one or more vehicles (102a and 102b) may include RFIDGPS transponder/receiver/transmitter iChipset is integrated with cellular capabilities for enhanced distance. Data from the one or more vehicles (102a and 102b) is transmitted via the one or more transmitting and receiving on the one or more vehicles (102a and 102b) to the one or more receiving stations (104a-104c) within range. The data is transmitted to one or more computers 112 in communication with one or more databases 114. Without limitation, such transmission may utilize existing wired or wireless gigabit networks and/or use electrical lines or different mobile communication networks, such as without limitations UMTS, WLAN, and WiMAX and/or CTP and not limited but in support of advanced communication networks that can be extended to support other advanced IP networks, such as long term evolution (LTE).

For instance, the data may be communicated wirelessly to a communication tower 126 which is then relayed to the one or more computers 112.

The one or more computers 112 calculate the likely individual routes of the one or more vehicles (102a and 102b) and the estimated transit time based on the received geographic positioning data received respectively from the vehicles. The individual routes and times are refined as new geographical positional data for those vehicles is periodically received. This may be achieved by a number of different positional system technologies which are available for calculating geographical positional information. The road data used in the present invention is generally in the form of an encrypted data file.

Figure 1D:
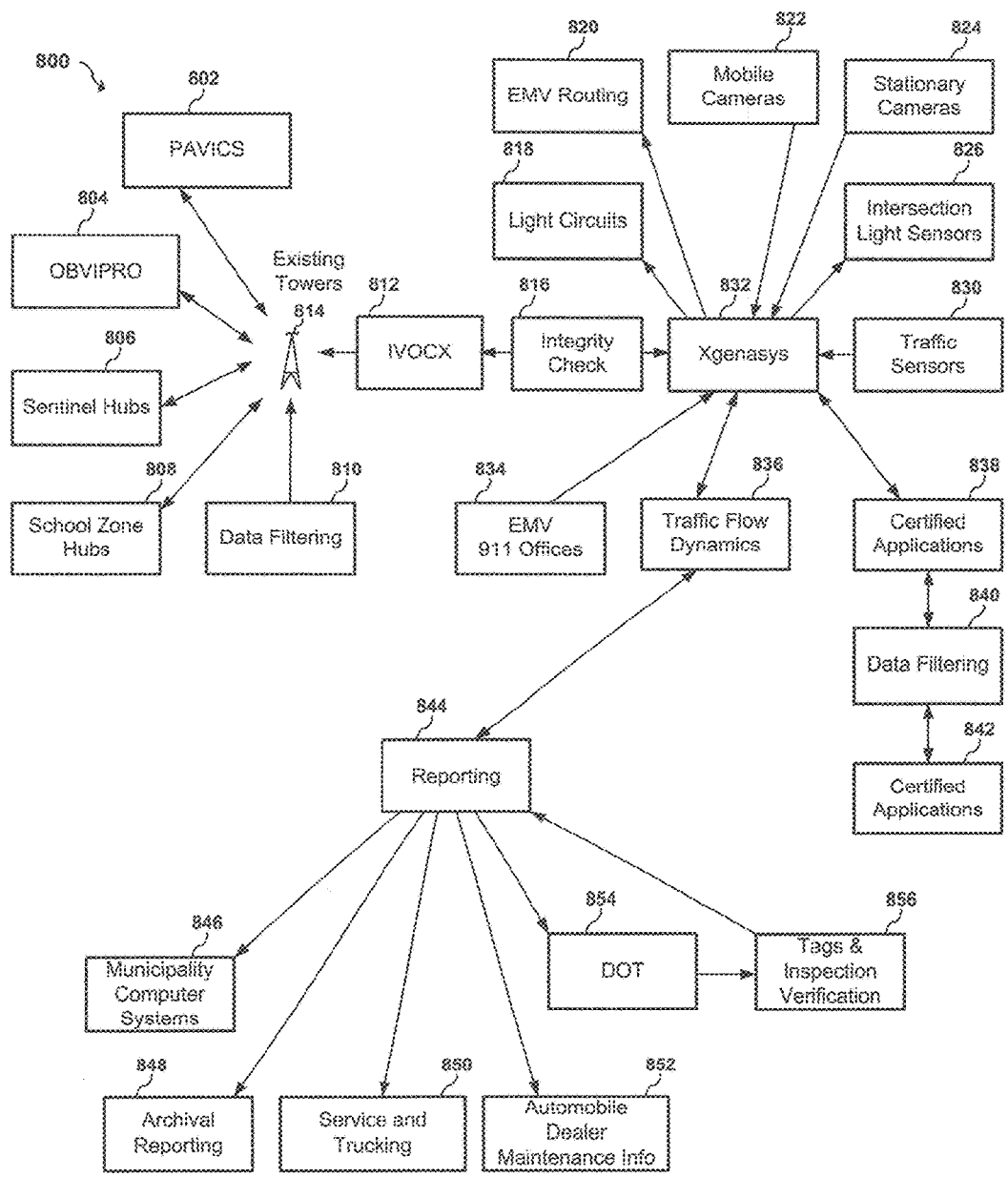

FIG. 1D is a block diagram illustrating a method for toll roads providing overall procedural steps during a pre-configured trip to work.

Referring to FIGS. 2A-2F, flow charts illustrating a method for monitoring and managing traffic flow in accordance with an embodiment of the present invention are shown. As shown at block 204, if a vehicle is within range of a transponder/transmitter, then processing continues at block 206, where a signal is received from the vehicle. The comm-device may be an RFIDGPS transponder/receiver/transmitter iChipset or the like. The vehicle transmitting and receiving data is received by the receiver and communicated to the server at blocks 208-210. At block 212, the vehicle transmitting and receiving data is stored in a database along with data received from other vehicles. The geographical positional data is filtered to ensure data integrity using each vehicle's VIN# against archived data, at block 214.

An optimal traffic flow pattern is periodically calculated at block 216 using vehicle transmitted and receiving data from multiple vehicles over time. This optimal traffic flow pattern may be based on without limitation road congestion. An indication of road congestions may be calculated as the difference between the calculated average speed and the normal average speed. Further, by counting all of the vehicles using a particular road, it is possible to estimate the volume of the traffic on the road. These trends and effects of changes can be analyzed and properly reduced to merely topography and climatic expectations, in conjunction with expected human response efforts feed from each OBVIPRO that is blended within the infrastructures status. By analytically resolving how much vehicular traffic is exposed and/or expected on different paths in advance going to/from, by 'system' generated encrypted calculated comm-advice directives are qualified and quantified by advance congestion flow routes in conjunction with dynamic analytical rate flow (DARF).

At block 218, topography and climate data is integrated. Traffic flow modification information is sent to manage and modify the general or specific traffic flow, at block 220. This traffic flow modification information may be directed towards traffic lights at one or more traffic intersections to adjust the general traffic flow light timing at traffic intersections or freeways and toll roads. Traffic flow modification may also be directed towards specific vehicles to suggest alternate routes, and granular decelerate/accelerated speeds recommendations, also known as impulse speed variation recommendations, from the tVector Hub modules that can be reduced down to analyzing the entire infrastructure area so that a continuous movement is in place. At block 222, data is pushed to the OBVIPRO, for system area corrections compared against surrounding vehicular data inputs. Trip variables may then be recalculated at block 224.

Figure 2A:
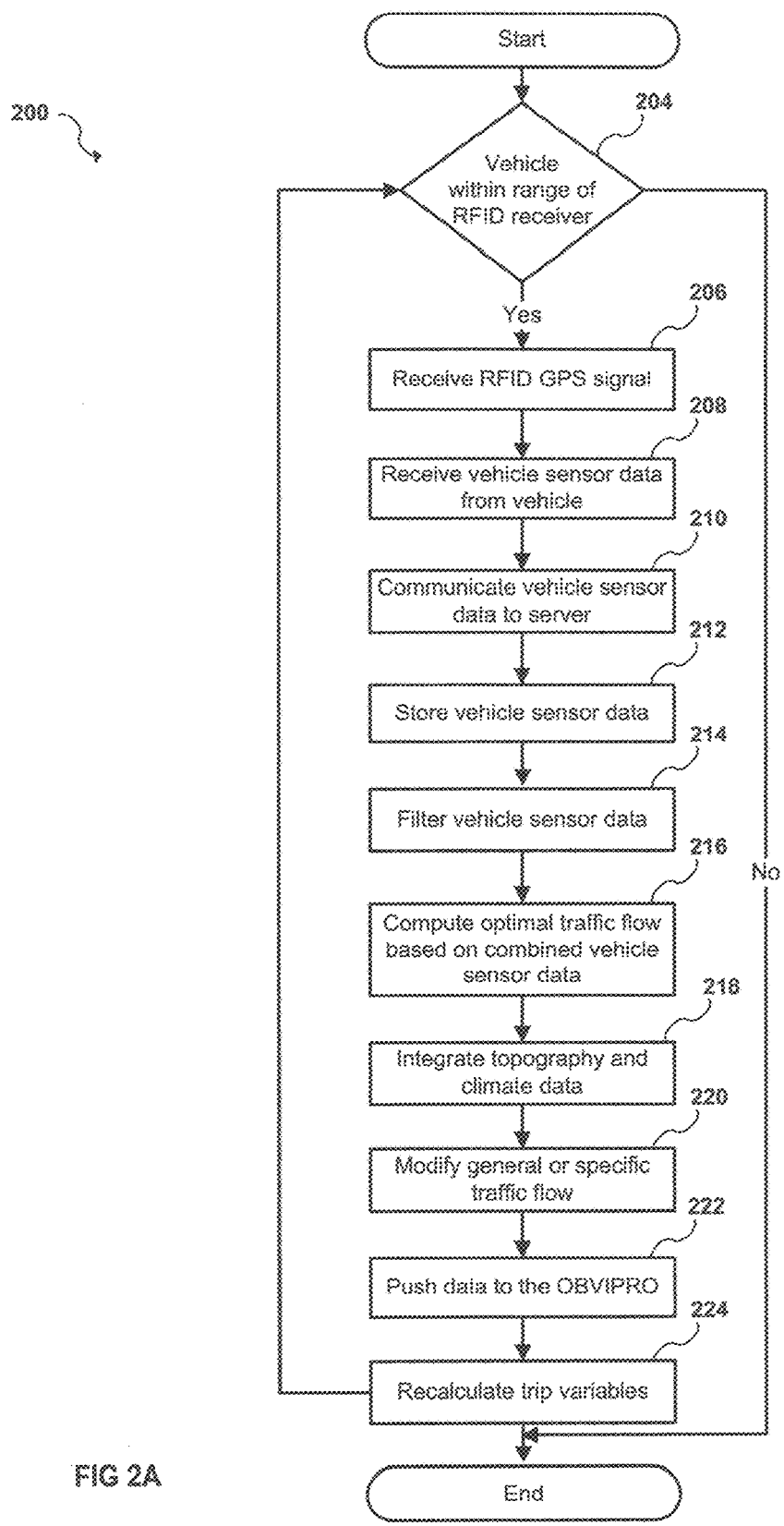
FIGS. 2A-2F are flow charts illustrating a method for the managing and monitoring of traffic dynamics in accordance with embodiments of the present invention.
Figure 2B:
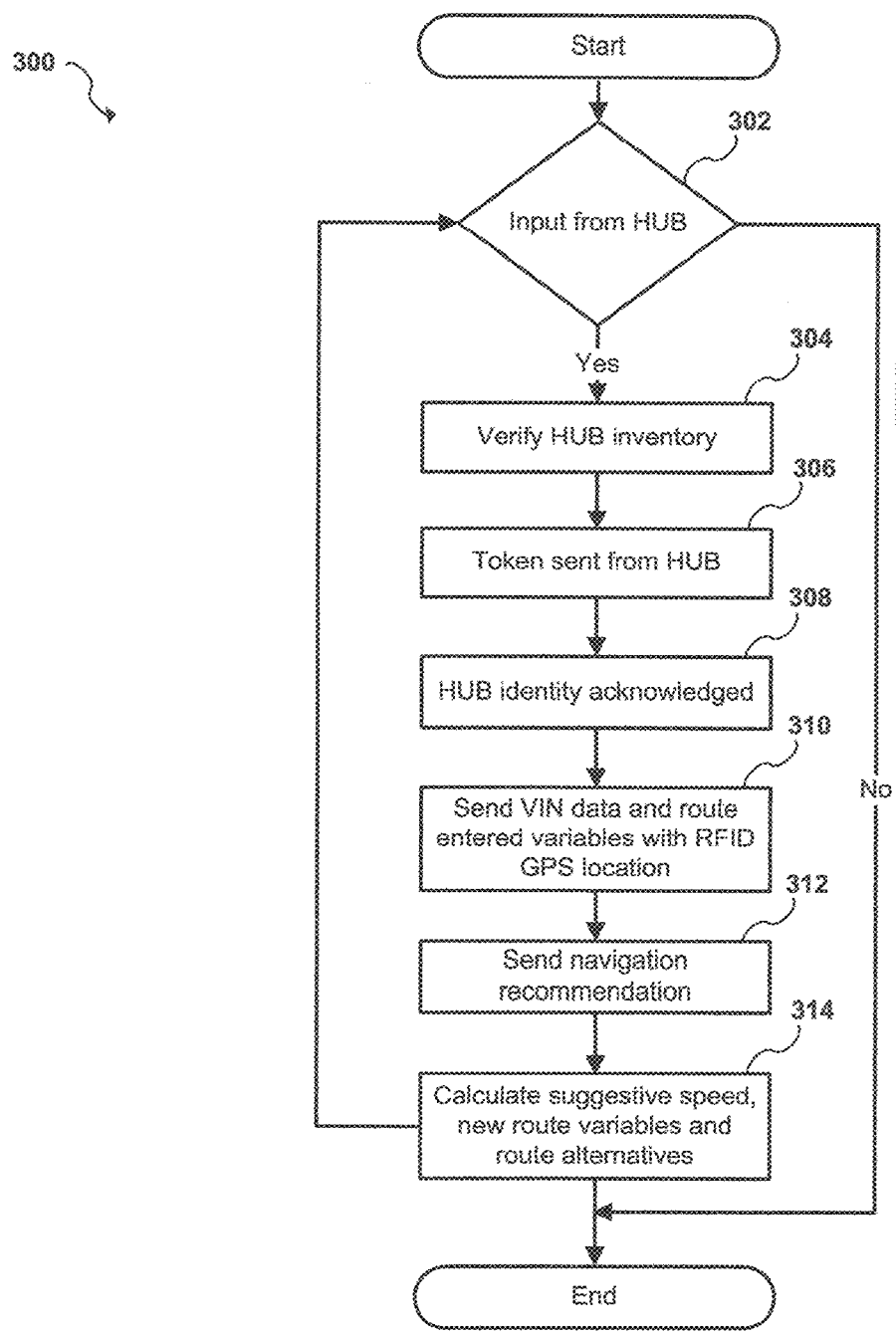

Referring to FIG. 2B, a flow chart illustrating a method for monitoring and managing traffic flow illustrating communication between 'system', tVector Hubs and each OBVIPRO in accordance with an embodiment of the present invention is shown. As shown at block 302, whether there is any initial input to a localized tVector Hub from any onboard vehicle processor is determined. If there is initial input to a tVector Hub, then processing continues at block 304, where the tVector Hub inventory is verified. At block 306, a token is sent from the tVector Hub to 'system'. System acknowledges the tVector Hub's identity, at block 308. At block 310, vehicle identifying information (VIN) data and route entered variables with RFIDGPS transponder/receiver/transmitter iChipset—better known as 'Integrated Chipset' location is sent from the tVector Hub to 'system'. Navigation recommendation requests are sent to OBVIPRO at block 312. At block 314, suggestive speed, and/or new route variables and route alternatives are calculated.

Figure 2C:
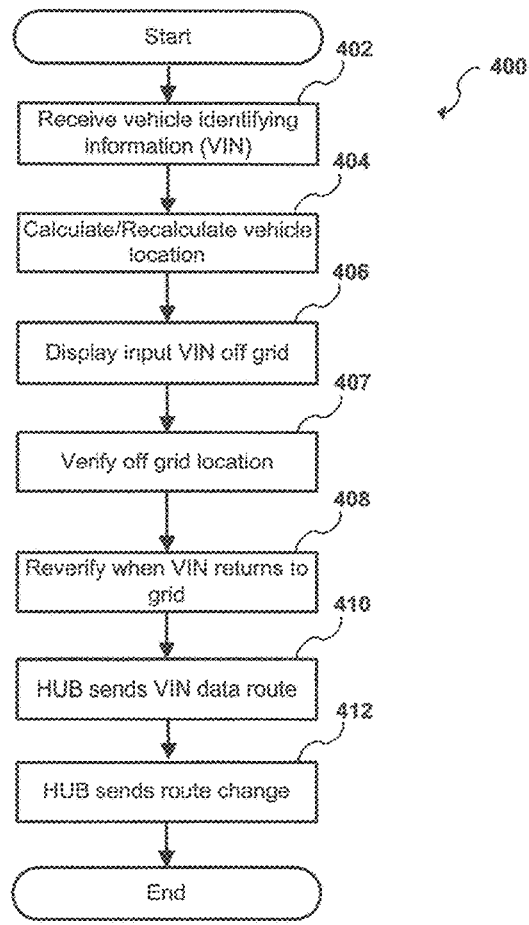

Referring to FIG. 2C, a flow chart illustrating a method for monitoring and managing traffic flow illustrating the 'system' in accordance with an embodiment of the present invention is shown. As shown at block 402, vehicle identifying information (VIN) is received. The vehicle location is calculated and/or recalculated at block 404 using input from one and/or more tVector Hubs. At block 406, any off grid VINs are displayed. A re-verification occurs when the VIN returns to the grid at block 408. At block 410, the tVector Hub sends the VIN data route. Route change information is sent at block 412.

Figure 2D:
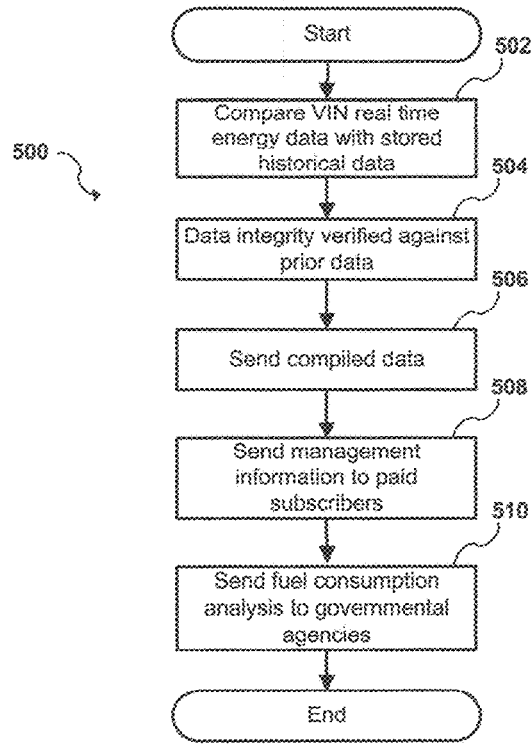

Referring to FIG. 2D, a flow chart illustrating a method for monitoring and managing traffic flow illustrating the sub navigation system in accordance with an embodiment of the present invention is shown. As shown at block 502, VIN real time energy data is compared with stored archived historical data. The integrity of the data is verified against prior data at block 504. At block 506, this information along with other compiled archived data is sent to system for calculations. Any management information may be optionally sent to paid subscribers at block 508. At block 510, fuel consumption analysis is optionally sent to one and/or more governmental agencies.

Figure 2E:
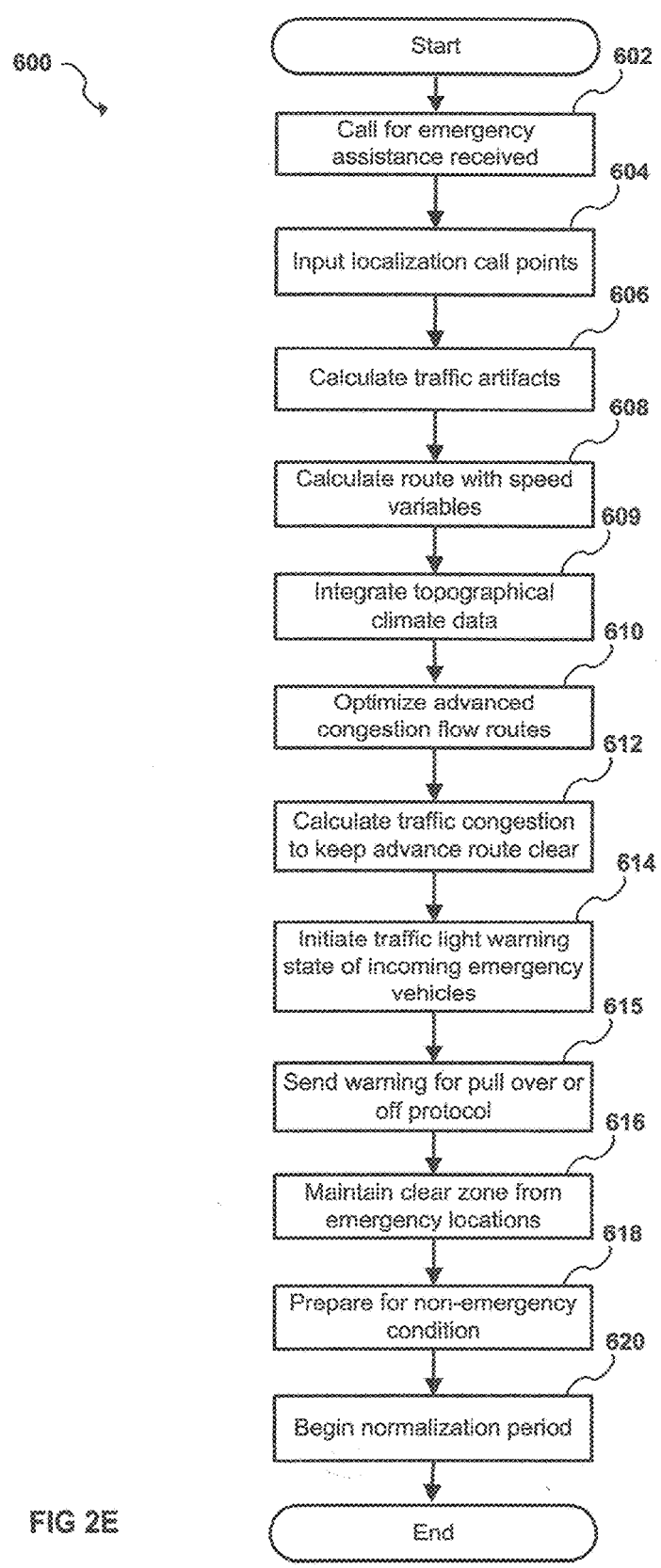

Referring to FIG. 2E, a flow chart illustrating a method for monitoring and managing traffic flow illustrating emergency vehicle routing in accordance with an embodiment of the present invention is shown. At block 602, a call for emergency assistance is received. The localization vector call points and/or route vectors are input at block 604. At block 606, network traffic congestions artifacts are calculated. An optimal traffic flow pattern is periodically calculated for the emergency vehicle to reach its desired destination at block 608. At block 610, congestion flow routes are calculated, based on vehicular localization from calculated Phase-Change Spatial density compared to the emergency vehicle route (or "EVR"). Vehicular traffic is advised to move to one side of the road, based on whether EMV has to turn and/or traffics predicated current and/or expected density within the route.

At block 612, traffic flow modification information is sent to manage and modify the traffic flow for the emergency vehicle to optimally reach its desired destination. This traffic flow modification information is typically directed towards traffic lights at one and/or more traffic intersections to adjust the general traffic flow along with light timing at traffic intersections and further displayed on vTelarc , at block 614, which may include initiating a traffic light warning of incoming emergency vehicles. The traffic light warning may be of any type including, without limitation, all lanes become Red at the intersection point the emergency vehicle will cross next. Otherwise, as many have observed some drivers do not obey right of way for EMV, thus all interactions points must be Red for safety reasons. While those that pass through these corridors inappropriately, 'system' detects and sends event records to prescribed handlers for possible violation infractions. All other intersection ahead begin flashing lights yellow along the pre-configured route, warning other vehicles of an approaching EMV and/or dignitaries and such and/or setting up a clear path to destination. Once EMV passing through this intersection where lights are all Red, each intersection light past the previous light moves back to all lanes yellow flashing. This synchronization occurs after the last EMV dispatched moves past each light, while entire route is maintained Red flashing and/or not at all intersection lights until such time EMV's arrives at incident location and/or route clear of regular traffic, only then lights resume operational functionality. In the eventuality of a fire and/or similar situation, wherein emergency vehicles and/or personnel are stationed, this areas traffic is re-routed until such time situation has been determined stand-down status and/or resume neutral for traffic.

At block 615, activation of advance warnings sent to each OBVIPRO within the emergency vehicles route, via hubs and/or wirelessly along the route, thru voice commands and visual warnings on OBVIPRO, using arrow indications of the direction to pull over to. A clear zone to be maintained for the emergency route location(s) is created, at block 616. At block 618, the 'system' is prepared for a non-emergency condition. The normalization period begins at block 620.

Figure 2F:
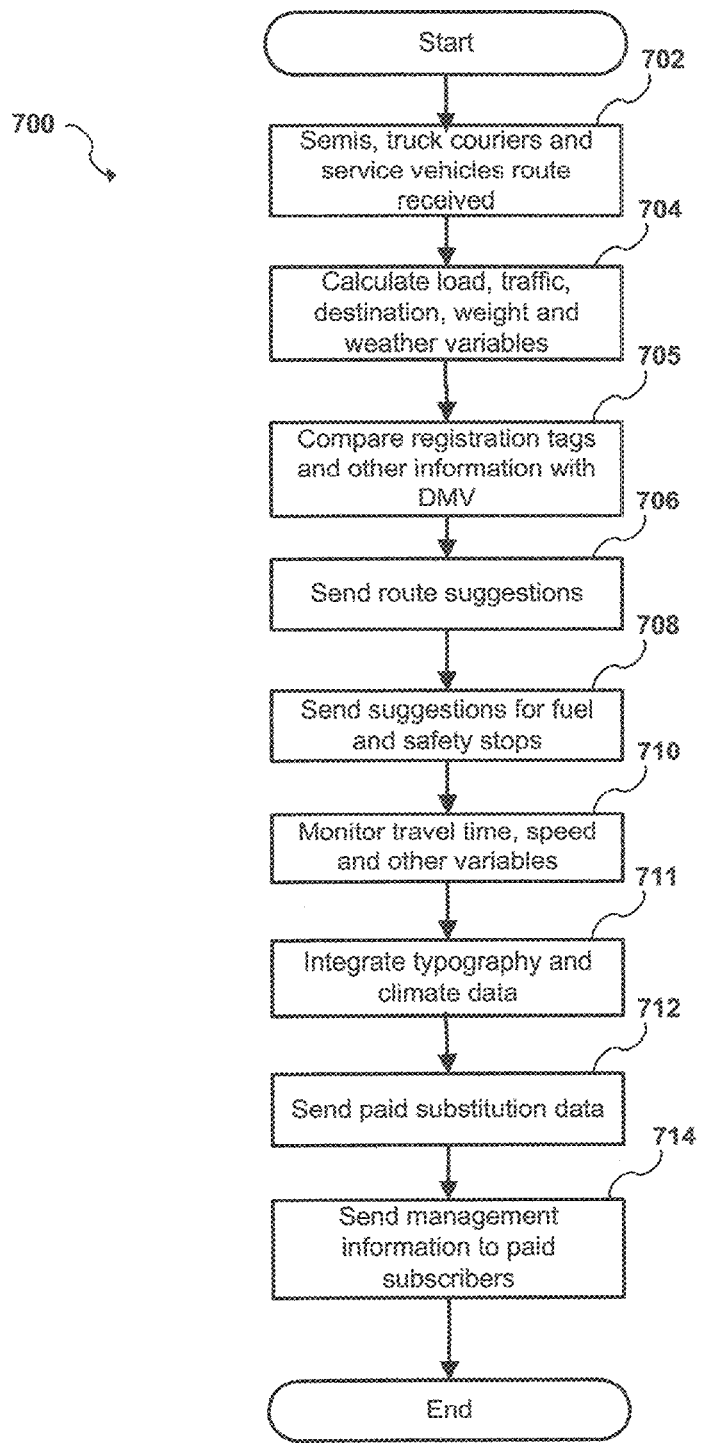

Referring to FIG. 2F, a flow chart illustrating a method for monitoring and managing traffic flow illustrating tracking commercial vehicles in accordance with an embodiment of the present invention is shown. At block 702, the destination route is received for a semi-truck, truck courier and/or service vehicle route. The load, traffic and weather variables are calculated at block 704. At block 705, registration tags, last known inspection date and/or other informatics are compared against DMV records. At blocks 706-708, route, fuel and safety stops and/or maintenance recommendations are transmitted.

The travel time, speed and other variables are monitored at block 710. Typography and climate data are integrated at block 711. Optionally, subscription data and management information is sent to subscribers, at blocks 712-714.

According to one embodiment, a secure user web-interface is provided to allow user access to the geographical position data over a computer networks infrastructure. Historical geographical positional data and/or any other stored informatics on the server may then be viewed over the network, such as the Internet, and/or as a PSE by subscribers transmitting non-executable data and/or images with non-changeable code transmissions. These subscribers can send entertainment, fuel and other necessities via certified applications that are filtered for application integrity and security.

Figure 3:
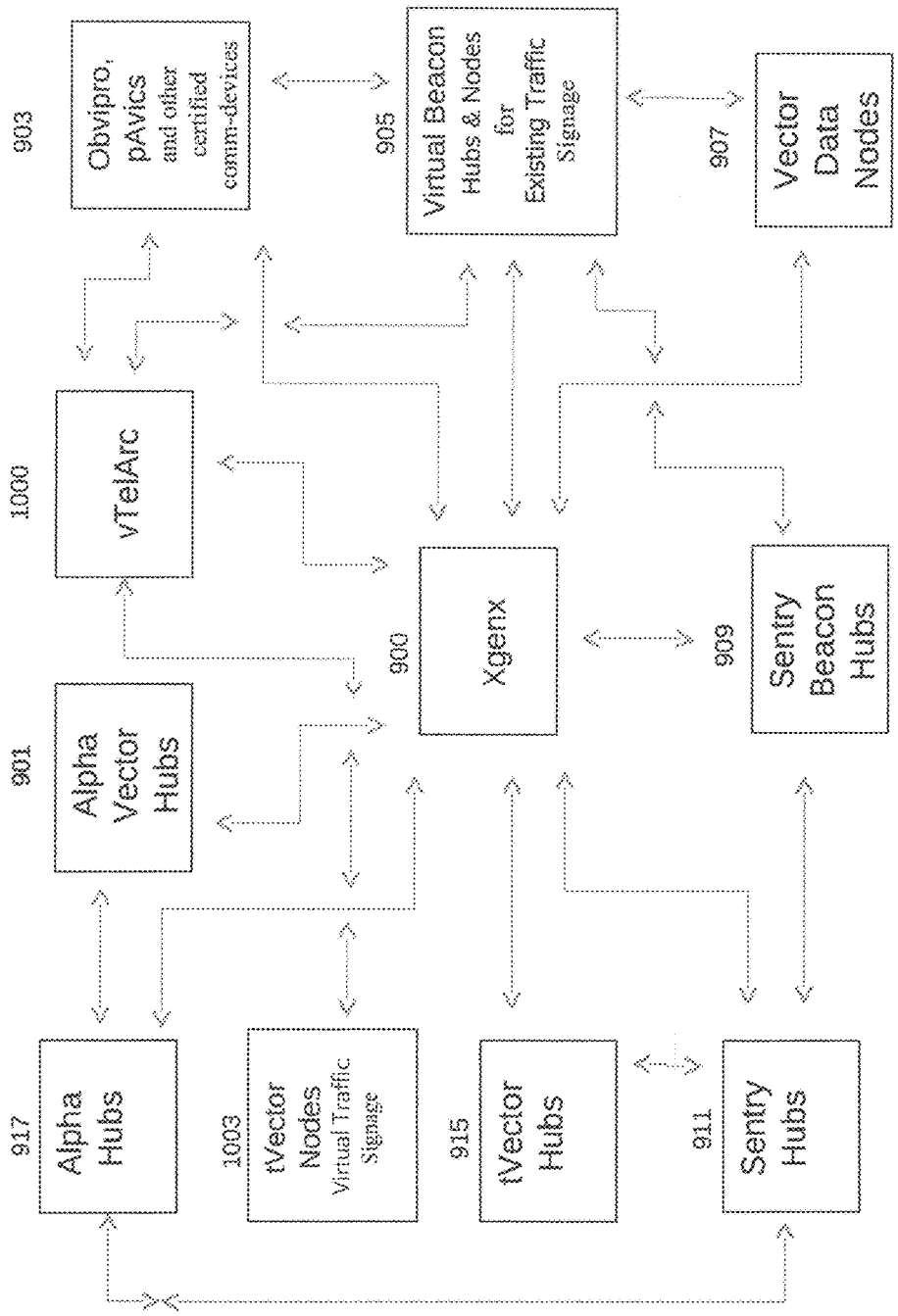
FIG. 3 is a flow chart illustrating the method described in the inventions embodiments for registering vehicles of any type on system's network domain infrastructure, enabling secure manageability of monitored vehicular traffic flow and density in accordance with embodiments of the present invention.

FIG. 3 is a flow chart illustrating the method as described in the aforementioned embodiments for registering vehicles and/or other certified portable comm-device of any type within a domains infrastructure network. Enabling a communication procedural protocol to be authenticated and or authorized to maneuver within a certain infrastructure and or their associated domains to receive driving advice directives and/or driver requested other data and/or to transmit vehicles data facts securely for informatics from and or to mobile and or stationary hub comm-devices and/or node comm-devices, transmitted from other certified comm-devices such as without limitations from and/or to mobile and/or static certified comm-devices equipped with Avics iChipset; providing a datalink to monitor traffic density based on flow rate and/or assisting with the manageability of any vehicular traffic infrastructures in accordance with embodiments of the present invention.

Figure 4:
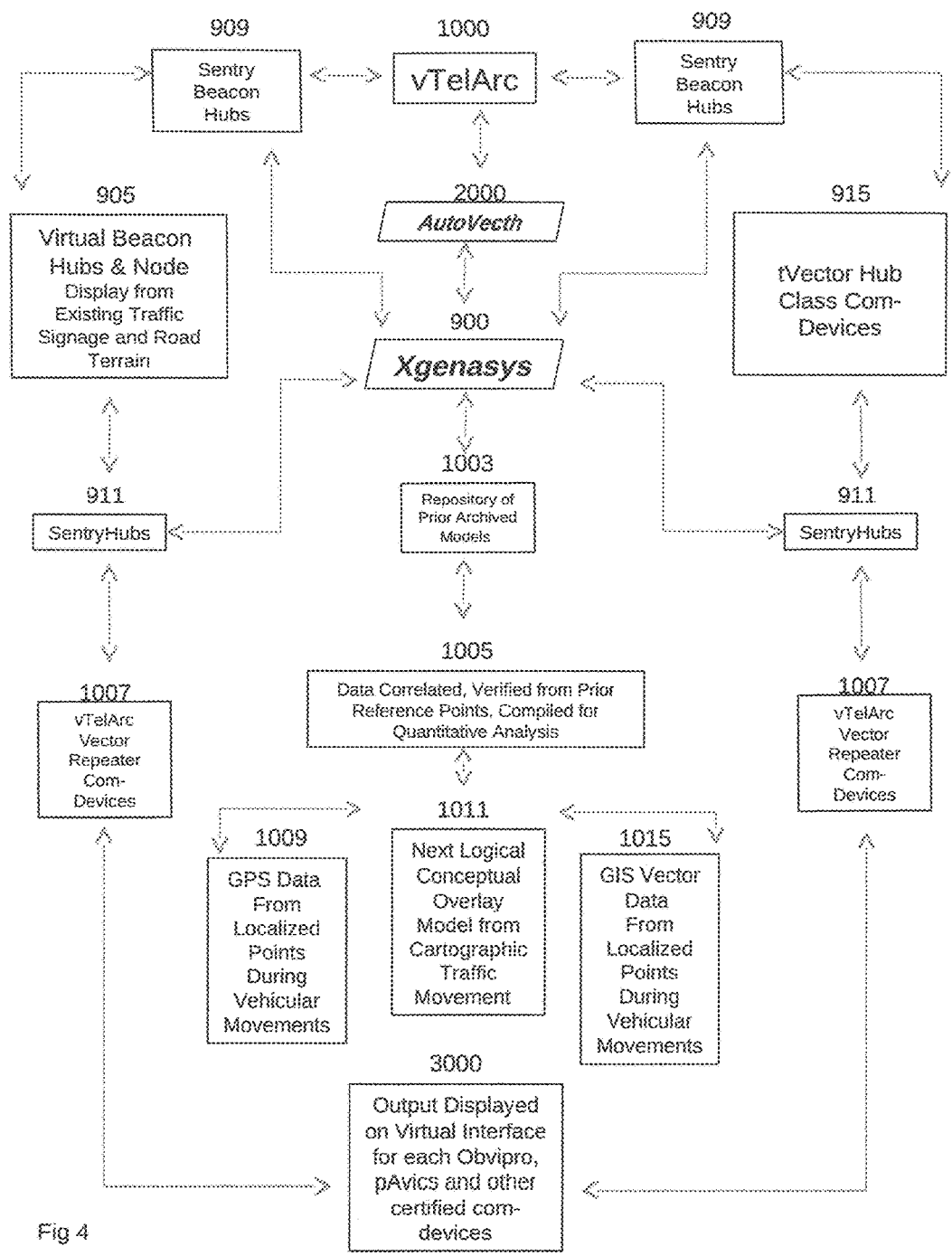
FIG. 4 represents the Virtual Telematic GPS/GIS Overlay Model configuration process.

FIG. 4 is a representation of the aforementioned embodiments in support of a vTelarc GPSGIS Overlay Model process providing a structured Encrypted vTelarc GPS/GIS Overlay Model or Quantum Positioning Overlay Model or current virtual modeling means; using XHTML, HTML5, XML, XSLT or current none modifiable display code that simultaneously produces traffic vector nodes that reflect a representation of existing traffic signage on a virtual display screen. Providing images for warning signs, traffic lights, digitally encrypted speed variations, curves in road ahead and all other signage being used currently and/or used in the future to navigate vehicular traffic. That is effectively inputed showing exactly where, with system overtures as to implicit details regarding speed, evasive actions taken with either by system directional comm-advice directives or information for driver manual maneuvers, and other informatics either system derived, driver requested and/or autonomously as needed.

While the present invention has been described with reference to one and/or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims above.

This invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. As used herein, the term "and/or" includes any and all combinations of one and/or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in these specifications, specify the presence of stated features, integers, steps, operations, elements, and/or components, but do not preclude the presence and/or in addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized and/or overly formal sense unless expressly so defined herein.

As will be appreciated from those skilled in derivatives in this inventions art displayed, portions of the invention may be embodied as a method utilizing a comm-device transmitting comm-advice directives to vehicular traffic. These transmissions from comm-devices that are encapsulated and/or encrypted, and/or a similar apparatus and system and/or a downloadable software for certified comm-devices and/or combinations thereof. Accordingly, the present invention may take the form of an entirely hardware embodiment and/or an embodiment combining software and/or hardware aspects all generally referred to as a "circuit" or "module" or "iChipset" that may and/or may not work independent of each other in certain aspects and/or procedures The present invention thus includes a and/or a similar apparatus and system which computer program product embodied on a non-transitory computer readable medium configured embodied in the medium and includes instructions which perform the processes set forth in the present specification. The storage medium can include, but is not limited to, any type of disk including floppy disks, optical disks, CD-ROMs, magneto-optical disks, ROMs, RAMs, EPROMs, EEPROMs, flash memory, magnetic or optical cards, and/or any other types of media suitable for storing and processing electronic instructions.

Computer program code for carrying out operations of the present invention may be written in any programming language including without limitation, object oriented programming languages such as cross-layer optimization, artificial intelligence, XML, Smalltalk, C# and/or C++, conventional procedural programming languages such as the "C" programming language, visually oriented programming environments such as VisualBasic and ActiveX and/or virtual overlay modeling generate from quantum mathematics.

A preferred embodiment to this invention comprises code languages consisting of none modifiable display codes such as without limitations XHTML, HTML5, XML, XSLT and/or current none modifiable display code and/or the like.

Such display codes provide digital GPSGIS Esri MapObjects overlays and the like will be in none evasive code that is not able to be modified after the fact, like XMTL, XHTML, HTML5, XML, XSLT or current none modifiable display code that simultaneously produces traffic vector nodes on a virtual display screen providing traffic and other scenery relevant images in current strict language code where injections are not able to be implanted, and/or 'system' configurations pre-configured presentational functionality is not able to be altered after transmission.

Obviously, many other modifications and variations of the present invention are possible in light of the above teachings. The specific embodiments discussed herein, and/or certain nomenclatures used to reveal unique processes to illuminate conceptualizations never thought of before, some of which may merely be illustrative, and are not meant to limit the scope of the present invention in any manner. It is therefore to be understood that within the scope of the disclosed processes, the invention may be practiced otherwise then as specifically described without departing from the soul and breadth of the delineated embodiments.

The invention claimed is:

1. A method, comprising a secure navigational system and apparatuses networked within at least one domain and configured within at least one infrastructure for a manageability of monitored aggregate vehicular traffic density maintaining variable sustained vehicle velocity, and further comprises the following elements: characterized by at least one central system server configured to perform calculable equations; transmit navigational directives, suggestions and advisements for purpose of to: track, record, measure and maintain spacial density between each transport at a calculated speed in relationship to phase-change spatial analytics from artifacts calculated from current positional points in relationship to prior at least one future positional phase point in space time location for at least one vehicle, a human, motorcycle, bicycle transmitting current Longlat coordinate location through a plurality of encrypted communication devices to the system;

wherein system transmits modifiable speed variations consistent with original routes destination time frames, and provide alternate routes based on current computed location with projected congestion artifact and density computed variables, each comprised of weather variations causing reductions in flow rates, speed or velocity of at least one vehicle transports calculations and for each transport, a mass of vehicle transports transmitting calculated adjustments in-from forecasted equations in to one or more vehicles in one or more vector areas within at least one domain, detecting a predicated or predictable eventuality of congestion level change in future time space, responding to driver, or from vehicles navigational device requests, system determines vehicles mechanism anticipated communication interoperability issues in communication time-lag in responses to transmissions or requested data from the system, including ecomm-advice, one or more a plurality of certified complaint encrypted communication devices, a vehicles equipped with Qbvipro, pAvics and other similar certified compliant communication device equipped for vehicles transports, and one or more programs configure within system calculates and advises one or more vehicles, drivers, owners, operators or vehicles controller requested alternate routes or system generated based on density factors, constructions areas along with human factors, vehicle capabilities and capacity to navigate:

wherein the system computes and compares speed density variables in calculated flow rates from change in weather conditions on selected routes or entire areas affected by atmospheric changes to assist minimizing the need to break inertia, control safe density factors and manage flow rates, maximizing constant variable velocity throughout for at least one vehicle transport or a plurality of vehicle transports within the domain that is networked within an infrastructure, and transmits to a single vehicle or at least one vehicle within a mass that is not registered due to communication error and that is registered authenticated link sync'd and paired with a plurality of ecomm-devices and system;

wherein the system comprises adjustments in calculated configured spatial density occur in proportion with current velocity for at least one transport within a mass or a cluster of transports or a single vehicle transmitting encrypted navigational directives, and further performs calculated adjustments from spatial phase-change density in future time in proportional to spatial velocity continuously, including cross-layer intersections, modifying speed to one or more transports calculated from optimized overlay models allowing vehicular traffic to flow safely; and further the secure navigational system and each encrypted communication device apparatus, comprises one or more non-transitory computer-implemented programmed methods, further comprised of a plurality of storage mediums, in communication with and comprised of at least one server configured in a localized cloud sync'd enterprise configuration communicating through a sub navigational system transmitting, receiving reactive navigational directives, recording die amount of vehicular traffic proximity density at a time frame (moment) relative to a specific point in time space, compared with the speed of the a calculated comparative clustered mass area chosen and compared with other determined vehicles within the same mass, calculating common variations in predictable calculated overlay models and provide calculable results to manage vehicle flow rates at future points in time space or within a selected vector area, and further comprising archived data-analytics, real-time data artifacts and other realtime telematic data transmitted to system from a plurality of device sensors synchronize link sync'd with at least one vehicle transport, transmitting engine informatics through a plurality of link sync'd ecomm-device sensors, in further communication with at least one networked server hub each authenticate, sync-d, paired and securely registered within at least one domain networked connected to each in direct communication with each other and at least one central server within at least one domain networked infrastructure;

wherein system further comprises a plurality of communications and advertisements encrypted for secure transmissions between vehicles, a plurality of ecomm-devices sensors including Object Functionality Points or Proximity Integration on vehicles and servers within a domain networked architecture; and wherein system server, connected cloud based synchronized servers and all other ecomm-devices OS, NOS and other certified applications used within the domain networked infrastructure that receives and transmits a plurality of data, information, directives, suggestions and advertisements including certified tribal entities, owners, and drivers viewable device the construct comprises one or more of a plurality of machine languages, and one or more parts thereof converted to binary and one or more parts of the machine languages and there converted binary parameters or parts thereof along with languages are converted to binary codes are encrypted;

wherein dominion of all data analytics, data facts, data relics and all other telematic data transmitted, received, extracted, responded and acknowledged to and equipped with at least one transmitter, receiver, transponder and other certified compliant telematic ecomm-devices, including a plurality of towers in direct communication with a plurality of vehicle transports, purposely generating income for each city, township, and municipalities, state and federal DOT;

wherein the plurality of ecomm-device sensors are each equipped with at least one network interface for each stationary and mobile ecomm-devices and other compliant certified devices and servers in communication with one or more of a plurality of remote mobile and stationary encrypted device sensors equipped with Avics, each further constructed of and equipped with a media suitable for storing and processing electronic instructions to maneuver vehicle transports, to increase, decrease flow rates, velocity or speed, instruct vehicle transport or its mechanism and/ or a human to turn on vehicles lights, blinkers, transmitting instructions and communications to vehicles, mechanism or humans from system generated or one or more ecomm-devices or Obvipro detected with evasive maneuverable recommendations, directives, instructions and lane change acquisition, and further comprises other navigational maneuvers, to perform a plurality of tasks, procedures, performing analytical calculations, computations and other mathematical equations embedded within, and comprised on at least one iChipSet RFIDGPS equipped with a transponder/receiver/transmitter and entire device comprises a plurality of modules;

wherein said receiving and transmitting data comprises encapsulated encrypted data exchange or push transmissions from a plurality of at least one ecomm-device and other certified compliant devices, comprised of a configured plurality of at least one iChipset programmed to perform of at least one task or a plurality of at least one procedure, event, calculations to disseminate informatics either current or artifacts;

wherein one or more ecomm-devices sensors and vehicles communicate through one or more sub navigational systems (subnaysys), computing devices configurable variable frequencies to: transmit, receiving and responding to transponders requested signal data from a plurality of strategically calculated positioned stationary and mobile communication ecomm-device sensors and other compliant certified devices attached to a plurality of vehicle transports or from humans; and further equipped with at least one Avics iChipset module constructed in and configured as a hardware, software downloadable application, a hardware software device or combination thereof, comprises Obvipro, pAvics and other certified ecomm-devices within any domain networked infrastructure, system transmits dimensional mapping locational services displayed on a virtual interface calculable from positional point transmitted by vehicle devices and a plurality of smart devices locational services; wherein each infrastructure comprises one or more residential domains, shopping center domains, and to be determined by a configured network protocol for each domain that is networked within municipalities, city or townships infrastructure, that may further comprised, of a plurality of modules, additional cameras and plurality of other certified compliant communication devices and sensors within one or more specific networked domains for additional security measures fer in certain vector areas, in conjunction with a plurality of hub sensor devices within at least one vehicular traffic domains infrastructure;

wherein each interface being configured to transmit, receive and to respond to at least one transponders signal of different frequencies at the same time that may pulsate;

wherein each transmitted dataset, data analytics, data facts and artifacts from vehicle transports mechanical, mechanical-electrical and electrical sensors and all other system ecomm-devices and transmitted ecomm-advice each is timestamped for traffic data and other informatics entering and existing a plurality of encrypted communication device link sync'd together within a cryptic VPI connection using encrypted data push transmissions, via a VCPI (Virtual Cryptic Private Infrastructure) tunnel to one or of a plurality of encrypted communication devices and by other secure means collecting, transmitting, receiving and transponder signals and responding signal data feed into a central processing complex of at least one fink sync'd cloud based Sync'd server and system responds with at least one encrypted Paired-Key acknowledging ecomm-device, Obvipro, pAvics and other certified compliant devices within the network infrastructure;

wherein said plurality of each encrypted ecomm-devices, are load-networked within a given domain networked area channeling said plurality of communications parts, through one or more selected determined configured sub navigational system tracked paths or routes to system server;

wherein infrastructure transmission devices are Sync'd to each other after registration and authenticated and paired with and to at least one other communication sensor device, vehicle, a server or the plurality of ecomm-devices in direct communication with each and system and link sync'd servers with system server, assisting in threat intelligent analytics and analysis;

wherein traffic data further comprises: vehicles phase-change spatial location, positional congestion artifact relationship with past phase-change position to calculated future phase-change spatial positional point in time space, vehicle informatics transmitted to system calculating forecasted flow rates in future spatial time for at least one vehicle transport within a mass or a single vehicle and other calculated derived intelligence necessary to perform real-time calculable equations to securely navigate vehicular traffic, further received from and by a plurality of mobile ecomm-device sensors deployed in a plurality of vehicles transmitting throughout a plurality of one or more vector-hub class sensor device hubs;

wherein system further comprises at least one AlphaVectorHub and AlphaHubs and one or more are combined with other sub hub-class and other certified compliant communication device sensors, nodes and virtual nodes transmitting secure selected advertisement requests from one or more drivers, vehicle, transports, humans and a plurality of mechanisms strategically arranged along one or more roadways, each device and advertisement is displayed in a virtual reality interface configured within iNavX2 for a plurality of transports and same being viewable in and configured to display same in at least one iNavCom center and facilities:

wherein stored particulars comprise a plurality of strategically located servers, each having at least one non shared encrypted database, in secure direct communication with at least one central server within each domain networked infrastructure, purposely to perform calculations, to detect approaching and passing vehicles, archived data artifacts, relics and disseminate shared data across tribal entities and for the purpose of to reconstruct anomalies and accidental occurrences from humans, bicycles, motorcycles, and the derived causation of a plurality of system disturbances along with Longlat positional time points before and after incident of each including on private property; and further supported by one or more data facts comprised of: telematic data archived and indexed, comprised of: time intervals of communications and distance/time data entered/existed a plurality of compliant certified communication devices and cameras; vehicles travel speed, volume in relationship with topography and climatic conditions, flow rates and density and ecomm-device markers and time intervals and their VarChk Index, including transponder and response signal indicators and all other monitored and recorded categorized and cataloged informatics for each driver or owner and their associated elements and factors including registered location for each; vehicle, transport, motorcycle, bicycles and humans recorded in a indexed data book, each analytically compared independently and combined with one or more data artifacts collected, computing precise geographic positional location, and further verified from renderings and overlay map-objects created by each effected vehicle involved in accident or mishap, the computed result of which determines whether the human driver or owner was at fault or communications interoperability issues with system or ecomm-devices, Obvipro, pAvics or other certified complaint devices or a plurality of vehicles or transport were found or a mechanism itself was the causation of accident, incident or a mishap;

wherein a central server, ecomm-devices, Obvipro, pAvics and other certified compliant devices are configured to receive, transmit and respond to transponders signals each of variable frequencies that may pulsate and one or more parts are encrypted, communicating a plurality of traffic data artifacts and informational data to and from a plurality of calculated strategically positioned remote stationary and mobile hub ecomm-devices, sensors, and other certified compliant device sensors throughout a secure sync-d linked network within a virtual private infrastructure; therein creating a channeled telematics network from a plurality of encrypted communication devices, and sensors equipped with at least one Avics iChipset, for each Obvipro, pAvics and other certified compliant encrypted communication devices and senors use UPnP telematic discovery service; and further transmitting and receiving calculated encrypted digital ecomm-advice directives to and from traffic vector-hub class communication sensor devices updating traffic data in one or more non shared databases; and transmitting continuous updates for the purpose of to calculate traffic density in proportion to rate flow for one or more vehicles traversing along one or more roadways based on updated traffics dynamic data; and transmit timing adjustments for speed, flow rates and spatial density throughout a network of secure devices to one or more transports, traffic lights, tVectorHubs and others similar compliant certified ecomm-devices and sensors to advise and transmit to a plurality of vehicles, and transports, along with quantum vector nodes and virtual nodes displaying existing and future contemplated traffic signage in a virtual interface, further providing fuel, eating and other services travelers need, requested autonomously from vehicles Obvipro's, pAvics and system informational recommendations based onboard vehicles processors current integrated capabilities with Proximity Integration, formulating XY (Long/Lat) coordinates laced together with spatial third dimension Z-Topography and Climatic Expectations commixed with human factors, vehicle capabilities to navigate, self drive-ability guided by encrypted navigational directives, vehicles reactive capacity to self navigate with instructions from the system, along with transmissions from other certified compliant vector encrypted ecomm-devices based on optimal traffic flow calculations determined by speed variations in relationship to and from traffic density, human, vehicle capability and capacity factors, continuously creating and updating calculated overlay models transmitting adjustments in vehicular velocity rate flow in proportion with density between at least two transports, a clustered mass of transport vehicles or a single vehicle within the mass;

wherein communication links are pre-configured with one or more ecomm-devices when deployed or determined by forecasted forward velocity based on recorded and posted traffic speed, and for security reasons moving data transmission in advance of transports calculated future positional points, each stationary and mobile ecomm-devices only communicate with certified compliant devices link sync'd registered paired and authenticated with system, ecomm-advices and other certified compliant devices and sensors, creating a primary line of defense for structured network protocol security established by a configured baseline for channeled telematics;

wherein comprising system transmits navigational directives to one or more certified compliant vector ecomm-devices, comprised of optimal traffic flow calculations determined by speed variations in relationship to traffic density to minimize the need to break inertia, transmitting encrypted timing adjustments over a network to one or more vehicles via encapsulated digital encrypted voice and displayed in a virtual interface for vehicles and navigational command centers and facilities and further providing encrypted virtual commands between one or more traffic lights, tVectorhubs, cameras and other compliant certified communication devices for an intersection within a domain networked infrastructure and roadway areas equipped with VectorHub Class ecomm-devices, sensors, and other types of sensor devices;

wherein tVectorHubs, vector-hubs, sub hub-class sensors, VectorHub Class ecomm-devices one or more are combined with BeaconHubs, SentryBeaconHubs, SentryHubs, SentinelHubs, Sentry Nodes, AlphaHubs, AlphaVectorHubs; b, c, d and xVectorHubs, and each sub hub sensor devices configuration preforms performs at least one explicit task, a duty of which is specifically allocated and configured for any given sector within networks infrastructure area; and further comprised of each device sensor and other certified compliant device sensors, ecomm-devices are equipped with a configuration of at least one iChipset, the construct comprising at least one non-transitory machine computer-readable medium constructed with a plurality of storage mediums, at least one interface, and further comprising a non-transitory computer device configured for receiving, to transmit, and respond to transponder calls, to mark data upon entering and existing a plurality of encrypted communication devices, sensors, electrical, mechanical or electrical-mechanical device; and further configured to determine vehicle locational positions and to detect, to warn, to advise, suggest, alert, to respond to requests from humans, a transport, or a mechanism configured within and attached to the vehicle transport, comprised of a plurality of certified registered link sync'd ecomm-devices, authenticated and paired within systems infrastructures communication devices and servers, configured with at least one Paired-Key and at least one response match set for each Paired-Key set assigned within the OS's NOS within the certified compliant ecomm-device, a device, or sensors carried by humans, attached to temporarily or permanently, comprised of a smart device installed with pAvics application or a hardware software device Obvipro and other certified ecomm-devices, and attached temporarily or permanently to a plurality of vehicle and transports;

wherein system comprises encrypted transmitted directives to turn head fights on for autonomous and semiautonomous vehicles and transports are audibly or visually instructed, recommended rest time intervals for personal and commercial vehicle drivers for vehicles equipped with or without technologies monitoring drowsiness with audible voice statements to assist with aiding driver in keeping awake or system detects driver attentiveness is declining; and further transmit visual and audible notifications to vehicle with destination arrivals time, alternate routes, maintenance items, declining fuel notifications recommending fuel node stops in a virtual interface, transport mechanism inspections, insurance, valid tags and vehicle ownership records and verification from at least one data-base and other associated informatics, said data is stored in at least one iChipset within each Obvipro and other certified compliant devices and securely stored within non-transitory machine computer-readable medium with a plurality of storage mediums and archived in at least one system servers database, and a downloadable software applications for humans, bicycles, motorcycles and of any other type certified compliant device and further comprising a Nuclex operating system providing designated lane isolation or acquisition; and further transmitting digital directives maintaining distance factors between vehicles based on density flow rates in proportion with weight loads, historical records of vehicles capabilities, capacity to stop, self navigate and navigate by a human factors associated with each driver and their registered recorded vehicle or transport, directives formulated from computed variables associated with each particular vehicles cataloged informatics, navigational suggestions as requested by driver, owner or system derived directives for autonomous vehicles, each audibly heard or virtually viewable or both audible heard and viewable at the same time;

wherein system comprises analyzed dynamic analytical rate flow (DARF) in comparison to and in conjunction with calculated dynamic analytical lane allocations available, to assistant in maintaining vehicular spatial distance and dedicated transport positioning, along with dynamic directional flow constraints calculated inputs from network traffic congestion artifacts allowing vehicular traffic to move in variable velocity momentum, managed by a controlled network protocol protecting datas composition integrity flow;

wherein system further comprises replacing existing traffic control lights and there associated control mechanisms and stop signs with at least one tVectorHub, VectorHubs combined with Sentry or Sentinel hubs sensors or combinations thereof, transmitting encrypted timing adjustments to adjust speed, flow rates and density for at least one vehicle transport within one or more domains fink sync'd in communication with a plurality of vehicles, transports, mechanism's and other certified complaint devices maneuvering or traversing on road way, including on toll roads; and further comprising each network device sensor are is connected to a plurality of ecomm-devices having a direct data transmission corn-link from and to a plurality of systems servers, system and other mobile and stationary ecomm-device sensors and other certified compliant device sensors communications comprise encapsulated digital encrypted data, including voice or virtual digital commands or both to one or more traffic lights or tVectorhubs or both at the same time for any given intersection, and other certified ecomm-devices, each system device is characterized including system construct transmitting a plurality of ecomm-advice; and comprises at least one Nuclex operating system, comprised of at least one non-transitory machine computer-readable medium configured with a plurality of storage mediums, and further comprises a OS computer device having at least one non-transitory machine computer-readable medium configured with a plurality of storage mediums to perform at least one: process, task, detection of approaching vehicle and transports and system communications anomalies, intrusions, hacks or other maliciousness that disrupts system, records and transmits to system ecomm-devices ability to function properly, detecting non-engagement and non registered vehicle and transports, improper code injections, to compute at least one algorithm, to perform mathematical equations, to transmit, receive from and to system and from and to the ecomm-device and other certified compliant device sensors generate digital directives, to advise; to initiate 911 service activated by a human from the smart certified complaint ecomm-device, for cyclers, runners and motorcycles or an ecomm-device activated by vehicle transport each providing locational services and the location at time of 911 activation, to respond to a transponder signal of a plurality of frequencies and to initiate a transponder signal and ecomm-advice directives transmitted to system; and further each system, ecomm-devices and other certified compliant device sensors and modules comprise at least one or more programmed events, processes, tasks, procedures, a plurality of decisions, detecting, perform calculable equations, acknowledging a plurality of transmissions, to respond to a transponder or to activate a transponder signal, to initiate or activate 911 calls and one or more parts thereof are hard coded into at least one iChipSet;

wherein each OS comprises one or more iChipSets constructed and independent of each other in its functionality, purpose, programmed procedures, time stamp data entry and existing each iChipset and a plurality of devices, or sensors, to perform one or more processes, calculations, events, to transmit and receive, to perform one or more tasks, to make or activate a decision and one or more parts are combined with each other within the certified compliant ecomm-devices;

wherein system and vehicles ecomm-devices comprises a configured generated GPSGIS Virtual Telematic Architecture in a 2D, 3D or a 4D toggled interface viewed by touch, voice or both on iNavX2's virtual interface, displaying all exiting and contemplated traffic signage, including representations for speed, spatial locations of surrounding vehicles with audible and visual navigational maneuvers including a plurality of emergency notifications and dimensional mapping locational service as requested by driver or a human, from system derived protocols, from the vehicle along with roads change display and visually indicating and recording ecomm-device vehicle is receiving transmissions from or to other vehicles (V2V) and system, infrastructure to vehicle (I2V) or V2I including a human to vehicle (H2V) and V2H.

2. The secure navigational system of claim 1, wherein comprises one or more of a plurality of remote stationary and mobile communication hubs, devices, nodes or virtual nodes and a plurality of encrypted communication devices sensors, each comprised of at least one computer-executable instruction, further comprised of one or more programs hardcoded within a non-transitory machine computer-readable medium with a plurality of storage mediums configured within a plurality of ecomm-devices, each comprised of at least one RFIDGPS transponder/receiver/transmitter iChipset, better known as Avics iChipset; structured as a hardware, a downloadable hardware software application, a software application for smart devices or combination thereof to communicate with system, a plurality of Sync'd devices and systems servers, for the purpose of to transmit navigational directives and locational information, advise and inform drivers, vehicles or owners, to provide information, advisements or advertisements, to collect data, to process calculations and to perform a plurality of analysis and analytics from data received or transmitted from a plurality of devices, offer upon request from the human, the driver, the owner of vehicle or the transports notifications to transmit certified filtered advertisements to at least one human, bicycle, motorcycle and other certified compliant devices and share one or more parts of requested or mechanisms notifications with tribal entities along with other telematic business informatics.

3. The secure navigational system of claim 1, comprises at least one non-transitory machine computer-readable medium whose stored contents may be operated or managed by a municipality, city, township in conjunction with a state and federal highway departments or one or more parts of operations and management are contracted out, for the purpose of to navigate, to advice, to transmit advertisements and to maintain variable sustained vehicular velocity and all other aspects of patent's embodiments; wherein one or more parts are a PSE generating income for each township, city or municipality.

4. The secure navigational system of claim 1, wherein system comprises at least one non-transitory machine computer-readable medium whose stored data within a plurality of storage mediums from channelized telematics, comprises transmitted calculated maneuvers from continuous updated traffic data from quantifiable traffic flow, calibrated calculable by traffic density augmented by human equation factors, vehicular capabilities and capacity to navigate and with the assimilated assistance of a human to navigate or autonomous vehicles to self navigate along with topography and climatic expectation equations, forecasting future time/distant spacial positional points in future time space, calculating variable velocity between at least two: vehicles, transports or mechanisms and humans at future space time position for at least one single vehicle within a mass or a single vehicle transport in relationship with humans and other vehicles within a particular vector area.

5. The secure navigational system of claim 1, wherein comprises at least one central non-transitory machine computer-readable medium whose stored contents in at least one central server complex connected with one or more cloud based sync-d servers configured with one or more computing devices comprising one or more computer programs a method is further configured to continuously update traffic data in a non shared database transmitted to system server;
wherein entire system area is comprised of a virtual private infrastructure in secure point communication with a plurality of mobile and stationary encrypted communication sensor devices within each vehicle transport equipped with at least one ecomm-device or other certified compliant devices are load-networked, empowering transparent informational knowledge, building a channelized matrix infrastructure for secure transmissions;
wherein system provides encrypted digital navigational directional directives and other advice for humans, cyclers, runners, motorcycles and a plurality of transports or vehicles, including commercial transports that may hoover configured with Obvipro, pAvics and other certified compliant ecomm-devices, each are configured with instant 911 service providing geographical location and other user informatics assigned to each ecomm-device or from the certified compliant device registered authenticate link sync'd and paired by one or more encrypted Paired-Key sets, and comprised of one or more data transmissions parts are encrypted, comprised of acronyms converted to binary or other types of coded transmissions, allowing system to communicate securely to a plurality of mobile ecomm-device and to communicate to a plurality of stationary ecomm-device in communicate with system server, through a plurality of sub navigational system link sync'd devices, sensors, and or other certified comm-devices with similar communication capabilities;
wherein each certified compliant device is equipped to transmit and receive voice data audibly heard or visually seen or both or a selected vehicle transports transmissions viewed virtually, providing locational services for at least one vehicle or transports viewed by state and federal DOT and law enforcement personnel virtually displayed and heard audibly for drivers of autonomous or semiautonomous vehicles and transports within the networked infrastructure, and one or more parts thereof comprise a paid service event generating income for each infrastructure owned by a city, township or municipalities.

6. The secure navigational system of claim 1, further comprises a non-transitory machine computer-readable medium equipped with a plurality of storage mediums, configured to execute one or more computer-executable instructions from continuous updates from a plurality of vehicles and transports, performing one or more calculations based on optimal density traffic rate flow from at least one vehicular movements or at least one vehicle transport within a determined mass of transports or vehicles traversing along one or more roadways based on or from current updated traffic data and Predicated Traffic Artifacts, either received or extracted from at least one stationary or mobile encrypted communication sensor devices attached to a motorized vehicular transport, a motorcycle, adjusting speed to maintain a constant variable traffic flow rates in proportion with density between each transport and one or more traffic fights, tVectorhubs and other certified compliant devices; and
wherein navigational system, further comprises modulated backscatter technology and other encrypted data push technologies, allowing communications with tagged sensor devices within at least one transport or on one or more towers, poles or in the ground transmitting data to passing vehicles traveling in excess of 100 miles per hour and to transmit spatial location, recording current speed and provide a plurality of instructions, to detect fee a passing and the approach of a plurality of vehicle transport; adjusting speed in proportion to density or in some areas or events vis-a-vis.

7. The secure navigational system of claim 1, further comprises at least one additional computer-implemented method that is further comprises of at least one non-transitory machine computer-readable medium configured internal computing device comprising encrypted transmissions from configured executable instructions for vehicular timing adjustments over a network infrastructure to one or more traffic light intersections and stop signs and at least one sub-hub class and tVectorhubs and other certified compliant encrypted sensor communication devices controlling traffic between each device, based on optimal traffic density flow rate calculations utilizing Density Point Clustering Schema, transmitting measured recordings from vehicular proximity density at time frame relative to a specific XY coordinate points in present time, compared with speed of a comparative clustered mass area chosen and at least one vehicle within a mass, along with calculated variations in predictable conceptional positional points in future space time, and provide configured calculated overlay map-objects managing vehicular flow rates at future points in space time, creating spatial analytical data;

wherein parts of encrypted traffic directive datasets moves further up roadway or in advance of a vehicles pre-con figured or predicted spatial time in space point or to randomized tVector SubHub sensor devices, and other certified compliant devices, in same directional movement of vehicular traffic, adding another layer of security for protection of maliciousness and comprised of at least one SentryHub and a Sentry-BeconHub or both combined within one or more VectorHub class communication device sensors and combined with other certified compliant encrypted communication devices.

8. The secure navigational system of claim 1, further comprises one or more non-transitory machine computer-readable medium configured internal computing devices, comprised of a plurality of storage mediums;

wherein the system and each ecomm-device performs one or more executable configured programed stored methods comprising data filtration for advertisements and other requested data, integrity of each ecomm-advice and other certified compliant devices using a cryptic VPI connection transmitting a plurality of test tokens; and further verifying at least one embedded key, keysets, Paired-Key, SHID ID, other unique identifiers of each devices NOS composition inspections and generating comparative analysis, dimensional mapping services viewed in a virtual interface, from received and transmitting encrypted traffic data from one or more remote mobile and a plurality of stationary link sync'd encrypted ecomm-devices and there comparative parameters verified against last data set transmission and detecting code anomalies;

wherein system performs computations in a non shared data base verifying certified compliant third party applications, producing calculated informational analytics from stored and computed variables to assist in vehicle navigation from: current and predictive density from current and historical archives of traffic flow rates, speed, velocity, road conditions and weather in area between vehicles and transports, compile variables for lane deviations; scheduled exits, entering, traffic flow based on determined regulated flow rate, fuel consumption and related outputs, trip analytics, one or more variables in human equations, routes and corresponding alternate routes for each vehicle in the event of anticipated or current delays or accidents and a plurality of construction events, computes destination communication routes, detects and records maintenance items on vehicle that needs attention, outside parameters transferred to certified compliant entities and store in one or more non shared data bases, documenting the time a plurality of information was sent and the requests thereof.

9. The secure navigational system of claim 1, comprises a non-transitory machine computer-readable medium configured internal computing device equipped with a plurality of memory devices, configured within at least one iChipset, and further constructed within the certified compliant ecomm-device, the sensor executing calculations determining long/lat transmitted from one or more external and internal vehicle sensors within a plurality of mobile and other stationary or mobile certified compliant devices configured to transmit, receive and transponder capabilities between other mobile and stationary device sensors or stationary object or configured within vehicles in support of detecting positional phase-change events from generated WIFI transponder/receivers transmissions verified by GPS, and hand help held devices for humans or other certified compliant devices maintaining calculable determined spatial density and the recorded tracking thereof, vehicle migration between transmitting vehicle and receiving vehicle or a human equipped with pAvics; and is further configured with Proximity Integration in respect to other surrounding objects and transports and vehicles in relationship to phase-change spatial positions in roadways, vehicles, the bicycle, the motorcycle, the human, truck, commercial vehicles, public transports, law enforcement personnel and vehicles based on transmitted and received data from side, rear, and front and from other certified compliant ecomm-devices equipped with at least one RFIDGPS transponder/receiver/transmitter iChipset, transmitting and receives data and transponder signals of a plurality of frequencies that may pulsate to and from adjacent and surrounding vehicles recording and transmitting adjustments from one vehicle to another and transmit to system to determine spatial distance between and to perform calculations for avoidance of a collision from each vehicle transport sending geographic positional data to system, verified by vehicles Obvipro, pAvics and other certified complaint devices attached to each transport or the human.

10. The secure navigational system of claim 1, wherein an additional non-transitory machine computer-readable medium where stored contents configured by at least one computing device performs at least one method comprising recommendations to adjust power intensity to turn off or on street lighting circuits and other open and closed circuits that may include traffic street lights at any given intersection to switch to flashing yellow and other colors, to turn off or not flashing; wherein determination is based on calculated traffic flow density, time of day along with determined weather factors, accidents, a plurality of approaching emergency or dignitaries vehicles.

11. The secure navigational system of claim 1, wherein the system further comprises an additional non-transitory machine computer-readable medium comprised of a plurality of configured storage mediums, where stored contents are configured by a computing device to perform at least one calculated method comprising configured data transmissions regulating flow rates, speed or velocity, perform suggestive analytical calculations, testing and verifying certified compliant applications for security purposes that provide advertisements, directions, recommendations and other niceties from third party companies, determining the existence of malicious code within data being transmitted to a mobile or stationary ecomm-devices, if so alternative encrypted advertisements or other related data items are pushed out or transmitted; and wherein each area VectorHubs, sensors, devices, and other certified compliant communication devices are encrypted within each city or municipality, configured with their own AlphaVectorHub sub-class ecomm-devices, where a plurality of designated advertisements and entertainment is broadcasted from at least one system server repository indexing local merchants, transmitted through a plurality of communication devices and sensors to any vehicle transport comprised of encrypted transmissions;

wherein the system determines specific vehicles energy summation data, based on Consumption Variable Analysis that a certain vehicle may need fuel, providing logistical computational data as to next available fuel supply points and virtual fuel nodes displayed with alternatives regarding fuel manufacturer types and other niceties information requested from driver, vehicle, the human;

wherein there are additional sub-class Alphahubs combined with other certified ecomm-devices transmitting information for lodging, food, maintenance items, rest stop notifications and other advertising services, along with analyzed vehicle transports emission codes and from other devices, sensors, or a plurality of electrical switches in transports mechanism outside regulatory guide lines, inspection status, and tags validity and current insurance coverages with recommendations as to an index of local merchants available for assistance;

wherein the system and the plurality of apparatuses configured within the infrastructure are configured with one or more machine computer-readable mediums configurable with a plurality of memory mediums and further comprise one or more virtual drives configured to verifies verify transmitted data and provides filtration examination creating line of defense for structured network protocol determination of maliciousness from code injections and other rouge anomalies.

12. The secure navigational system of claim 1, wherein a non-transitory machine computer-readable medium, comprised of stored contents in a plurality in one or more memory mediums, configured by a computing device to performs at least one computer implemented method, comprising data filtering for content value and relevant requested advertisements and the associated data sent from certified compliant sources transmitted from third party vendors or from an index of local merchants within the city archived within a plurality of storage mediums and stored within system servers, comprised of all registered merchants within any municipality or township transmitting selected, requested from drivers, the human and one or more vehicles providing a plurality of advertisements.

13. The secure navigational system of claim 1, comprises an additional non-transitory machine computer-readable storage medium configured computing device providing encrypted comparative historical vehicle data transmitted to one or more remote computer system servers over a secure network link with current and historical vehicular data to registered certified compliant users and other computer systems and other certified compliant shareholder; such data includes and is not limited to active and not actively, registered authenticated Sync'd and paired-key activation, and synchronized with a plurality of communications devices and the data-analytics transmitted to and from a plurality of vehicles equipped with Avics, Obvipro and other certified compliant devices in the network areas infrastructure, including information related to detecting complacency issues regarding C02 and 02 output, vehicle maintenance issues, drive-ability and mechanisms capacity to navigate autonomously and semiautonomously in relationship with each other vehicles or compared separately, verifying and recording insurance, registration and inspection coverages from a non shared data base transferred to or from insurance companies and compared with state and federal DOT or other stack holder data bases, comparing data from each registered or not registered vehicle on the network area, and further transmitting notifications to vehicles that are not in compliance and are in need of maintenance, tags, payments for toll road transactions, inspections, insurance coverage and other violations;

wherein payments are made through the system network using secure ECDLinks.

14. The secure navigational system of claim 1, further comprises encrypted data transmissions;

wherein reporting and sharing of current and historical traffic data from and to or with municipalities, trucking and related services to one or more vehicles, at least one owner, automotive dealers and other certified maintenance facilities with relative maintenance information; and sharing with state and federal DOT current insurance, registration and inspection records are compared with insurance companies and state and federal agencies data bases, along with communications interoperability issues from transmitted data received from or to vehicular traffic data, advancements, directives or suggestions that is either actively registered within the domains network infrastructure or not currently registered Paired-key activation within the infrastructure vehicle transport is maneuvering in or moving into or through, further comprises a UPNP as a telematics service discovery mechanism for local advertisement services and moving into adjacent infrastructures communication networks and Plug-nPlay expediting preregistration synchronize.

15. The secure navigational system of claim 1, wherein comprises a virtual connection from each vehicle Registered Sync'd and Paired by way of a specific VIN#, assigned SHID# or other established credential means that identifies each transport mechanism within the vehicle network traffic infrastructure area that is collectively currently linked up and load-networked and identified within at least one domain traffic system server area networked infrastructure, viewable in virtual interface within at least one iNavCom facilities and centers; wherein one or more parts thereof are viewable to transports owner, the operator, owner or driver as a PSE, generating income for a city, municipality and townships of any type or size.

16. The secure navigational system of claim 1, wherein the system comprises each ecomm-device is equipped with at least one Avics iChipSet that registers on a domains network infrastructure and goes through at least one authenticated sequence before activation is system authorized, the process entails link sync'd pairing event using at least one hardcoded encrypted paired-key sets or other subsequent embedded system generated encrypted paired-keys for security reasons;

wherein a dual verification is completed prior to digital navigational directives transmission will proceed after a plurality of ecomm-devices complete registration and system server determines which stationary ecomm-device the registered device is link-syncd with or to along with one or more vehicles system calculates other vehicle within the same route new device is also link-sync-d with as it navigates a calculated route configuring a paired sequence with other vehicles merged throughout calculated route to its designated programmed destination, where each vehicle assists in navigating another vehicles device securely;

wherein paired-key sequence activates flush on NOS, each device it loaded or injected with at least one paired-key set, either upon installation or at time of being built and central server has matched key-sets and one or more keys assigned to a particular ecomm-device that is archived in a non shared encrypted database;

wherein all data strings permissions are set for 'read only' then only add new data from each certified compliant ecomm-devices identities and other relative data of those devices that have been authenticated, paired and completed a registration event a process of being linkup together with system and other ecomm-devices, each transmitted code string has an embedded sentinel code for security verification for each mobile and stationary encrypted communication devices.

17. The secure navigational system of claim 1, wherein comprising verifications of traffic packet congestion artifacts within the network infrastructure, determined by sending out and receiving by system, vehicle transports and other certified compliant ecomm-device, comprised of a continuous or pulsating timed patterned transponder echo calls from a plurality of frequencies to verify location of with long/lat coordinates and compute spatial density between each Obvipro, pAvics or other certified compliant ecomm-devices that has Registered Sync'd, Paired and authenticated or in anticipation of registration or is online or offline within the network domains infrastructure;

wherein said data determines volume of over all traffic density within the network of domains with at least one infrastructure providing telematic business intelligent modeling.

18. The secure navigational system of claim 1, wherein the system comprising a deployment detection process for vehicles that authenticates and are Registered Sync'd and Paired and equipped with Qbvipro, pAvics or other certified compliant smart communication devices and equipped with at least one RFIDGPS transponder/receiver/transmitter iChipset, that transmits and receives data to or from system and between one or more vehicles;

wherein the system server and ecomm-devices performs a plurality of calculations, and compares a plurality of recorded data from at least one non-transitory machine computer-readable storage medium device as to current vehicle tags, insurance and inspection status, age any physical limitations of driver or vehicle owner, use of glasses and a plurality of human factors from a non shared data base transmitted to system server; such ecomm-devices are either attached to or installed on windshield, on dash or from smart ecomm-devices iChipSet within a smart device attached to or carried by the person, the transport, the bicycle, the motorcycle; from vehicle transports owner entered data uploaded via web based or virtual interface or from within a smart ecomm-devices downloadable application either by voice or manually entered or a combination thereof, such registered data is linked to a smart ecomm-device for older vehicles that have reduced OBD capabilities or under dash mount tied directly to OBD output with a dComLink stored in at least one iChipset, transmitting mechanisms data-relics through EDComlink device and recording and transmitting all relative data available from said connection with equipment port with first generation or current OBD port in direct communication with Obvipro and other certified compliant devices communicating and transmitting through a plurality of encrypted communication devices link sync'd to system server.

19. The secure navigational system of claim 1, wherein comprises vehicles equipped with Qbvipro, further configured and equipped with at least one Avics iChipSet and other certified compliant ecomm-devices for installing portable versions of pAvics, wherein stored contents comprising a configured computing hardware or software device performs data transmissions once downloaded and installed from a secure link, and integrated with the certified compliant devices communication capability equipped with location services, accelerometers, a quantum compass transmit data from Obvipro and other smart devices in communication with vehicles processor, that is Registered Sync'd, Paired, Authenticated and link sync'd within a vehicle traffic domain networked infrastructure;

wherein entered driver data is sent to system server, said data received is compared with a non-shared data base from other sources entered manually by driver or owner, transmitted verifications by iVoiceCommands and viewed via vehicles virtual display screen and heard audibly as to validity of data inputted and other navigational directives, suggestions, adjustments and notifications.

20. The secure navigational system of claim 1, wherein each pAvics, Obvipro and other certified complaint ecomm-devices comprise a plurality of internal configured computing coded programs within at least one iChipset RFIDGPS integration merged with operational map-objects co-ordinated with a virtual graphical GPSGIS interface, performing a Registered Sync'd Link sync'd Paired-Keyed Authentication sequence with system and uses UPnP with the certified compliant ecomm-device, once downloaded and installed from a secure link in the certified compliant smart ecomm-device, network communications start once device is authenticated and registered within domains infrastructure or passing through one or more domains, a network of domains connected to at least one infrastructure.

21. The secure navigational system of claim 1, wherein die system comprising a non-transitory machine computer-readable medium configured with one or more processing iChipsets configured to execute one or more computer-executable instructions stored in a plurality of memory storage devices within a configured internal computing device executing mathematical computations, computing traffic flow dynamics, traffic directives transmissions and all other events, processes, procedures from a field of cross-layer optimization, artificial intelligence and from machine learning from Cybrintelligence, where human knowledge is merged with machine languages.

22. The secure navigational system of claim 1, wherein the system data transmissions comprises the recording of a time stamped process of a plurality of data transmissions from and to system, from and to the certified compliant device as it moves from system to a ecomm-device and to another ecomm-device or back to system from the vehicle or the human, from one vehicle to one or more vehicles or to a ecomm-device and vis-a-vis to system; and wherein as data, including secure digital traffic directives, suggestions, advice, advisements, documents whether virtual or not, a plurality of code content, advertisements and a plurality of navigational instructions transmitted to or from certified tribal entities, manufactures, vehicle transport drivers, operators and owners, pAvics, Obvipro and other certified compliant ecomm-devices;

and other electrical-mechanical, electrical, mechanical-electrical, mechanical or combinations thereof recording datas movement from one apparatus to another apparatus of construct; and further comprises software and hardware instructions thereof for the certified complaint devices to move, turn on or off, or to activate a switch or a circuit, module or combinations thereof of any type and record each instruction and its content transmitted or received from the certified compliant device, servers and other types of apparatuses comprised of electrical, mechanical or combinations thereof, to discover errors, inefficiencies, the code content, weather conditions, signal strength and other interoperability issues in communications between devices and vehicles and system or one or more serves or human commands to vehicle and vis-a-vis and assist in determination whether the receiving or transmitting device is in error and a plurality of other system devices encrypted or not and a plurality of sensors within a secure infrastructure or not:

wherein said data comprises: data artifacts, data sets, and data relics comprised of digital or virtual data, signals or a plurality of instructions comprised of binary and a plurality of machine languages or combinations thereof, including instructions from software and hardware computational equations, that moves from one location to another, or passes through electrical, electrical-mechanical, mechanical, mechanical-electrical device or apparatus, a sensor or ecomm-device or a device that is an encrypted device each configured to generates a unique string using acronyms that are encrypted and converted into a binary or cubits or combined with reversed binary or simply binary identification name or names known as—USIN, acknowledged as 'tMarker Audit Trail' or simply tMarker Trail, displaying both tMarker time stamp displays are configured as either digital, analog or binary and preferred use of Greenwich Mean Time (GMT)] and t2Marker that unconditionally displays a VarChk Index as to datas creation inception point—the alpha marker, and its path taken, tracking one or more devices data transmitted, confirming one or more data parts against originated geographic position data fact, artifact or remnants of either or remnants or vis-a-vis from the time is was created; whether it was the result of an equation and the equations structured or non-structured decision-making, compared with a determination of a prior equation, one or more decisions prior to calculable forecasted expected result; where each subsequent marker is exactly as the registration process records archived and compared with current datas alpha marker as it passed through for registration of a plurality mobile or stationary devices and sensors creating tRoute Marker assisting in searchable data-artifacts, indexing, loading or injecting portions or entire string or sections of data content within a string into equations and used to formulate digital directional directives, creates and verify trace routes, indexing, creating one or more programs or a set of programmed events, logically respond to or generate a plurality of documents, voice or visual and the combination thereof for a plurality of calculated: commands, suggestions, directives compared with time interval path data took, route verification and to provide access to data compute, and configurable to be injected into a plurality of programs, procedures, equations, to calculate, compile, archive, to trace, track and to generate other forms of readable documents requested and for mathematical alterations displaying equation steps and other processes within, data strings are configured as binary or other coded process for retracing and retrieving a plurality of searches and for searchable data from the internet or intranet such materials for the purpose of to read, view, archive, provisioning and the dissemination thereof, for processing and performing calculations and for structured and non-structured decision-making, analytical computations, and informational analytics or to search from as to its location on the server to be used for printing, for a plurality of virtual displays and for other forms of manipulations; and all data strings permissions are set for read only, then only add new data string for each device data enters or exits or is at rest temporarily or permanently along with the duration of time between devices or at rest intervals, creating a data book of artifacts advancing predictable calculations;

wherein the system detects and codes a plurality of data artifacts and configures each into a behavior index for each registered vehicle and its driver, operator and owner entered by the human or detected by system, and comprised attributes associated to each model from each manufacturer for every vehicle, transport and all human factors associated with each vehicle transport, driver-owner, operator and their behavior indexes and compiles each creating a data book of records comprised of detected events, indexed and entered data artifacts from vehicle, transport and mechanism registered within the infrastructure or anticipates registration from historical records and from each manufacture indexing its weight and caring capacity, dimensional size, braking capabilities, navigational and communication attributes, calculates driver and vehicles behavior indexes injected into configured equations in one or more program instructions converting compiled data into a plurality of machine coded languages, calculating injected variables creating: maps, map-objects co-ordinated with a virtual graphical GPSGIS interface, dimensional mapping locational services: navigational directional directives, suggestions, warnings, advise, advertisements, advisements, information, and on demand localized maps of area roads being traversed, provide calculated navigational GPS/GIS Overlay Models or Quantum Positioning Overlay Model and telematic weather conditions configured and transmitted for each vehicle-driver, owner or the operator that is selectively audibly heard or virtually viewed or both at the same time for each vehicle equipped with Obvipro, pAvics and other certified compliant encrypted communication devices:

wherein each ecomm-device and other certified complaint devices are Load Networked and configured to transmit in one or more sub navigational systems within the domain that is networked with the infrastructure to transmit communications comprised of a plurality of data content to transmit and receive throughout a configured Link sync'd ecomm-device path, to perform or convert data-relics, data artifacts, data informatics, datasets and images into other readable forms, converted into mathematical equations or binary or virtually, automatically generating a string of alpha or numeric or both combined, or comprised of alpha or numeric binary combined and one or more reformations are encrypted or cubit characters that are encrypted or combinations thereof as a converting or reforming or a combination of a plurality of data, e.g. voice, images including virtual images, a plurality of directives, a plurality of suggestions, advertisements, move; along with devices long/lat trail date as it enters and exits as to when data was created and further providing a list of each devices VLP as it passed through and out of a device whether electrical, mechanical electrical, electrical mechanical, a software derived application and that is manipulated into a plurality of another form, by or from one or more virtual processes and was used by a manipulated process, to change data-artifacts, data-analytics and a plurality of data form and content that is redacted or selecting parts thereof and used for processing, computational derived equations, to read, transfer, print, to perform comparative analytical probability and a plurality of mathematical purposes, at rest or archived, to create business telematic intelligence, further transferring compiled data to certified compliant tribal entities through a secure process and to store data temporarily or permanently, using encrypted data push technology for each dataset transmission thereof, displaying full audit trail informational data as it moves from its inception creation point to another device or location creating transparent informational knowledge.

23. The secure navigational system of claim 1, wherein comprising a non-transitory machine computer-readable medium with one or more processors continuously calculating computations producing authoritative traffic speed variations transmitting a plurality of ecomm-advice directives that coincide with and simulate vehicular rate flow density spacing, allowing safe phase-change spatial repositioning of vehicles in the event of lane changes authorized or not and vLaneDrifts determined from proximity sensitivity sensor transmissions and compared with calculations from phase-change vector artifacts, comprised of a configurable integration with current sensors on vehicles equipped with proximity distance sensor devices or a configuration of similar detection devices built into Qbvipro and pAvics downloadable software or other certified compliant devices.

24. The secure navigational system of claim 1, wherein, system comprises each ecomm-devices and other certified complaint device sensors are equipped and the construct of which comprises at least one non-transitory machine computer-readable medium and a plurality of storage medium devices; and further comprising one or more processors configured within at least one iChipSet and at least one RFIDGPS transponder/receiver/transmitter module integrated circuitry configured to communicate with system and other certified compliant ecomm-devices; and wherein the system and each ecomm-device and other certified devices and sensors, further comprise at least one Nuclex Operating System, incorporating comprised of an internal sub-navigational communication system, and only communicates with specific authenticated, registered, link sync'd paired-key processed ecomm-devices and other certified compliant devices comprised of a plurality of mobile smart communication device carried by humans or attached thereto, and further attached to the vehicle transport, or carried by humans within the vehicle transport within at least one network of one or more domains within and in communication with at least one infrastructure central server, comprising:

operating system and one or more parts are built on a Unix platform or a combined custom configured platform to execute one or more hard coded configured executables or programs to: calculate, instruct, t© determine a selected frequency to transmit, receive and to respond to a transponder signal, to initiate a requested transfer of: data artifacts, relics, data strings, advertisements and any other type telematic data request or generated from the vehicle or the transport mechanism and from the ecomm-device sensors and other certified compliant device sensors initiated by or from human requests, Obvipro, pAvics, derived by or generated by system transmitted or received either by voice, image, virtually or entered by the human hand or one or more combinations thereof; and further comprises permissions set configured as 'read only' then only add new data ecomm-devices identities and other relative data of those devices that have been authenticated, paired, link sync'd and completed a registration event and the process of being linkup together within a domains networked infrastructure only communicating with other link sync'd devices transferring read only data artifacts and other telematic data from and to system and from or to the ecomm-device sensors and other certified encrypted communication device sensor to system; and further configured to transmit data via one or more encrypted communication devices are configured to perform at least one task; to execute one or more hard coded programs, events, procedures, responses, rules, informing the human and vehicle transport and at least one internal mechanism within the vehicle transport, to transfer information, predicting, performing one or more calculable equations generated and performed by at least one internal computer device embedded on at least one iChipSet within each device configured with a plurality of storage mediums;

wherein system further comprises communications via voice or audible commands or both to and from mobile and stationary ecomm-devices attached to or carried by the human and the vehicle transport; and further the system, ecomm-device sensors and all other certified compliant device sensors are equipped with at least one non-transitory machine computer-readable medium configured with a plurality of storage mediums and at least one iChipset, the construct configurable to transmit and receive telematic information of various frequencies and responds to transponders and activates or initiates one or more transponder signals of various frequencies and may pulsate; and system further comprises at least one non-transitory machine computer-readable medium, configured to create a generated a viewable Digital Virtual Telematic Architecture interface providing navigational events, warnings, directives providing audibly heard or visually seen or both at the same time, comprised of vehicular navigational instructed actions, events, to display information, commands, suggestions, procedures and all other navigational directives within vTclarc, structured from GPSGIS Esri Positioning Overlay Model, utilizing data from certificated ecomm-devices equipped with Accelerometers or a Quantum Accelerometer or a Quantum Compass or one or more of each combined that produce precise geographical locational traffic artifacts, surrounding transports and other scenery images, where transmitted displayed visual coded components adhere to non-modi liable code standardization and commonality generating a 2D, 3D and a 4D interactive toggled virtual interface viewed on Obvipro's iNavX2 virtual interfaces screen and on other similar certified ecomm-devices equipped with a configured virtual viewable interface screen.

25. The secure navigational system of claim 1, comprises at least one non-transitory machine computer-readable medium comprised with a plurality of storage mediums, further comprising one or more iChipSet processors, configured to execute a plurality of computer programs configured to create a viewable Digital Virtual Telematic Architecture, results displayed on iNavX2 toggled interface, structured from GPSGIS Esri Positioning Overlay Models and from existing GPSGIS earth mapping satellites or current technologies or in combination with a private structured interface, providing enhanced details of roadway and surroundings and transmit data from and to certified compliant ecomm-devices equipped with Accelerometers or a Quantum Accelerometer or a Quantum Compass or each combined one or more combinations thereof, that produce precise locational traffic, signage and associated navigational items, verified by one or more satellites, Wifi and other image artifacts within any infrastructures roadways, for the purpose of to assist in the navigation of the vehicle;
- wherein visual coded components adhere to non-modifiable program code standardization during and after transmission and commonality generating a 2D, 3D or a 4D toggled interactive interface viewed on Obvipro's iNavX2 virtual screen audible seen or heard, explaining details and on other similar certified compliant ecomm-devices;
- wherein the system further displays longitudinal an latitude vector nodes as to each traffic lights, tVector-hubs and nodes spatial location, and representation of all current traffic signage currently in use and contemplated as to there specific geographical location, along with spacial location of surrounding transports, vehicles or a mechanism;
- wherein navigational system provides virtual images representations for all types of vehicle traffic warning signs, traffic lights, digitally encrypted speed variations, either audible heard and by a virtually displayed means for a curve in roads, effectively showing exact spatial locational position in a translucent back ground for surrounding vehicles, with system overtures as to implicit details for on demand localized maps of area roads being traversed and virtually displaying buildings with dimensional representation.

26. The secure navigational system of claim 1, comprises at least one non-transitory machine computer-implemented method comprising a virtual telematic architecture co-ordinated and configured within a virtual graphical GPSGIS Esri MapObject overlay interface viewable within any transport mechanism equipped with iNavX2 and other similar certified compliant device; displaying representations of virtual traffic lights, one or more Vector-hub class sensors and other certified compliant navigational devices, for the presentation of virtual navigational signs, street locations, surrounding building and traffic signage currently in use or projected to be used to control vehicular traffic, to warn at least one transport of pending items as to current channelized telematic weather integrated from NOAA, ECMWF and other countries weather predicting agencies and academic centers and other data feeds providing driver and vehicle processor speed and navigation recommendations based on weather variables, maintain distance variations between surrounding vehicle with displayed lane changes, displaying real time-line virtual navigational data, exiting off ramp each directed to at least one transport within or not within a mass or at least one cluster mass of transports, advising advancing vehicles to adjust speed allowing calculated entry into current vehicles flow rate increasing spatial density between vehicles calculated point of entry;
- wherein virtual assimilated arrangements is are viewable in iNavX2 interfaces screen and other certified compliant devices visually seen or audible heard or both combined; and
- further system iNavCom display screens, Obvipro's iNavX2 and other certified compliant devices navigations are displayed with code generated with or written in XHTML, HTML5, XML, XSLT or other current none modifiable display codes that utilizes cross-platform-compatible codes requiring no plugins for structured presentations, separated as to universal syntax code semantics for tags, elements and attributes, providing virtual accessibility features with internationalization, adhering to a processing display code that does not allow modification, code injections and other alterations during and after transmission, and encrypt transmission sent to Obvipro's connected iNavX2 and other certified compliant devices interface displays used by all certified tribal entities; and
- further comprising the assistance in vehicles warning of an approaching EMV and dignitaries recommending appropriate maneuvers to slow down or move towards a determined side and automatically presenting alternate routes, granular decelerate/accelerated speeds recommendations, accident updates along with alternate routes; and
- wherein planned road maintenance along with growth projection calculations transmitted to a municipality, state and federal DOT, further displaying either audibly or visually or both, providing alternative routes due to congested on planned or not routes or intersections; and
- further comprising advanced calculable decisions informing roadway traffic lights, vector-hubs and tVector-hubs along determined route, allowing EMV's rapid access towards destination from audible and visual traffic directives and providing secure virtual access to law enforcement personnel;
- wherein system further displays calculable responses and ecomm-advice requested data access from a driver, human, Obvipro, pAvics and other certified compliant ecomm-devices pushed from at least one AlphaHub, further transmitted through at least one AlphaVectorHub and other vector-hub class ecomm-devices and a plurality of other certified complaint communication devices that may be combined with one or more ecomm-devices, receiving data-sets and transmitting displayed nodes for fuel, food, lodging and other services including transports maintenance concerns, inspection, insurance, licensing requirements notifications updated and paid through system network from ECDLinks: further recorded by at least one non-transitory machine computer-readable medium and stored on at least one non-shared storage medium data base configured on at least one iChipset within vehicle and transmitted to system server, optionally transmitted to one or more certified tribal entities as paid subscriber, viewable on a secure VPI web-link interface.

27. The secure navigational system of claim 1, wherein the system and a plurality of ecomm-devices and other certified compliant devices are further comprises a non-transitory machine readable medium configured with a plurality of storage mediums and iChipsets each computer device is configured to calculate phase-change spacial location analytic variations received or detected from plurality of vehicle transports, broadcast digital encrypted directives calculated by said detections, determine and verified from one or more algorithmic processes, equations, procedures, calculable events, configured hardcoded programs or not from data exchanges between vehicles detected and recorded by each vehicle verified by systems Phase-Change spatial positional data and other information from surrounding vehicles prior coordinates, enhancing time sensitive movements or positional variations of an accidental occurrence due to lane drifting intentional or not, and from other unanticipated movements or migrations from one or more surrounding vehicles causing damages to another transport and objects that took place whether from human element errors, transport equipment failures of any type: mechanical, electrical mechanical, mechanical electrical or combinations thereof, combined aspects of transport navigational capabilities or capacity to navigate either semi-autonomous or autonomously, non-engagement, attentiveness of driver, internal hardware or software deficiencies, communication data-links between Obvipro and transports computer processor failures or from one or more combinations thereof;

wherein occurrences are documented with vehicles defined locational phase-change spatial position in relationship to others vehicle, transports and mechanism's that were or may have been collided with and near to, and transmitting avoidance ecomm-advice directives to surrounding vehicles for maneuvering vehicles positional relationship outside danger zone with those vehicles involved in a potential accidental occurrence, generating calculations of specific artifact records as to which transport entity unequivocally initiated a particular disturbance;

wherein the system and connected apparatuses primary functional attributes are directed to humans, a plurality of vehicles, mechanism's and infrastructures safety:

wherein some and all data transfer requests for accident analytics are a certified PSE (paid service event) generating revenue for each municipality in the event of a lawsuit filed due to an accident and other informational matters requested by certified tribal entities.

28. The secure navigational system of claim 1, wherein vehicles currently equipped with proximity integration sensors, comprising transmitted data from sensors are shared throughout system domain network area to surrounding vehicles, transmitting calculated notifications to all calculated determined effected vehicles, further transmitting adjustments in speed variations in relationship to spatial density throughout localized effected vector area, with ecomm-advice directives to brake, change lanes, move off road to side and other audible and visually configured ecomm-advice directives to avoid collision; and further system, comprises ecomm-devices and other certified compliant devices, further configured to utilize echo location procedures to locate the transport current spatial positional point in time, transmitting variable frequencies comprised of encrypted transponder signal that may pulsate, verifying long/lat positional locations, transmitting same to a plurality of vehicles, ecomm-devices and system server.

29. The secure navigational system of claim 1, wherein the system comprises at least one additional a non-transitory machine computer-readable medium equipped with plurality of memory mediums and at least one configured internal computing device comprising computational memory functions using calculated Phase-Change Artifacts for precise spatial location in current time space of any type transports Long/Lat co-ordinate traversing along any roadway, freeways and toll roads in relationship with surrounding vehicles, calculating future positional points in space time, maintaining density flow rate constant to predicated velocity rates for at least a one transport within a mass or not or an entire mass of transports and other cross roads;

wherein calculated equations are determined by computational traffic flow dynamic principles are configured and drawn from the fields of mathematical cross-layer optimization, artificial intelligence, machine learning creating a dynamic computational algorithmic architecture maintaining constant variable velocity by analyzing dynamic analytical rate flow (DARF) in comparison to dynamic analytical lane allocations available, along with dynamic directional flow constraints calculated inputs from network traffic congestion artifacts; and the system further determines calculations comprising transmitted detections of secure vehicular maintenance items, declining fuel notifications, inspections, registration, current insurance status, designated lane and distance factors between vehicles based on density flow rates in proportion with transports weight and loads carried, dimensional size along with manufacturer vehicle transport records and all data associated with a particular transports historical and manufactured records of vehicles and communication capabilities, capacity, and there capabilities and capacity of stopping and reacting to navigational attributes of either semi-autonomous and autonomous transports; and wherein the system further comprises driver archived behavior indexes comprising sensitivity and attentiveness variables in driving techniques, vehicle transports navigational capabilities and capacity variations are monitored, categorized and cataloged for each driver and for each vehicle transport creating a encrypted non shared data book repository that further comprises age of vehicle transport, dimensional size, human factors, communications interoperability issues and all other informatics from each vehicles transports manufacture and informatics archived associated with each transport, driver and owner; and further comprising advancement of predictable calculations maneuvering vehicles from digital comm-advice directives, configured from foundational attributes for each driver and vehicle transports ability to react to system advice directives and other types of ecomm-advice from a plurality of ecomm-devices, in relationship to a driver or a human to surrounding vehicles, transport and vehicles mechanism combined or considered independent of each, a humans concentration level, responsive reaction time with and to vehicle transports mechanical, electrical mechanisms, vehicle transports navigational attributes, along with other drivers age and their responsiveness to react, attentiveness to listening to audible and visual commands and other human and vehicle transport factored attributes and driving behaviors and limitations for each human and vehicle transports, owner or transports as to attentive responsiveness that is system and ecomm-device generated configured calculable and calculations to instruct a human, vehicle and transport mechanisms themselves.

30. The secure navigational system of claim 1, wherein at least one additional non-transitory machine computer-readable medium configured internal computing device comprises a computed locational positions with configurable determination if vehicle is in a safe location for disablement, transmitting requested notifications to specific vehicular ecomm-devices, purposely disabling on board vehicle processors navigational capabilities with warnings from driver or owners request and from system, providing Driver Assist Remote Lock Down for stolen vehicles, and Driver Assist Disablement—better known as DAD, transfers corresponding spatial long/lat coordinates before safety-critical disablement as a certified PSE (paid service event) enhancing parental vehicle management and if transport is stolen.

31. The secure navigational system of claim 1, wherein comparative data is analyzed with vehicles registration, insurance and inspections, the process verifies VIN# ID, SHID and other transport or vehicles owners informatics, vehicle size and other historical vehicle data from manufactured and design information for weight, dimensional size, manufacturer and all data associated with each vehicle used to de-activate vehicle capacity to move and navigate and is in a safe stationary position at time of disablement or navigated to a safe area for repair and notify municipal authorities if vehicle theft occurs, accidental mishap or is out of compliance as to lack of registered access within any infrastructure, including maintenance items.

32. The secure navigational system of claim 1, comprising a non-transitory machine computer-readable medium, further comprises a computer device configured to, provide advanced protected routes for Emergency Vehicles comprised of at least one Fire, Ambulance, Safety Officers and dignitaries vehicle transports from configured suggestive variable routes with time factored enhancements from dynamic analytical lane allocations through entire route;
wherein system further transmits maneuvering directives changing approaching vehicle transports routes and to move to determined positioned side of road and to turn off isolated lane alternate routes, and further transmitting notifications, instructions, warnings and directional directives to other vehicles along determined identified route with alternate routes and transmit audible and visual warnings in iNavX2, iNavCom and other certified compliant virtual interfaces, to pull over to one side or other maintaining spatial relationship with surrounding vehicle transports, including commercial transports.

33. The secure navigational system of claim 1, wherein the system comprises at least one additional non-transitory machine computer-readable medium configure with a plurality of storage mediums, further comprises a computer device configured to scan for deviations in communication within and around any domain network infrastructure, utilizing the same machine readable medium configured on SentryBeacons, SentryHubs and a plurality of other similar certified compliant communication devices and sensors combined, configured to detect foreign matter and anomalies and to intercept hacks and perpetrators masking data that is not originated from Autovecth—Command Offices: iNavCom facilities and centers and other registered authenticated link-svncd and paired certified compliant devices or not, communicating through one or more sensor communication devices equipped with Avics iChipsets and other certified complaint ecomm-devices, detecting improper traffic notifications, advertisements, suggestions and all data system creates, stores and generates from data attacks and other maliciousness disrupting systems attitude engaging Triangulation Sentry Fortification.

34. The secure navigational system of claim 1, wherein comprising SentryHubs that act as dual tVectorHubs or others similar certified compliant ccomm-dcviccs, hub sensors, and only communicate with those that they have be linkup with, creating primary line of defense for structured network protocol, and stand along Hubs and Node sensor devices deployed in any given area within a domains infrastructure; and
further comprise a plurality VectorHub Class ecomm-devices comprised of one or more BeaconHubs, SentryBeaconHubs, SentryHubs, SentinelHubs, Sentry Nodes, AlphaHubs, AlphaVectorHubs; b, c, d and xVectorHubs and cameras, each sub hub has an explicit task combined with one or more sensor devices, ecomm-devices or hubs, die duty of which is specifically allocated for any given sector or a vector area within networks infrastructure area, comprising a configured deployment used in: school zones, construction and any other area in need of additional ecomm-devices for security reason and zones deploying a plurality of eVectorHubs and other types of hub sensor devices, combined with other sensor devices and ecomm-devices, and further deployed in other areas that display and transmit variable traffic speed, lane closers or re-routes through construction zones, viewable in iNavX2 virtual interface and iNavCom center and facilities.

35. The secure navigational system of claim 1, wherein the system further comprises at least one non-transitory machine computer-readable medium, and further comprises at least one computer device, equipped with a plurality of memory mediums, constructed and equipped with at least one Avics iChipSet, configured to provide continuous digitally enhanced localized updated Channelized Telematic Weather feeds from one or more NOAA centers, ECMWF and other countries weather predicting agencies, and further comprises modeled weather data into calculated algorithmic equations to determine anomalies in topography with current and expected weather patterns in road conditions, transmitting visual and audible ecomm-advice directives to turn head lights on due to poor visibility determined by weather, emergencies, to adjust calculated flow rates from weather conditions advising driver of same; perhaps deployed through local academic facilities viewable in iNavX2 virtual interface along with audible advisements, suggestions or directives as to determined conditions, speed, flow rate or density adjustments, route alterations and other driving hazards;
wherein one or more parts of weather feeds are a PSE—(paid service event), generating funds for each municipalities infrastructure and academic centers.

36. The secure navigational system of claim 1, wherein comprising a non-transitory machine computer-readable medium and further comprises at least one computer device configured to calculate positional artifacts from multiple XY co-ordinates (Long/Lat) laced together with spatial third dimension Z-Topography and Climatic Expectations; comparing spatial phase-change artifacts mathematically mapping positional differences transmitting flow rates, speed or velocity adjustments; allowing calculated distance variables between one or more vehicles that coincide with anticipated breaking calculations in proportion with and to spatial variations in phase-change distance at a future time spatial positional point, computing probabilities on margin of error for each vehicles variable braking capacity based on age of vehicle in proportional relationship as to equipment type, age of brakes, weight and ah other corresponding vehicular factors for purposes of to self navigate or not and capacity to stop that is system or ecomm-device or a combination thereof instructing transport to apply brakes to stop or decelerate for autonomous transports, and for semi-autonomous transports system generated directions for a human to do the same; and further inject said calculated variables into formulated equations that commix human response variations from historical data as to future expected positional points in space time and relationship with other surrounding vehicles for either semi-autonomous and autonomous transports, humans, and motorcycles.

37. The secure navigational system of claim 1, wherein traffic packet congestion artifacts within the domains network are determined by sending out transponder echo call to verify that any Obvipro, pAvics or other certified compliant ecomm-device and Vectorhub class, nodes and any other certified compliant ecomm-devices has either registered and paired or anticipates registration or is online or offline within any vehicular traffic domains networks infrastructure.

38. The secure navigational system of claim 1, wherein comprising a communication commencement protocol, in respect to each ecomm-devices is assigned a unique SHID ID # and other identifiers for each ecomm-device and a plurality of certified compliant devices, upon being energized within networks infrastructure, a registration docking process entails the use of verifying each ecomm-devices SHID ID# with a Paired-Key authentication process and embedded before ecomm-device becomes Load Networked and authorized to communicate within a domains network infrastructure.

39. The secure navigational system of claim 1, wherein echo calls sent to every vehicle that arrives at destination or is off network; if there is no reply from echo request calls from tVector Hubs and other certified compliant ecomm-devices in a domain, networked area for Obvipro, pAvics and other similar certified compliant ecomm-devices last known location, system calculates a comparison to the whereabouts of its present location currently in relationship to where it is at present upon being re-energized and authorized;
  wherein upon reentry on the domains network area infrastructure, historical data is compared and verified for possible theft and maliciousness if data does not match;
  wherein once a vehicle transport including motorcycles are Sync'd, authenticated and registered and paired, system transmits stored, requested and system generated navigational directives to the driver or the owner requesting updated navigational directives or directions.

40. The secure navigational system of claim 1, wherein iVoiceCommands are either initiated by system encrypted ecomm-advice directives or imputed by driver as to turn on turn signals, to instruct vehicle to turn on lights due to poor visibility and for safety reasons, to increase and decrease braking and other vehicular maneuvers, in turn system will provide advance notification features given with and without iVoiceCommands and just visual displays on iNavX2 virtual interface of these commands with notifications to surrounding vehicles modifying spatial distances and other maneuvers, from system and driver stimulated engagements for turns, lane change acquisitions and departures without notifications or turn signals manually activated from within vehicle and in auto command mode for semiautonomous and autonomous transports, braking capabilities and capacity for either semiautonomous and autonomous vehicles in relationship to and supported by surrounding vehicles spatial position with velocity and density factors at activation of brakes and notifying surrounding vehicles to adjust spatial distance, to increase or decrease velocity;
  wherein encrypted digital traffic ecomm-advice directive notifications of vehicle positional changes are sent to surrounding vehicles with current encrypted data push techniques viewed on iNavX2 virtual interface and audibly heard or both viewed and heard from other similar certified compliant ecomm-device screens.

41. The secure navigational system of claim 1, wherein a secure downloadable link is established to provides installation software used in pAvics, Obvipro and other certified compliant ecomm-devices, and may use a plurality of biometrics verifications prior to install and updates.

42. The secure navigational system of claim 1, wherein portable Avics iChipset integrates with current locational services in smart ecomm-devices equipped with at least one accelerometer, a quantum compass, quantum accelerometers, Wifi, FRIDGPS, a satellite connection or a configured secure network:
  wherein those transports not equipped, an assimilation of Obvipro comprises a similar downloadable application installed before being registered synchronized within navigational system for certified compliant mobile devices equipped with a receiver, transmitter, transponder and a transceiver used to respond to variable transponder variable frequencies signals to verify not only data but also integrity of ecomm-device and transports spatial location to surrounding mechanisms, transmitted to and from and compared with traffic data from at least one transport or each transport within a mass or just one transport;
  wherein dimensional mapping locational services are displayed on a certified compliant mobile device or on iNavX2 virtual interface, providing instant 911 access, and transmit predefined data continuously generated from accelerometers, locations services from smart devices, a quantum compass, Wifi depending on area location for infrastructure supporting redundancy of verified communications compared with each and satellite location services combined or independent of each other and from archived data from other sources from GPSGIS data and from third parties, transmitting variable speed variations mapping and tracking each transport, lane adjustments based on dynamic analytical lane allocation for commercial trucks, spatial analytical data modeling from overlay map-objects provides decision makers from city to state DOT business telematics intelligence, including traffic modeling for public transportation, school busses, dignitaries with destination variations, re-routing other vehicle transport traffic and more recommendations based on present spatial artifacts compared with future computational traffic datas phase-change spatial analytical scalability.

43. The secure navigational system of claim 1, wherein SentinelHub and other certified compliant ecomm-devices are deployed in school zones not only to record and verify speed violations, and capture those vehicles that speed during school zone time frames, along with placement in other traffic areas where speeding is a known problem or other areas of concern;
  wherein vehicles of concern are equipped with one or more of a plurality of certified compliant ecomm-devices attached to a plurality of vehicle transport, a motorcycle two or three wheel, a bicycle or carried by a human.

44. The secure navigational system of claim 1, wherein at least one SentinelHubf-s) or SentrvBeaconHubs and other certified compliant ecomm-devices are combined within this class or independent of each other, and configured to initialize TSF techniques using Reflective Backscatter Technologies tracing specific infrastructure vector nodes and other comm-devices for intrusion origination points;

wherein SentryHubs are deployed inside school and other public transportation busses initially during first phase of deployment and removed after final deployment phase once onboard vehicle processors Obvipro are equipped with at least one Avics iChipSet, detecting vehicles equipped with pAvics that pass stopped busses, or a combination of pAvics or SentryBeaconHubs and other encrypted communications devices combined as one device used, to calculate vehicle speeds, route alternatives, fuel savings and nodes; and further generating income as a PSE locational service for parents, companies, vehicles owners and other entities, and a shared sync'd database with local authorities, generating income for municipalities and cities.

45. The secure navigational system of claim 1, comprising SentryBeaconHubs, SentryHubs, SentinelHubs, Sentry Nodes are combinational ecomm-devices comprising one or more of a plurality of communication sensor device equipped with Avics RFIDGPS transponder/receiver/transmitter, comprising one or more iChipsets and each further comprised of at least one non-transitory machine computer-readable medium configured with a plurality of storage mediums, configured to use TSF (Triangulation Sentry Fortification) monitoring and transmitting anomalies within network area infrastructure.

46. The secure navigational system of claim 1, comprising each Avics iChipsets deployed within certain VectorHub Class and other sub hub-class ecomm-device and other certified compliant ecomm-devices, become inactive for what ever reason, a preconfigured defined programmed code within this specific class of ecomm-devices, are equipped with a constructed internal capability to be energized remotely initiating Fong/Fat Range (FFR) WIFI ecomm-devices, using GPS and GPS/GIS or other current technologies and with satellite communication verifications for each vehicles locational position transmitting same; until such time erred ecomm-device are is repaired and re-energized or due to weather conditions and used in conjunction with other devices communication capabilities or at all times during transmission;

wherein each certified compliant type of ecomm-devices shuts down and activate memory flush if tampered with from a fail safe code or removed initiates a distress signal of various variable frequencies transmitted near to a ecomm-device onto system;

wherein each deployed ecomm-device has unique layered Paired-Key sequence activation procedure remotely by system generated activating an internal hardcoded procedure, in the event of a failure or tampering with ecomm-device and for security:

wherein if anomalies are found or detected in any type ecomm-device, a transmitted signal sends a encrypted distress through SentryHubs unto navigational system requesting maintenance, shut down, roll-back and request verification to activate OS memory flush and inject hardcoded NOS back into OS.

47. The secure navigational system of claim 1, comprises vehicular traffic manageability by administering organizational control* transmitting variable sustained traffic velocity from protective communication devices within a cloud based sync'd enterprise architecture;

wherein encrypted vehicular traffic communications are transmitted throughout one or more communication applications, and sensor or devices;

wherein data-set transmissions are not limited to wireless, cable TV lines, satellites, electric lines, Wi-Fi, gigabit wide/local area networks and by other currently known technologies including UMTS, WLAN, WiMAX, CTP and other advanced communication network systems, each extended by at least one repeater tower and other advanced IP networks including long-term evolution technologies, transmitted from at least one iNavCom Center and facility through one or more stationary and mobile ecomm-devices Sync'd with at least one Obvipro and other certified compliant devices, navigational results are viewable and heard from iNavX2 virtual interfaces screen and on smart-devices screen that has downloaded pAvics application.

48. The secure navigational system of claim 1, comprising driver sensitivity attentiveness variables as to driver responsiveness to react and all other human derived factors are archived, these variations are then monitored and cataloged and categorized for each driver in relationship to other drivers, advancing predictable calculations formulated by humans and mechanisms reactiveness in braking capability and capacity to navigate, use of blinkers and other vehicular instructions and movements;

wherein calculations from traffic variable ecomm-advice directives transmitted to each Obvipro, pAvics or other certified compliant smart communication devices in advance as needed or requested by driver and automatically from and to autonomous and semi-autonomous vehicles;

wherein driver sensitivity as to attentiveness and transports capacity and capability variables in driving techniques and ability and-driver behavior indexes are archived, said data variations are then monitored, categorized and cataloged for each driver creating a data code index book, advancing predictable calculations maneuvering vehicles from ecomm-advice directives from foundational attributes for each drivers ability to react with navigational directives system generates in relationship to drivers responsiveness, attentiveness and transports autonomous capabilities to react with, along with other drivers driving behaviors and limitations and other human reactions from system generated directives, and each driver is coded with certain algorithmic variables with pre-configured limitations as to how system generated ecomm-advice directives, suggestions, directions, warnings, information, advertisements and maneuverings are transferred via encrypted data push to each surrounding vehicular drivers virtual interface as to locational position for each adjacent transport with audible and visual notification as to vLaneDrifts, speed variations and trip analytical variables based on current density factors and road conditions and divers are able to take over full control of any type vehicle transport, while system makes recommendations as to speed variation, lane changes and acquisitions and all other embodiments necessary to navigate transport mechanism safely visually seen and audibly heard on iNavX2 interface;

wherein archived data becomes a bench mark for autonomous ecomm-advice directives, suggestions, directions, warnings, information, advertisements and maneuverings based on drivers age, physical limitations, and other native concerns from humans or vehicle drivability with or without human efforts, concentration levels, marital status and other human factors used in computational equations; wherein data is continuously updated and comparatively analyzed against configured conclusions not just with a particular driver, such data is comparatively analyzed with person within this class of variations as to age, gender, attentiveness, vehicle transport capabilities and capacity to navigate and vehicle types in combinational comparative analysis to other classes within groups, where system itself begins to anticipate and navigate autonomously.

49. The secure navigational system of claim 1, wherein comprising iVoiceCommands sent by means of digital encrypted traffic ecomm-advice directives to Obvipro, pAvics and a plurality of other certified compliant communication devices audibly and viewed virtually on iNavX2 toggled display screen, creating a digital GPS/GIS Esri MapObject overlay model imaging;
 wherein each ecomm-advice directives are visually displayed and audibly heard or both at the same time on iNavX2 virtual reality interface in realtime while driving;
 wherein calculated digital encrypted navigational directives, advertisements, suggestions information, warnings, advisements and maneuverable directions are generated by system and transmit vehicular traffic navigational data is comprised of a plurality of international languages for the vehicle, or the plurality of transports;
 wherein displayed programmed navigations and languages consist are comprised of none modifiable codes configured in XHTML, HTML5, XML, XSLT and other strict none modifiable code and utilize cross-platform-compatible codes requiring no plugins, produce traffic vector node representation of existing traffic signage on a virtual telematic screen for both drivers and seen within each iNavCom centers and facilities;
 wherein each iNavX2 configured within each transport, displaying traffic, channeled telematic weather models, transmitting adjusted vehicular speed notifications to Obvipro viewed on iNavX2 virtual interface, instructing vehicles maintaining spatial safety distance factors for each type of transport, road curvatures in calculated determination of road surface safe velocity, providing visual illustrated traffic density between other vehicle transports; along with current and future street navigation signage replacing all forms of signage currently used and contemplated to navigate vehicular traffic and their associated poles and towers with exceptions;
 wherein virtual representations viewable on a assimilated interface for downloadable application for pAvics and transmitted to at least one Obvipro and other certificated complaint ecomm-devices, configured to portray a virtual conceptional navigational display on iNavX2 and other certified compliant devices; and
 further comprised of effectively illustrating contents in a virtual display screen that provides images for warning signs, traffic lights, digitally encrypted speed variations either by audible and virtual means or both for curves in road ahead and all other signage being used currently and contemplated for future navigation instructions: and
 further effectively showing exact spatial locational position for other vehicles in a
 translucent back ground with drivers vehicle enhanced visually;
 wherein iNavX2 interface is equipped with a toggle screen for viewing telematic localized weather, traffic cameras and back to navigational services generated from iNavCom facilities with system overtures as to implicit details for on demand localized maps of area roads and toll roads being traversed; and virtually displaying all details in road curvatures and buildings and surroundings with 2D, 3D and 4 dimensional toggled aspects for all navigational surroundings;
 wherein the driver, the human, owner or operator is able to take control of transport navigated in autonomous and semiautonomous mode, while continuing to be instructed either audibly and visually or both configured by system displaying navigational directional directives.

50. The secure navigational system of claim 1, wherein comprises locational navigational services that may include GPSGIS displayed on vTelArc's toggled virtual interface for transport equipped with iNavX2 and other certified compliant devices, incorporating comprised of a split viewable screen when turning on service generated by transmission sent to Obvipro and other certified compliant devices for purpose of, to transmit navigational directives displayed on and audibly heard from iNavX2 virtual interface screen, generated from comparative computational datasets in connection with multiple comparative services for navigational informatics from NavStar, GPS.gov, ATT Navigator and from other similar satellite providers, computing mapped overlays from GPSGIS mapping and other mapping service applications displaying dimensional mapping locational services displayed on drivers iNavX2 virtual interface;
 wherein navigational mapping of the transport seen by driver and owner, each infrastructures iNavCom centers and facilities, local and regional DOT and law enforcement entities, displaying precise geographical longlat positional points in time space in relationship with other transports, indicating spatial distance, speed, flow rates of area within a network of domains within at least one infrastructure.

51. The secure navigational system of claim 1, wherein comprising a network procedural protocol protection procedure that each and every vector hub class and node and similar certified compliant ecomm-devices and linked system servers communicate by encrypted digital transmissions, whether transmitting and receiving data and transponders signals, each of variable frequencies and further encrypted;
 wherein system further comprises at least one non-transitory computer-readable medium comprising a plurality of storage mediums, configured within each certified compliant communication device, further configured for receiving and transmitting encrypted digital data directives and responding to transponder calls from at least one vehicle, extract data formulated by continuous variable transmitted frequencies of encrypted traffic data from a plurality of stationary and mobile ecomm-devices, vector node ecomm-devices and virtual nodes, strategically arranged in a managed protocol along one or more roadways, in communication with a plurality of mobile certified compliant ecomm-devices attached to and in communication with the transport, the human, motorcycle, bicycles and telematics business intelligence, including traffic navigational modeling for public transportation and school busses;
 wherein traffic flow management includes automatically presenting alternate routes, granular decelerate/accelerated speed recommendations, accident updates, planned road maintenance along with growth projections, alternative routes due to congested routes or intersections, roadway light failures.

52. The secure navigational system of claim 1, wherein all street traffic control lights and circuitry, along with all street signage currently deployed and in anticipation of being used to navigate vehicular traffic, are computationally configured in a virtually model, and located using handheld GPS and GPSGIS locational ecomm-devices, collecting each signage in use* imputing same as to each signage's specific long/lat that is embedded into vTelarc GPS/GIS model creating each as a Virtual tArcObject displayed on iNavX2 interface and other certified compliant devices;

wherein navigational system viewable signage generates audible descriptions of each approaching virtual signage, warnings of locational movements, road and speed determination due to weather and road conditions, and further comprised of visual and audible voice commands with iNavX2 visual interface showing instructions and or actual movements of vehicle.

53. The secure navigational system of claim 1, comprising each hub device, nodes, Obvipro, pAvics and other certified compliant ecomm-devices has a unique SHID (Stationary Hub Identifier) that is embedded within NOS assigned too each and hardcoded on at least one iChipset circuitry built into device and securely configured within downloadable application;

wherein each coded program performs at least one separate specific task from at least one non-transitory machine computer-readable medium constructed with a plurality of storage mediums, and further comprises a computer device configured to perform one or more hard coded processes, tasks, computations and one or more instructions to transmit data, to request data information, to provide suggestions, informatics or current information and a plurality of navigational directives from one vehicle to another, from system to one or more vehicles.

54. The secure navigational system of claim 1, wherein the plurality of certified compliant ecomm-devices installed and configured within a municipality, a city or a township is comprised of their own dedicated and reserve IPv(set) for security reasons, enhancing a structured network protocol building a channeled telematic architecture:

wherein AlphaVectorHub and sub-class devices are equipped with there own dedicated IPv(set) to transmit secure designated filtered advertisements and entertainment to one or more Sync'd tVectorHub class devices and other certified compliant ecomm-devices in communication with or combined with one or more AlphaHubs broadcasting determined fuel needs including other types of information and system generated suggestions, notifications and other informative data: and further providing logistical computational data transmitted to at least one vehicle from Consumption Variable Analysis as to next available fuel supply points with locational services of various services displayed with alternatives regarding fuel manufacturer types to at least one vehicle transport, including lodging, rest time for driver based on fatigue attributes, attentiveness, or system generated, further providing a plurality of other niceties from drivers or vehicle requested items and system recommendations transmitting data through certified compliant ecomm-devices, managed by at least one sub navigational system in communication with at least one iNavCom facility and centers, displayed on iNavX2 virtual interface or audible heard or both; and further comprises data-set advertising directives, from one or more tVectorHubs and other ecomm-devices that are combined with AlphaVectorHubs and AlphaHubs transmitting human and vehicle transport requests through at least one cryptic VPI connection and in secure communication data fink sync'd protocol with each central server throughout one or more mobile and stationary ecomm-devices, and further generating income for each domain networked infrastructure overseen and managed by a municipality, city and townships or one or more functional parts by independent contractors; and further system comprises one or more revenue streams for each municipality, metroplex, a city and township within one or more domains interconnected within at least one networked infrastructure.

55. The secure navigational system of claim 1, wherein each tVectorHub, VectorHub Class ecomm-devices, vector nodes, Obvipro, pAvics and other certified compliant ecomm-devices are equipped with at least one Avics RFIDGPS transponder/receiver/transmitter iChipset comprising either hardware or software, hardware or hardware software integrated circuitry; or combination thereof;

wherein each internal transponder, receiver, transmitter ecomm-device, is effectively a separate device independent of each other processing pre-con figured communications, and at least one procedure, process, event or a tasks between each;

wherein the system receives external data, securely transmitting data to one or more internal or external devices, communicates through a secure encrypted datalink, tunnel or similar separate secure VPI communication link between each ecomm-device and other certified compliant devices and system, some of which performs pre-con figured computations, analytical calculations, marks data as data enters or leaves each ecomm-device and other certified compliant ecomm-devices, then transmits data securely through encrypted protocols between each encrypted communication fink sync'd or sync-d linked, authenticated registered device that may act separately of each other in pre-defined tasks.

56. The secure navigational system of claim 1, wherein comprises; calculations determining traffic speeds and location for at least one vehicular transport within a mass of vehicle transports traversing in one or more specific domains within a networked infrastructures area, requires continuous traffic data feeds from at least one link sync'd communication device sensor registered and equipped within a mobile and stationary ecomm-device, transmitting present traffic artifacts based on flow rate in conjunction with calculation frequency determine by relationship with future traffic flow positional point at a future time is space, combined with human factors and vehicles capacity to self navigate, along with driver historical data in proportion to density factor of traffic in any given networked domains sector in a particular infrastructure;

wherein each onboard vehicle processors system (Obvipro) emulates full auto pilot control in communication with transports mechanism's system, driver take over is obtained by voice command statement release auto or manually turn off; and the system and all other communications devices comprise a plurality of chosen languages for both visual and audible navigational directives, suggestions, warning, advertisements and requests.

57. The secure navigational system of claim 1, wherein comprises stationary hub sensors and node communication device sensor for each Obvipro and smart devices installed with pAvics and other certified compliant ecomm-devices with similar communication capabilities configured to communicate between each other and system securely, comprises a plurality of PairedKey Datasets and hardcoded within SHID to verify, authenticate a plurality of mobile and stationary encrypted communication devices within domains networked infrastructure and screen for malware injections within transmitted data;
   wherein Paired SHID Key use one or more token sets for security protocols and crypsis tokenization embedded and one or more parts are layered for a third level of additional sequential authentications for secure measures to certain class comm-devices, creating a secure path for emergency vehicles, dignitaries, and comprise additional paired transmitted and received keys for each ecomm-device, enclosed within an encrypted rapper, and further ecomm-devices only respond with a specific reversed layered binary mathematically encrypted matched response Paired-Key initialized hand-shack internally for another layer of security;
   wherein system further comprising at least one token-set activated to roll back NOS or update devices operating system downloadable pAvics application, and a plurality of calculated determined test token inspections randomly sent verifying NOS's operational integrity composition;
   wherein vehicle, transports and mechanism's device activation is entered via iNavX2 or Obvipro and other certified ecomm-devices secure interface requesting registration and navigational assistance, driver must call-in through virtual interface* generating a PairKev, system transmits a response key back to vehicle activating the certified compliant ecomm-devices communications with system paired with a calculated ecomm-device.

58. The secure navigational system of claim 1, wherein comprises the plurality of ecomm-devices and sensors: termed Obvipro, pAvics and other certified compliant ecomm-devices equipped with at least one Avics iChipset;
   further comprised of at least one non-transitory machine computer-readable medium, constructed of a plurality of storage mediums, configurable to continuously transmit and receive geographical positional data and other navigational concerns including a plurality of detected or anticipated human factors, combined into each mathematical equation creating digital navigational directives displayed on at least one virtual network, providing virtual renderings through a virtual interface in plurality of vehicles and transports equipped with Obvipro, pAvics and other certified ecomm-devices equipped with and configured to display iNavX2 navigational processes; and
   further comprised of secure devices equipped with at least one accelerometer or a quantum compass or both and further comprises locational service using one or more of Avics capabilities initiating Long/Lat Range WIFI transponder/receivers and GPS satellite combined with each or independently, providing redundant verifications for precise geographic positional for each data transmission received or transmitted, and transmitting onto at least one link sync'd or selected ecomm-device arranged within a plurality of vehicles or one or more ecomm-devices and other types of certified compliant devices, sensors connected to and in communication with OBD port attached to the motorized vehicle transport, car, and trucks commercial or not, a person equipped with or carrying a smart device that has installed pAvics, a bicycle, motorcycle equipped with pAvics transmitting, receiving and responding to at least one transponder signal transmitting geographical locational services, transferring corresponding phase-change spatial long/lat coordinates and other pre-defined or not data continuously to and from certified compliant encrypted comm-devices equipped with Avics or similar downloadable application for smart-devices and other certified compliant comm-devices for humans, bicycles or for transports with first generation OBD technological capabilities equipped with Obvipro configured with and under dash mount device tied to OBD output with at least one dComlink device transmitting all relative data available from a secure connection from a plurality of vehicle transports, transmitting data forward to one or more ecomm-devices or directly to or more fink synchronize servers onto system server; and
   further receiving speed recommendations, trip analytics, computational encrypted communication advice directives, human entered or vehicle or vehicles mechanism requests from and to system or from vehicle to vehicle and mechanism providing advisement, entertainment, information to and from system and to and from other transports, providing certified compliant advertisements and other types of vehicle navigational data, computational traffic warnings, instructions to driver or mechanism, engine generated informational data and positional artifact transmissions in future Phase-Change positional movements and Spatial Analytic transmissions to system from ecomm-devices or vis-a-vis for each item listed to and from certified tribal entities.

* * * * *